United States Patent
Ahn et al.

(10) Patent No.: US 11,910,436 B2
(45) Date of Patent: *Feb. 20, 2024

(54) WIRELESS COMMUNICATION METHOD AND WIRELESS COMMUNICATION TERMINAL

(71) Applicants: WILUS INSTITUTE OF STANDARDS AND TECHNOLOGY INC., Seoul (KR); SK TELECOM CO., LTD., Seoul (KR)

(72) Inventors: Jinsoo Ahn, Seoul (KR); Yongho Kim, Incheon (KR); Jinsam Kwak, Gyeonggi-do (KR); Juhyung Son, Gyeonggi-do (KR)

(73) Assignees: WILUS INSTITUTE OF STANDARDS AND TECHNOLOGY INC., Seoul (KR); SK TELECOM CO., LTD., Seoul (KR)

(*) Notice: Subject to any disclaimer, the term of this patent is extended or adjusted under 35 U.S.C. 154(b) by 98 days.

This patent is subject to a terminal disclaimer.

(21) Appl. No.: 16/928,156

(22) Filed: Jul. 14, 2020

(65) Prior Publication Data

US 2020/0344807 A1 Oct. 29, 2020

Related U.S. Application Data

(63) Continuation of application No. 16/374,017, filed on Apr. 3, 2019, now Pat. No. 10,750,540, which is a
(Continued)

(30) Foreign Application Priority Data

Aug. 7, 2014 (KR) .................. 10-2014-0101776
Aug. 22, 2014 (KR) .................. 10-2014-0109433
(Continued)

(51) Int. Cl.
*H04W 28/26* (2009.01)
*H04W 72/04* (2023.01)
(Continued)

(52) U.S. Cl.
CPC ... *H04W 74/0816* (2013.01); *H04W 56/0015* (2013.01); *H04W 74/006* (2013.01); *H04W 84/12* (2013.01)

(58) Field of Classification Search
CPC . H04W 74/0816; H04W 16/10; H04W 28/26; H04W 56/0015; H04W 74/002;
(Continued)

(56) References Cited

U.S. PATENT DOCUMENTS 7,523,205 B1 4/2009 Sherman
7,957,362 B2 6/2011 Xhafa
(Continued)

FOREIGN PATENT DOCUMENTS

KR 10-2005-0029112 3/2005
KR 10-0871244 11/2008
(Continued)

OTHER PUBLICATIONS

Korean Office Action dated Oct. 26, 2021 issued in Application No. 10-2021-7023084 (English translation attached).
(Continued)

*Primary Examiner* — Edan Orgad
*Assistant Examiner* — Vanneilian Lalchinthang
(74) *Attorney, Agent, or Firm* — KED & Associates LLP

(57) ABSTRACT

Provided is a wireless communication terminal. The wireless communication terminal includes a transceiver configured to transmit/receive a wireless signal, and a processor configured to control an operation of the wireless communication terminal. The transceiver receives a trigger frame including information on a channel to be used, by a plurality
(Continued)

of wireless communication terminals including the wireless communication terminal, in communication with a base wireless communication terminal that is any one wireless communication terminal different from the plurality of wireless communication terminals.

9 Claims, 43 Drawing Sheets

Related U.S. Application Data continuation of application No. 15/502,202, filed as application No. PCT/KR2015/008314 on Aug. 7, 2015, now Pat. No. 10,327,262.

(30) Foreign Application Priority Data

| Aug. 29, 2014 | (KR) | ........................ 10-2014-0114610 |
| Oct. 22, 2014 | (KR) | ........................ 10-2014-0143125 |
| Mar. 13, 2015 | (KR) | ........................ 10-2015-0035127 |
| May 13, 2015 | (KR) | ........................ 10-2015-0066669 |

(51) Int. Cl.
| H04W 4/00 | (2018.01) |
| H04W 84/12 | (2009.01) |
| H04W 56/00 | (2009.01) |
| H04W 74/00 | (2009.01) |

(58) Field of Classification Search
CPC ... H04W 72/00; H04W 72/20; H04W 74/006; H04W 74/0833; H04W 84/12; H04L 5/003; H04L 27/2601; H04L 5/0007; H04L 1/0026; H04L 27/26
USPC ........................................................ 370/329
See application file for complete search history.

(56) References Cited

U.S. PATENT DOCUMENTS

| 8,467,345 | B2 | 6/2013 | Abraham |
| 8,811,420 | B2 | 8/2014 | Singh |
| 8,913,599 | B2 | 12/2014 | Gonikberg |
| 8,917,743 | B2 | 12/2014 | Zhu |
| 8,937,912 | B2 | 1/2015 | Mazet |
| 8,953,578 | B2 | 2/2015 | Zhu |
| 8,982,751 | B2 | 3/2015 | Morioka |
| 9,131,395 | B2 | 9/2015 | Amini |
| 9,210,719 | B2 | 12/2015 | Habetha |
| 9,554,400 | B2 | 1/2017 | Morioka |
| 9,661,647 | B2 | 5/2017 | Liu |
| 9,681,462 | B2 | 6/2017 | Wang et al. |
| 9,794,949 | B2 | 10/2017 | Bhargava |
| 9,860,908 | B2 | 1/2018 | Wang |
| 10,588,149 | B2 | 3/2020 | Ahn |
| 2005/0063330 | A1* | 3/2005 | Lee .................... H04W 72/0413 370/468 |
| 2006/0268886 | A1 | 11/2006 | Sammour |
| 2007/0025288 | A1 | 2/2007 | Nagai |
| 2007/0036097 | A1* | 2/2007 | Costa ................ H04W 52/0235 370/318 |
| 2007/0147322 | A1 | 6/2007 | Agrawal |
| 2010/0046453 | A1 | 2/2010 | Jones, IV |
| 2010/0085933 | A1* | 4/2010 | Ho ........................ H04W 74/06 370/329 |
| 2010/0177757 | A1 | 7/2010 | Kim |
| 2010/0232380 | A1* | 9/2010 | Choi .................... H04W 72/082 370/329 |
| 2010/0284393 | A1 | 11/2010 | Abraham |
| 2010/0309871 | A1 | 12/2010 | Fischer |
| 2011/0103323 | A1* | 5/2011 | Wang .................... H04L 1/1861 370/328 |
| 2011/0149918 | A1 | 6/2011 | Gong |
| 2011/0188482 | A1 | 8/2011 | Vermani |
| 2011/0235576 | A1 | 9/2011 | Gong |
| 2012/0044925 | A1 | 2/2012 | Lee |
| 2012/0077510 | A1 | 3/2012 | Chen |
| 2012/0134324 | A1 | 5/2012 | Chu |
| 2012/0147804 | A1 | 6/2012 | Hedayat |
| 2012/0163483 | A1 | 6/2012 | Stacey |
| 2012/0218983 | A1 | 8/2012 | Noh |
| 2012/0307696 | A1 | 12/2012 | Morioka |
| 2012/0327870 | A1* | 12/2012 | Grandhi ................ H04W 28/06 370/329 |
| 2013/0170427 | A1 | 7/2013 | Gong |
| 2013/0201857 | A1 | 8/2013 | Bhargava |
| 2013/0229996 | A1 | 9/2013 | Wang |
| 2013/0286959 | A1* | 10/2013 | Lou ........................ H04W 72/04 370/329 |
| 2014/0050173 | A1 | 2/2014 | Yang |
| 2014/0086200 | A1 | 3/2014 | Seok |
| 2014/0119288 | A1* | 5/2014 | Zhu ................... H04W 74/0816 370/329 |
| 2014/0341135 | A1 | 11/2014 | Bhushan |
| 2015/0146678 | A1 | 5/2015 | Kondylis |
| 2015/0156712 | A1 | 6/2015 | Choi |
| 2015/0172012 | A1 | 6/2015 | Abeysekera |
| 2015/0358067 | A1* | 12/2015 | Zhang ................. H04W 40/244 370/315 |
| 2016/0006554 | A1 | 1/2016 | Wang |
| 2016/0182167 | A1 | 6/2016 | Fischer |
| 2016/0295612 | A1* | 10/2016 | Li ........................ H04W 74/002 |
| 2017/0019818 | A1* | 1/2017 | Xing .................... H04B 7/0452 |
| 2017/0048879 | A1 | 2/2017 | Zhang |
| 2017/0105232 | A1 | 4/2017 | Morioka |
| 2017/0195991 | A1 | 7/2017 | Ahn |
| 2017/0231009 | A1 | 8/2017 | Wang |
| 2017/0338935 | A1 | 11/2017 | Ahn |
| 2018/0014311 | A1 | 1/2018 | Bhargava |
| 2018/0020481 | A1 | 1/2018 | Ahn |
| 2020/0170040 | A1 | 5/2020 | Ahn et al. |

FOREIGN PATENT DOCUMENTS

| WO | WO 2009/027931 | 3/2009 |
| WO | WO 2009/147570 A1 | 12/2009 |
| WO | 2012/169751 | 12/2012 |
| WO | 2013/085363 | 6/2013 |

OTHER PUBLICATIONS

U.S. Office Action dated Sep. 4, 2020 issued in U.S. Appl. No. 16/775,210.
Korean Notice of Allowance dated Jul. 3, 2020 issued in Application No. 10-2017-7010499 (English translation attached).
International Search Report for PCT/KR2015/008314 dated Dec. 15, 2015 and its English translation from WIPO.
Written Opinion of the International Searching Authority for PCT/KR2015/008314 dated Dec. 15, 2015 and its English machine translation by Google Translate.
U.S. Office Action dated May 21, 2018 issued in U.S. App. No. 15/520,808.
U.S. Office Action dated Jun. 26, 2018 issued in U.S. Appl. No. 15/502,202.
U.S. Final Office Action dated Oct. 15, 2018 issued in U.S. Appl. No. 15/520,808.
U.S. Notice of Allowance dated Jan. 3, 2019 issued in U.S. Appl. No. 15/502,202.
U.S. Office Action dated Jan. 10, 2019 issued in U.S. Appl. No. 15/520,808.
U.S. Final Office Action dated Jun. 28, 2019 issued in U.S. Appl. No. 15/520,808.
U.S. Office Action dated Oct. 2, 2019 issued in U.S. Appl. No. 16/374,017.
Korean Office Action dated Feb. 9, 2022 issued in Application No. 10-2021-7043010 (English translation attached).
U.S. Notice of Allowance dated Sep. 6, 2022 issued in U.S. Appl. No. 17/331,643.

(56) References Cited

OTHER PUBLICATIONS

Korean Notice of Allowance dated Aug. 29, 2022 issued in Application 10-2021-7023084 and English Translation.
Korean Office Action dated Nov. 24, 2022 issued in KR Application No. 10-2021-7043010.
Korean Office Action dated Jul. 19, 2023 issued in Application No. 10-2022-7041861.
U.S. Notice of Allowance dated Jun. 30, 2023 issued in Application No. 17/981,364.

* cited by examiner

WIRELESS COMMUNICATION METHOD AND WIRELESS COMMUNICATION TERMINAL

CROSS-REFERENCE TO RELATED PATENT APPLICATIONS

This application is a continuation of U.S. patent application Ser. No. 16/374,017, filed Apr. 3, 2019, which is a continuation of U.S. patent application Ser. No. 15/502,202, filed Feb. 6, 2017 (now U.S. Pat. No. 10,327,262), which is a U.S. National Stage Application under 35 U.S.C. § 371 of PCT Application No. PCT/KR2015/008314, filed Aug. 7, 2015, which claims priority to Korean Patent Application No's. 10-2014-0101776, filed Aug. 7, 2014, 10-2014-0109433, filed Aug. 22, 2014, 10-2014-0114610, filed Aug. 29, 2014, 10-2014-0143125 filed Oct. 22, 2014, 10-2015-0035127 filed Mar. 13, 2015 and 10-2015-0066669 filed May 13, 2015, whose entire disclosures are hereby incorporated by reference.

TECHNICAL FIELD

The present invention relates to a wireless communication method and a wireless communication terminal for setting a broadband link. More specifically, the present invention relates to a wireless communication method and a wireless communication terminal for increasing data communication efficiency by expanding a data transmission bandwidth of a terminal.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a radio interface accepted by 802.11n, such as a wider radio frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high hit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

Especially, as the number of devices using a wireless LAN increases, it is necessary to efficiently use a predetermined channel. Therefore, required is a technology capable of efficiently using bandwidths by simultaneously transmitting data between a plurality of stations and APs.

DISCLOSURE

Technical Problem

Accordingly, the present invention is directed to a wireless communication method and a wireless communication terminal that substantially obviate one or more of the problems due to limitations and disadvantages of the related art.

An object of the present invention is to provide an efficient wireless communication method and wireless communication terminal.

Another object of the present invention is to provide a wireless communication method and a wireless communication terminal for allowing an access point to transmit data to a plurality of stations at the same time and a plurality of stations to transmit data to an access point at the same time.

Technical Solution

To achieve these and other advantages and in accordance with the purpose of the present invention, as embodied and broadly described, there is provided a wireless communication terminal including: a transceiver configured to transmit/receive a wireless signal; and a processor configured to control an operation of the wireless communication terminal, wherein the transceiver receives a trigger frame including information on a channel to be used, by a plurality of wireless communication terminals including the wireless communication terminal, in communication with a base wireless communication terminal that is any one wireless communication terminal different from the plurality of wireless communication terminals.

The processor may obtain the information on the channel to be used in communication with the base wireless communication terminal based on the trigger frame, and the transceiver may transmit data to the base wireless communication terminal based on the information on the channel to be used in communication with the wireless communication terminal.

The transceiver may transmit to the base wireless communication terminal a frame indicating whether there is data to be transmitted from the wireless communication terminal to the base wireless communication terminal.

A more data field included in the frame indicating whether there is data to be transmitted may indicate whether there is data to be transmitted from the wireless communication terminal to the base wireless communication terminal.

The frame indicating whether there is data to be transmitted may be at least one of a Acknowledgement (ACK) frame indicating that a frame is received successfully, a block ACK frame indicating that a plurality of frames are received successfully, and a frame including uplink data transmitted from the wireless communication terminal to the base wireless communication terminal.

The frame indicating whether there is data to be transmitted may include at least one of a size of data to be transmitted to the base wireless communication terminal and information on an available channel detected by the wireless communication terminal.

The processor may obtain the information on the channel to be used in communication with the base wireless communication terminal based on the trigger frame, and the transceiver may receive data from the base wireless communication terminal based on the information on the channel to be used in communication with the base wireless communication terminal.

The transceiver may receive a Ready To Send (RTS)-to-Self frame from the base wireless communication terminal and transmit a Clear To Send (CTS) frame notifying that reception is ready to the base wireless communication terminal; and a reception address field of an RTS frame, that is, the RTS-to-Self frame, indicating that there is data to be transmitted may be a wireless communication terminal that transmits the RTS frame.

A data airtime of data received from the base wireless communication terminal may be synchronized with a data airtime of data transmitted to another wireless communication terminal different from the wireless communication terminal.

The trigger frame may include information on a channel having a bandwidth of more than a minimum unit frequency bandwidth used in communication by the base wireless communication terminal and information on a sub-channel having a bandwidth of less than the minimum unit frequency bandwidth as a sub-band of the channel.

The information on the channel may be an index indicating the channel and the information on the sub-channel may be an index indicating the sub-channel.

According to another aspect of the present invention, there is provided a base wireless communication terminal including: a transceiver configured to transmit/receive a wireless signal; and a processor configured to control an operation of the base wireless communication terminal, wherein the processor allocates a channel to be used in communication with the base wireless communication terminal to a plurality of wireless communication terminals and transmits a trigger frame including information on the channel allocated to the plurality of wireless communication terminals to the plurality of wireless communication terminals.

The transceiver may receive data from a second wireless communication terminal that is any one among the plurality of wireless communication terminals through a channel allocated to the second wireless communication terminal.

The transceiver may receive a frame indicating that there is data to be transmitted from the second wireless communication terminal to the base wireless communication terminal, from the second wireless communication terminal, and transmit the trigger frame based on the received frame.

A more data field included in the frame indicating whether there is data to be transmitted may indicate whether there is data to be transmitted from the wireless communication terminal to the base wireless communication terminal.

The frame indicating whether there is data to be transmitted may be at least one of a Acknowledgement (ACK) frame indicating that a frame is received successfully, a block ACK frame indicating that a plurality of frames are received successfully, and a frame including uplink data transmitted from the wireless communication terminal to the base wireless communication terminal.

The frame indicating whether there is data to be transmitted may include at least one of a size of data to be received from the second wireless communication terminal and information on an available channel detected by the second wireless communication terminal.

The processor may allocate a channel to be used in communication with the plurality of wireless communication terminals to the plurality of wireless communication terminals based on the frame indicating whether there is data to be transmitted.

The information on the channel may be an index indicating the channel and the information on the sub-channel may be an index indicating the sub-channel.

According to a further another aspect of the present invention, there is provided an operating method of a wireless communication terminal. The method includes: receiving, by a plurality of wireless communication terminals including the wireless communication terminal, a trigger frame including information on a channel to be used in communication with a base wireless communication terminal that is any one wireless communication terminal different from the plurality of wireless communication terminals; and transmitting data to the base wireless communication terminal or receiving data from the base wireless communication terminal based on the information on the channel.

Advantageous Effects

One embodiment of the present invention provides an efficient wireless communication method and wireless communication terminal.

Especially, one embodiment of the present invention is to provide a wireless communication method and a wireless communication terminal for allowing an access point to transmit data to a plurality of stations at the same time and a plurality of stations to transmit data to an access point at the same time.

MODE FOR CARRYING OUT THE INVENTION

Figure 1:
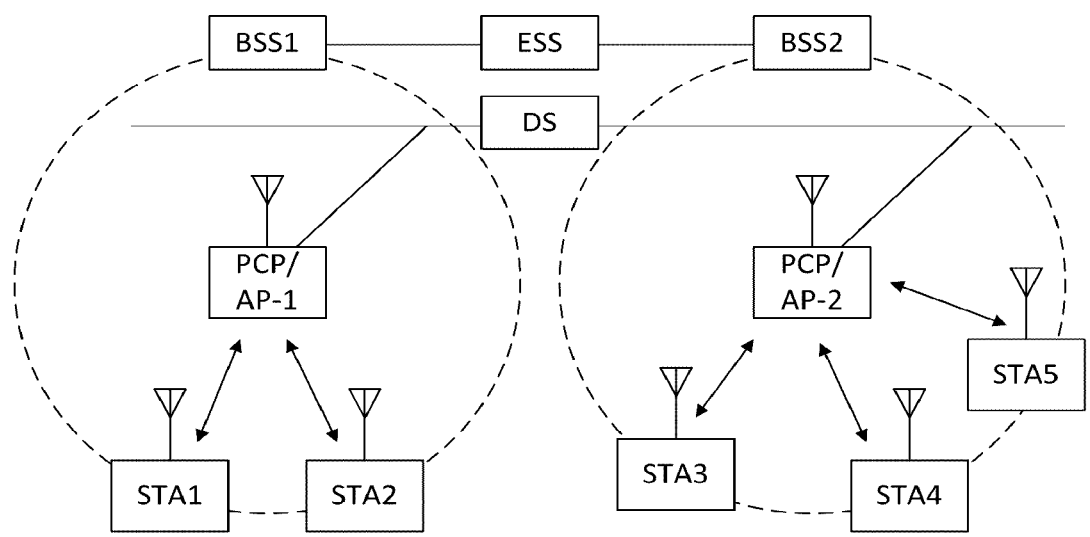
FIG. 1 is a view illustrating a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2014-0101776, Nos. 10-2014-0109433, Nos. 10-2014-0114610, Nos. 10-2014-0143125, Nos. 10-2015-0035127, and Nos. 10-2015-0066669 filed in the Korean Intellectual Property Office and the embodiments and mentioned items described in the respective applications are included in the Detailed Description of the present application.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a radio medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
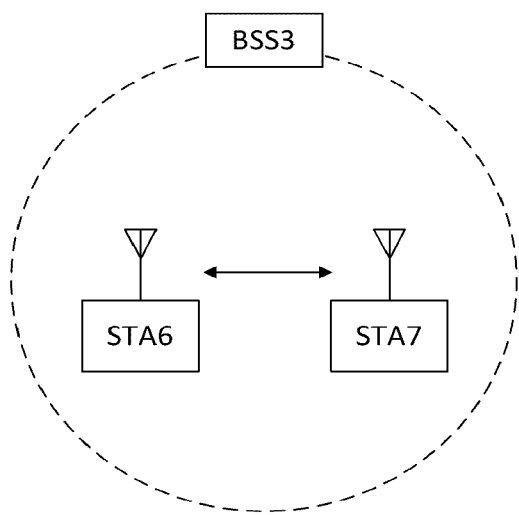
FIG. 2 is a view illustrating a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
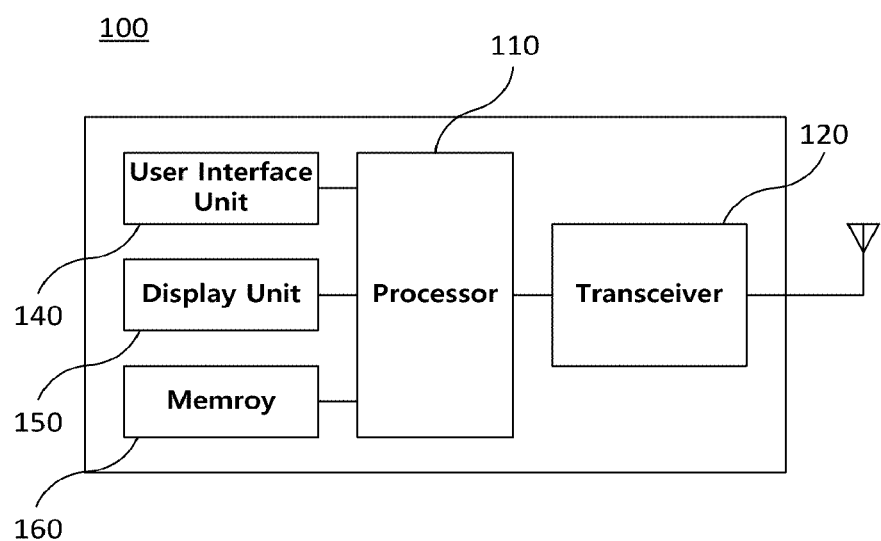
FIG. 3 is a block diagram illustrating a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a radio signal such as a wireless LAN packet, or the like and may be embedded in the station 100 or provided as an exterior. According to the embodiment, the transceiver 120 may include at least one transmit/receive module using different frequency bands. For example, the transceiver 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. The respective transmit/receive modules may perform wireless communication with the AP or an external station according to a wireless LAN standard of a frequency band supported by the corresponding transmit/receive module. The transceiver 120 may operate only one transmit/receive module at a time or simultaneously operate multiple transmit/receive modules together according to the performance and requirements of the station 100. When the station 100 includes a plurality of transmit/receive modules, each transmit/receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 controls various operations of radio signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
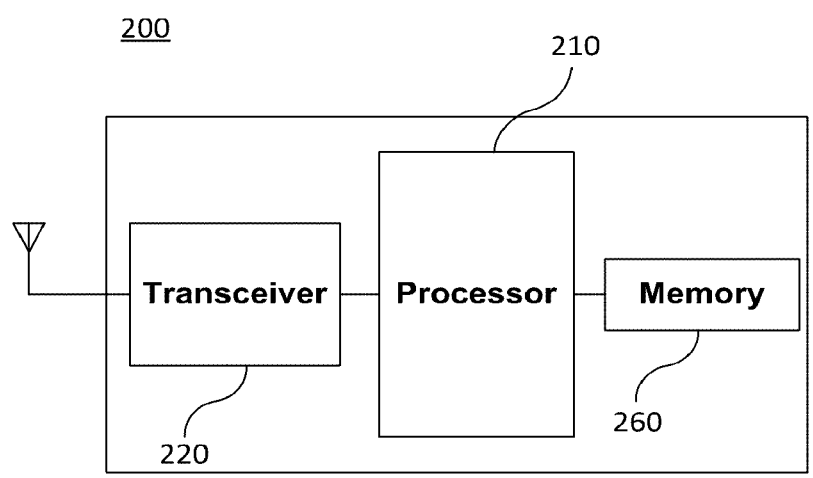
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit/receive modules using different frequency bands. That is, the AP 200 according to the embodiment of the present invention may include two or more transmit/receive modules among different frequency bands, for example, 2.4 GHz, 5 GHz, and 60 GHz together. Preferably, the AP 200 may include a transmit/receive module using a frequency band of 6 GHz or more and a transmit/receive module using a frequency band of 6 GHz or less. The respective transmit/receive modules may perform wireless communication with the station according to a wireless LAN standard of a frequency band supported by the corresponding transmit/receive module. The transceiver 220 may operate only one transmit/receive module at a time or simultaneously operate multiple transmit/receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 controls various operations such as radio signal transmission/reception of the AP 200 according to the embodiment of the present invention. A detailed embodiment thereof will be described below.

Figure 5:
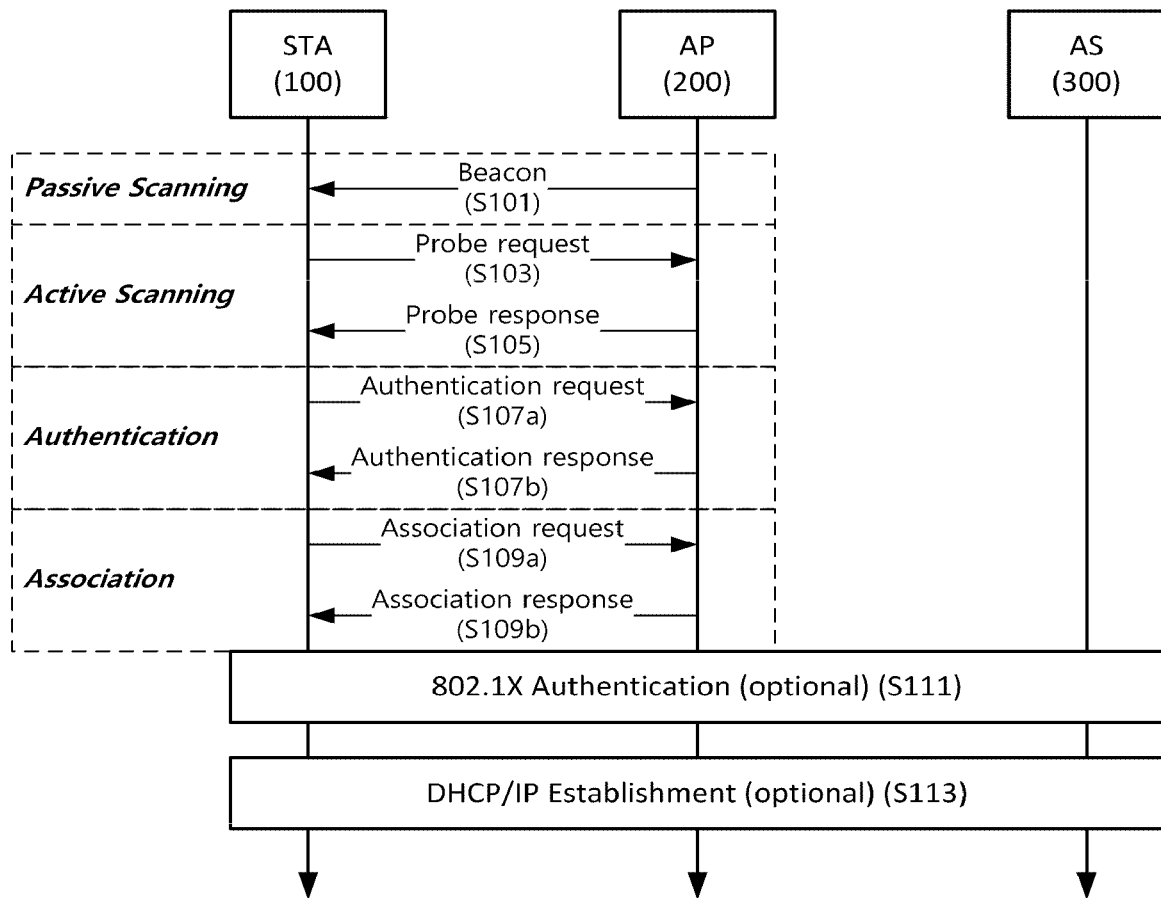
FIG. 5 is a view illustrating a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

When using Orthogonal Frequency Division Multiple Access (OFDMA) to transmit data, any one wireless communication terminal may transmit data simultaneously to a plurality of wireless communication terminals. Also, any one wireless communication terminal may simultaneously receive data from a plurality of wireless communication terminals. For this, a frequency channel is allocated to a plurality of wireless communication terminals that communicate with any one wireless communication terminal. Therefore, it is necessary for any one wireless communication terminal to efficiently signal a plurality of wireless communication terminals of information of a frequency channel allocated to each of the plurality of wireless communication terminals. An embodiment of the present invention in which any one wireless communication terminal efficiently signals information of a frequency channel allocated to each of a plurality of wireless communication terminals to the plurality of wireless communication terminals will be described with reference to the drawings following FIG. 5. For convenience of description, any one wireless communication terminal that communicates simultaneously with a plurality of wireless communication terminals is referred to as a first wireless communication terminal and a plurality of wireless communication terminals that simultaneously communicate with the first wireless communication terminal are referred to as a plurality of second wireless communication terminals. At this time, the first wireless communication terminal may be the access point 200. In addition, the second wireless communication terminal may be the station 100 associated with the access point 200. According to a specific embodiment, the first wireless communication terminal may be referred to as a base wireless communication terminal.

In addition, the first wireless communication terminal may be a wireless communication terminal that serves as a cell coordinator for allocating a communication medium resource and performing scheduling in communication with a plurality of wireless communication terminals.

In a specific embodiment, the first wireless communication terminal may be a wireless communication terminal that allocates a communication medium resource and performs scheduling in an independent network, such as an ad-hoc network, which is not connected to an external distribution service.

In addition, the first wireless communication terminal may be at least one of a base station, an eNB, and a transmission point TP. A frame including information of a frequency channel allocated to each of a plurality of second wireless communication terminals according to an embodiment of the present invention will be described with reference to FIGS. 6 to 8. A frame including information of a frequency channel allocated to each of a plurality of second wireless communication terminals is referred to as a poll frame. According to a specific embodiment, the poll frame may be referred to as a trigger frame. In a specific embodiment, the first wireless communication terminal may transmit a poll frame to the second wireless communication terminal to signal the second wireless communication terminal of information of a frequency channel allocated to the second wireless communication terminal. Also, after transmitting a poll frame, the first wireless communication terminal may transmit data to the plurality of second wireless communication terminals simultaneously through a channel allocated to each of the plurality of second wireless communication terminals. Also, after receiving the poll frame, the second wireless communication terminal may transmit data to the first wireless communication terminal simultaneously with the other second wireless communication terminals.

Figure 6:
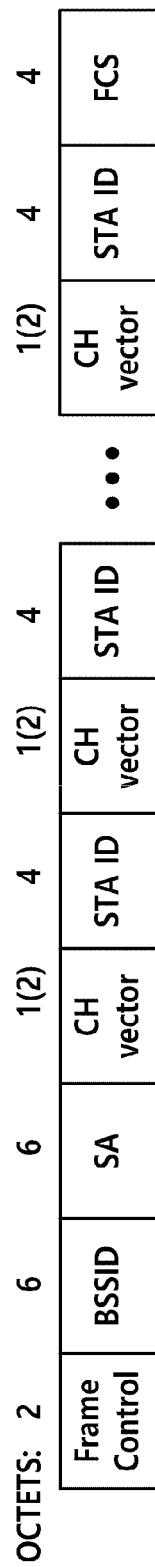
FIG. 6 is a view illustrating a structure of a poll frame according to an embodiment of the present invention.

FIG. 6 is a view illustrating a structure of a poll frame according to an embodiment of the present invention.

The poll frame may include a Basic Service Set Identifier (BSSID) for identifying a basic service set in which the poll frame is transmitted. At this time, the BSSID may indicate the MAC address of the first wireless communication terminal transmitting the poll frame.

The poll frame may include source address information indicating the address of the first wireless communication terminal transmitting the poll frame. At this time, the address of the first wireless communication terminal may be the MAC address of the first wireless communication terminal. The BSSID and the source address information may be identically used as information indicating the first wireless communication terminal. Accordingly, according to a specific embodiment, the poll frame may include any one of the BSSID and the source address information.

The poll frame may include length information indicating the length of the poll frame. The second wireless communication terminal may obtain the number of the second wireless communication terminals participating in the data transmission based on the length information. Specifically, the second wireless communication terminal obtains a variable length by subtracting the length of the fixed field of the poll frame, which is fixed regardless of the number of the second wireless communication terminals participating in the data transmission, from the length of the poll frame indicated by the length information. Then, the second wireless communication terminal may divide the obtained variable length by the length of the variable field required for one second wireless communication terminal, thereby obtaining the number of the second wireless communication terminals participating in the data transmission.

The poll frame may include channel vector information indicating information of a frequency channel allocated to the second wireless communication terminal. The channel vector information may include a frequency channel allocated to the second wireless communication terminal. In addition, the channel vector information may include destination address information indicating the address of the second wireless communication terminal to which the corresponding channel is allocated. At this time, the information indicating the address of the second wireless communication terminal may be an association identifier (AID) for identifying the association between the first wireless communication terminal and the second wireless communication terminal. The second wireless communication terminal may recognize the channel allocated to the second wireless communication terminal based on the channel vector information, and receive data from the first wireless communication terminal through the corresponding channel. The second wireless communication terminal may recognize the channel allocated to the second wireless communication terminal based on the channel vector information, and transmit data to the first wireless communication terminal through the corresponding channel. The specific format of concrete channel vector information will be described later with reference to FIGS. 8 to 17.

In a specific embodiment, the poll frame may have the same structure as that of the embodiment of FIG. 6. Specifically, the poll frame may include a frame control field indicating the control information of a frame. The poll frame may include a BSSID field indicating a BSSID. The poll frame may include a source address (SA) field indicating source address information. The poll frame may include a length field indicating length information. The poll frame may include a CH vector field indicating channel vector information. The poll frame may include an STA ID field indicating the address of a second wireless communication terminal to which a channel indicated by the CH vector field is allocated. The poll frame may include an FCS field including a cyclical redundancy check (CRC) value for error detection.

Figure 7:
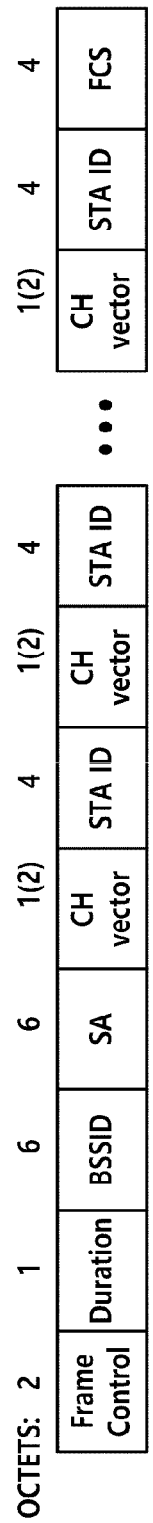
FIG. 7 is a view illustrating a structure of a poll frame according to another embodiment of the present invention.

FIG. 7 is a view illustrating a structure of a poll frame according to another embodiment of the present invention.

The poll frame may include duration information indicating a time required for data transmission after poll frame transmission. Through this, it is possible to prevent other wireless communication terminals from accessing a frequency channel used for data transmission before the data transmission is terminated.

In addition, the poll frame may include information indicating the number of second wireless communication terminals to which the poll frame allocates a frequency channel.

In a specific embodiment, the poll frame may have the same structure as that of the embodiment of FIG. 7. Specifically, the poll frame may include a duration field indicating duration information. Also, depending on a specific situation, the duration field may indicate the number of second wireless communication terminals to which the poll frame allocates a frequency channel. Also, depending on a specific situation, the duration field may indicate length information of the poll frame.

As described above, when a first wireless communication terminal and a plurality of second wireless communication terminals communicate using the OFDMA, it is necessary to signal the plurality of second wireless communication terminals of channel information allocated to each of the plurality of second wireless communication terminals. For this, the poll frame may include channel vector information indicating information of a frequency channel allocated to the second wireless communication terminal. Such channel vector information may be used to indicate information of a channel allocated to the second wireless communication terminal even in a frame other than the poll frame or the preamble of a signal including a frame. An embodiment in which the specific format of channel vector information and the channel vector information are used will be described with reference to FIGS. 8 to 17.

Figure 8:
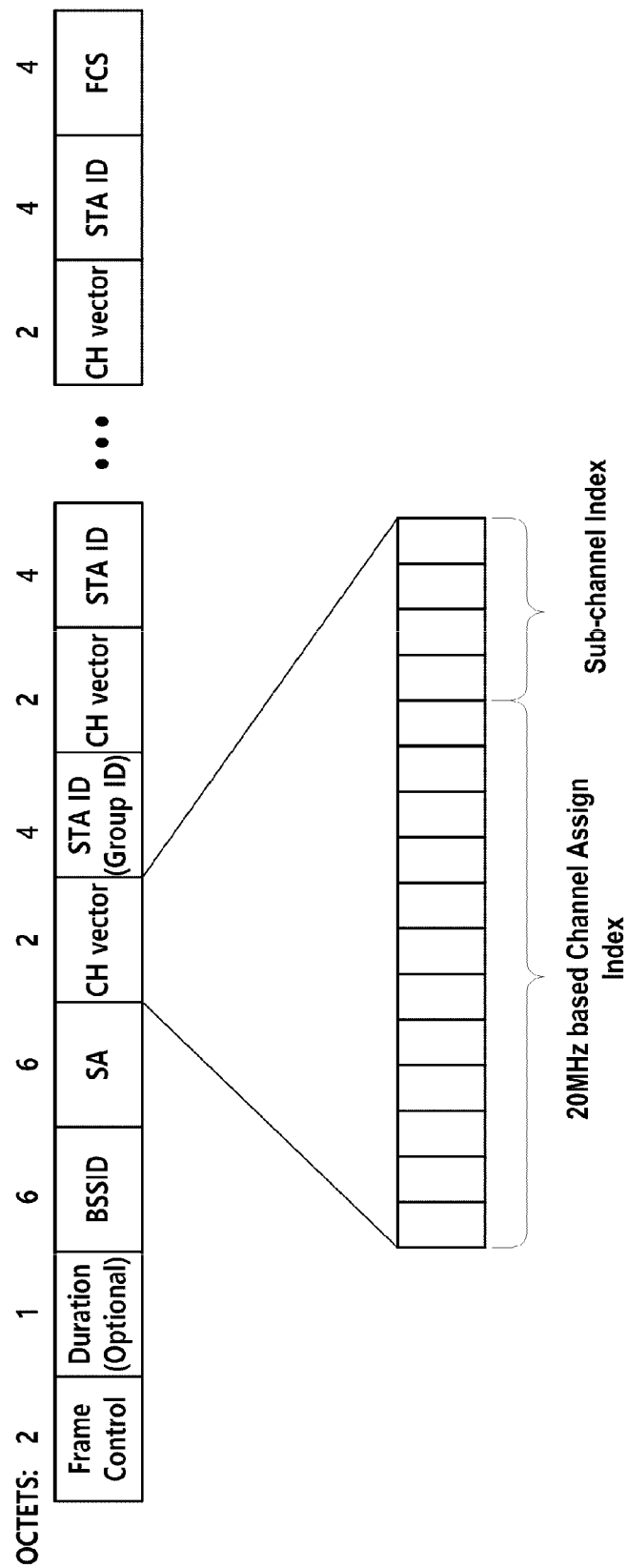
FIG. 8 is a view illustrating a structure of a CH vector field in a poll frame according to an embodiment of the present invention.

FIG. 8 is a view illustrating a structure of a CH vector field in a poll frame according to an embodiment of the present invention.

As OFDMA transmission becomes available, a plurality of second wireless communication terminals according to an embodiment of the present invention may divide the minimum unit frequency bandwidth that a first wireless communication terminal uses in communication and communicate with the first wireless communication terminal at the same time by using each divided bandwidth. At this time, the minimum unit frequency bandwidth may be 20 MHz. Therefore, the channel vector information may include sub-channel information as well as channel information. At this time, the channel information is information on a channel having a bandwidth greater than the minimum unit frequency bandwidth. The sub-channel information, as a sub-band included in a channel, is information on a sub-channel having a bandwidth less than the minimum unit frequency bandwidth. At this time, a channel usage pattern available for the first wireless communication terminal and the second wireless communication terminal may be predefined. In this case, a channel other than the predetermined channel usage pattern may not be used. At this time, the channel usage pattern may indicate whether the range of a frequency band and the frequency band are combined. Such a channel usage pattern may be set for various regulations and technical feasibility. Also, such a channel usage pattern may be represented by an index. Therefore, the channel vector information may include index information indicating a channel usage pattern. Specifically, the channel vector information may include channel index information. And the channel vector information may include sub-channel index information indicating a sub-channel.

In addition, in order to prevent the size of a poll frame from becoming large as the size of the channel vector information becomes too large, the channel vector information may include channel allocation information on a predetermined number of the second wireless communication terminals. Specifically, when it is necessary to transmit channel allocation information to second wireless communication terminals of more than a predetermined number, the first wireless communication terminal may divide channel allocation information for the plurality of second wireless communication terminals into a plurality of poll frames and transmit the plurality of poll frames.

In addition, in order to prevent the size of a poll frame from becoming large as the size of the channel vector information becomes too large, the channel vector information may include channel information by a second wireless communication terminal group unit including a plurality of second wireless communication terminals instead of a second wireless communication terminal unit. Specifically, the channel vector information may include a group identifier for identifying the group of a second wireless communication terminal and channel information allocated to the group of the second wireless communication terminal. At this time, the first wireless communication terminal may manage the group identifier. Specifically, the first wireless communication terminal may assign a group identifier to a plurality of second wireless communication terminals in an association or a re-association process. At this time, the first wireless communication terminal may allocate a reserve group identifier remaining for future use to the second wireless communication terminal. In addition, the maximum number of group identifiers that the first wireless communication terminal allocates may be limited to a predetermined number. When the channel vector information includes channel allocation information by each group unit of the second wireless communication terminal, the first wireless communication terminal may signal channel information allocated to each second wireless communication terminal included in a group through the channel vector information in the preamble of data.

In a specific embodiment, the channel vector information includes information for identifying the second wireless communication terminal and channel information allocated to the second wireless communication terminal. At this time, the channel information may include channel index information and sub-channel index information as described above. Specifically, the channel information may be a 2-byte field as in the embodiment of FIG. 8. In addition, the channel vector information indicates channel index information through 12 bits and sub-channel index information through 4 bits. When the first wireless communication terminal uses a frequency hand in which a plurality of minimum unit frequency bands are combined, a field indicating such sub-channel index information may not be used. Specifically, when the size of the minimum unit frequency band is 20 MHz and the first wireless communication terminal uses a frequency band of greater than 20 MHz, the first wireless communication terminal and the second wireless communication terminal may not use the sub-channel index information. In addition, some of the 12 bits indicating the channel index information may be left as reserved bits in preparation for the format change of the channel vector information.

As described above, the poll frame may include a duration field indicating duration information. Also, depending on a specific situation, the duration field may indicate the number of second wireless communication terminals to which the poll frame allocates a frequency channel. Also, depending on a specific situation, the duration field may be information indicating the number of second wireless communication terminals to which the poll frame allocates a channel. At this time, the second wireless communication terminal may determine the length of the poll frame based on the duration field. This is because the length of the poll frame becomes longer as the number of second wireless communication terminals allocating a channel becomes larger.

Figure 9:
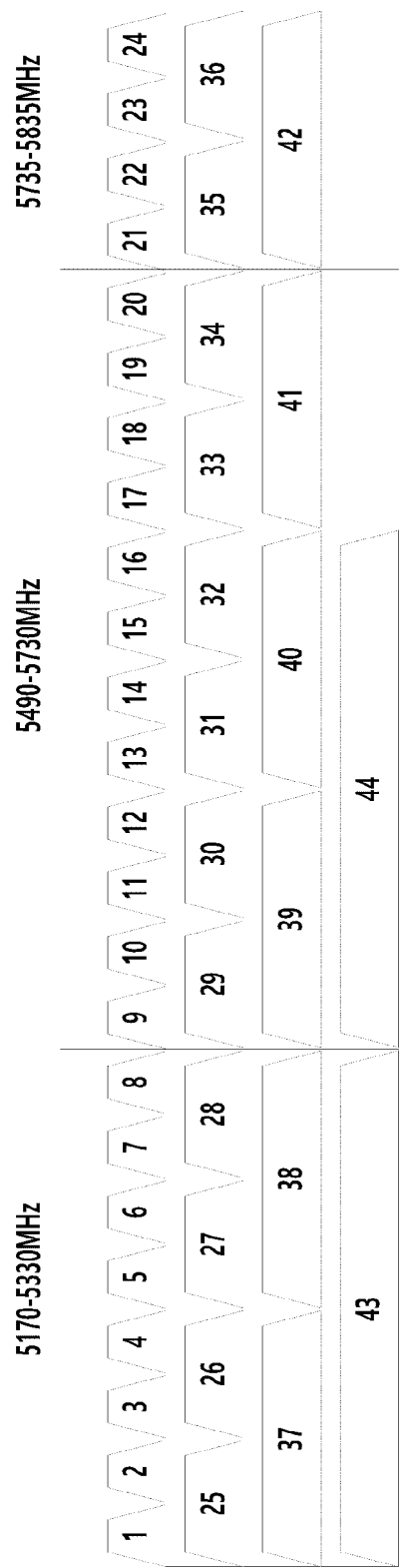
FIG. 9 is a view illustrating a channel index in a frequency band of 5 GHz according to an embodiment of the present invention.
Figure 10:
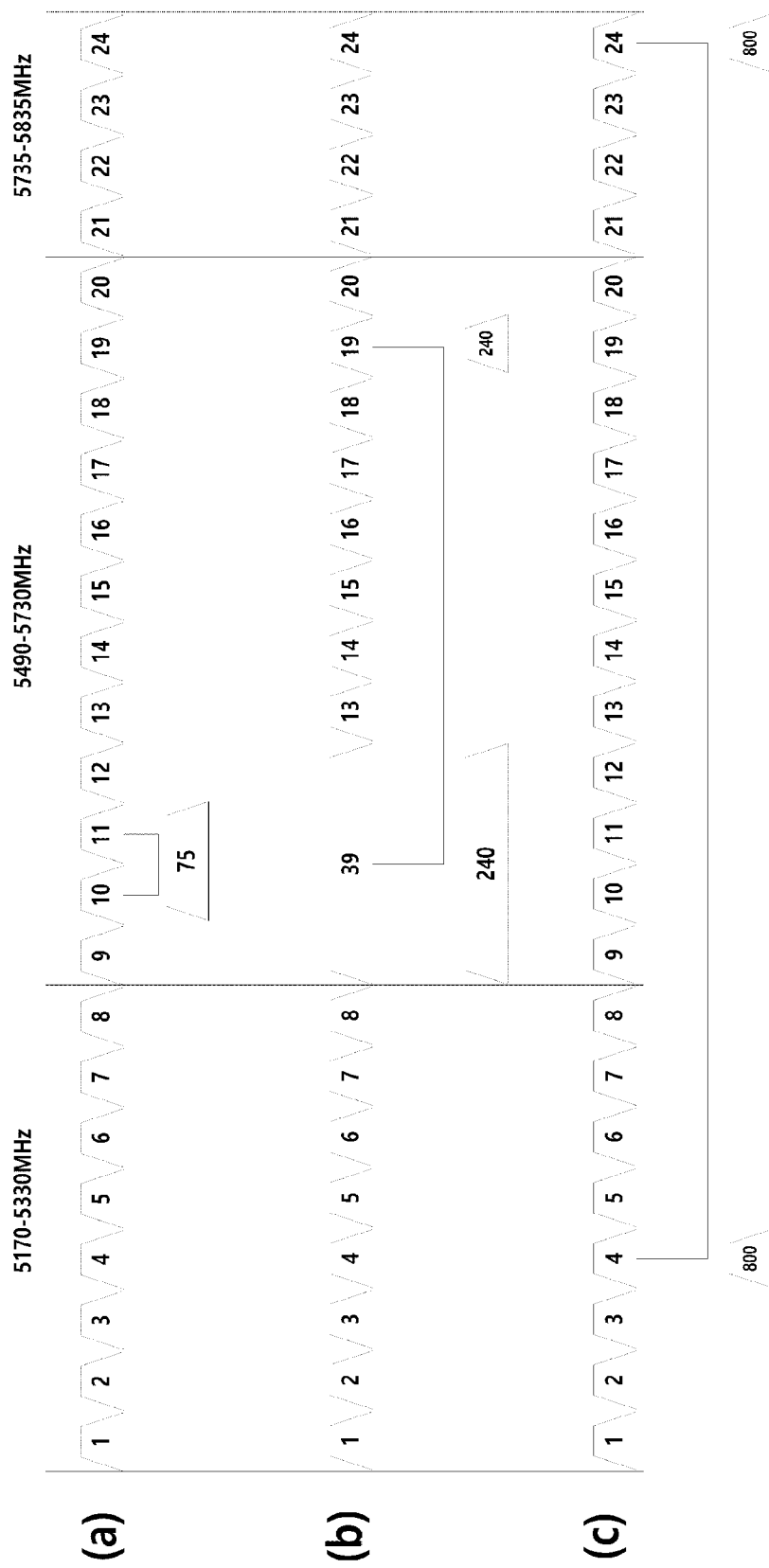
FIG. 10 is a view illustrating a channel index in a frequency band of 5 GHz according to another embodiment of the present invention.

FIG. 9 is a view illustrating a channel index of a 5 GHz frequency band according to an embodiment of the present invention, and FIG. 10 is a view illustrating a channel index of a 5 GHz frequency band according to another embodiment of the present invention.

When the first wireless communication terminal uses only a combination of contiguous frequency bands, the same channel index as in the embodiment of FIG. 9 may be used. In such a case, the number of contiguous frequency channels is 256 or less. Therefore, a field for indicating the channel index information in the channel vector information may be a field of 8 bits or less.

In a specific embodiment, the first wireless communication terminal and the second wireless communication terminal may use a combination of non-contiguous frequency bands. In such a case, the same channel index as in the embodiment of FIG. 10 may be used. For example, the channel index 800 in FIG. 10 (c) represents a frequency band combining the frequency hands indicated by each of the channel index 4 and the channel index 24, which are not contiguous to each other. At this time, the number of available channels may be 256 or more. In such a case, a field for indicating the channel index information in the channel vector information may be a field of 8 bits or more. Specifically, the sum of the size of a field indicating channel index information and the size of a field indicating sub-channel index information may be 16 bits. Specifically, the field for indicating the channel index information may be a 12-bit field. Also, the first wireless communication terminal and the second wireless communication terminal may use a bandwidth that is not one, two, four, or eight times the minimum unit frequency bandwidth. For example, in the embodiment of FIG. 10 (b) in which a minimum unit frequency bandwidth is 20 MHz, the frequency band indicated by the channel index 240 has a 100 MHz bandwidth that is five times the minimum unit frequency bandwidth of 20 MHz. Also, the first wireless communication terminal and the second wireless communication terminal may use frequency bands that is adjacent but is not utilized simultaneously in 802.11ac. For example, the channel index 75 in FIG. 10 (a) represents a frequency band combining the frequency bands indicated by each of the channel index 10 and the channel index 75.

As described above, the channel vector information may include sub-channel index information. At this time, the sub-channel index information may indicate sub-channel or sub-carrier allocation. In addition, the channel vector information including the sub-channel index information may be included in the preamble of a communication signal between the first wireless communication terminal and the second wireless communication terminal as well as the poll frame. Such sub-channel index information will be described with reference to FIGS. 11 to 18.

Figure 11:
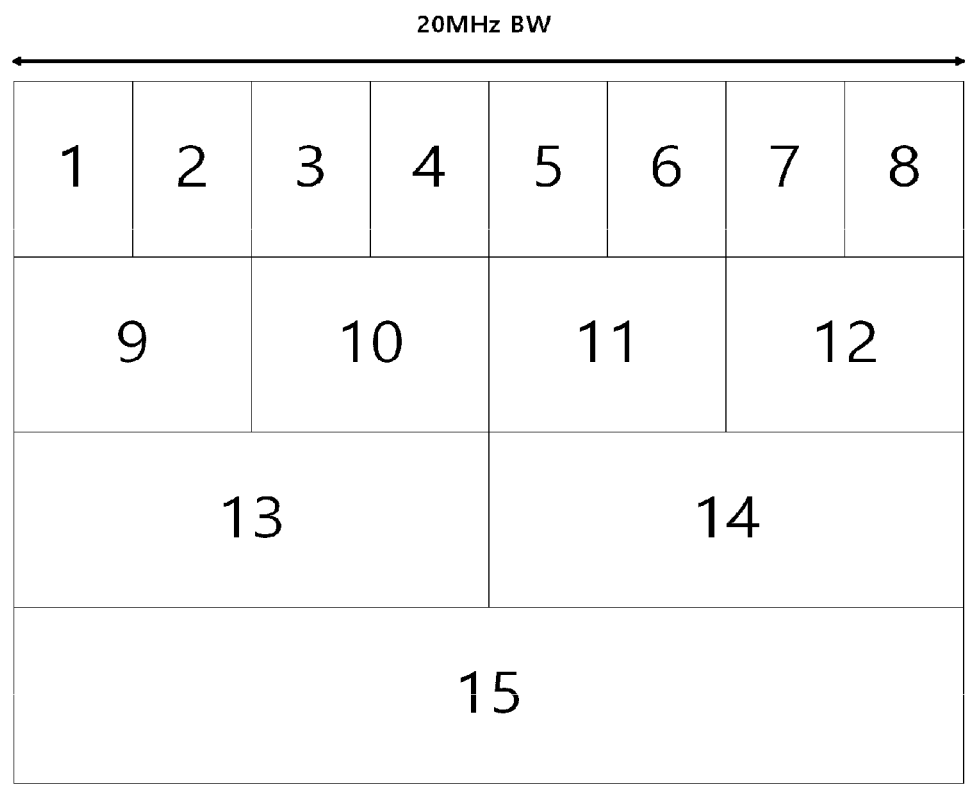
FIG. 11 is a view illustrating a sub-channel index in a frequency band of 20 MHz according to an embodiment of the present invention.

FIG. 11 is a view illustrating a sub-channel index in a frequency band of 20 MHz according to an embodiment of the present invention.

In a specific embodiment, the first wireless communication terminal and the second wireless communication terminal may divide a frequency band having a minimum unit frequency bandwidth into eight sub-bands. At this time, the first wireless communication terminal and the second wireless communication terminal may use a combination of eight sub-hands as a sub-channel. The minimum unit frequency bandwidth may be 20 MHz. The first wireless communication terminal and the second wireless communication terminal may use the fifteen sub-channels as shown in FIG. 11 by combining eight sub-bands with adjacent sub-bands. In addition, when the first wireless communication terminal and the second wireless communication terminal indicate the channel vector information by using the group identifier, the sub-channel index should represent the case that the second wireless communication terminal is included in the corresponding group but does not receive a sub-channel. Therefore, the number of cases that the sub-channel index should express is 16 in total. Therefore, the sub-channel index may be represented by a 4-bit field.

Figure 12:
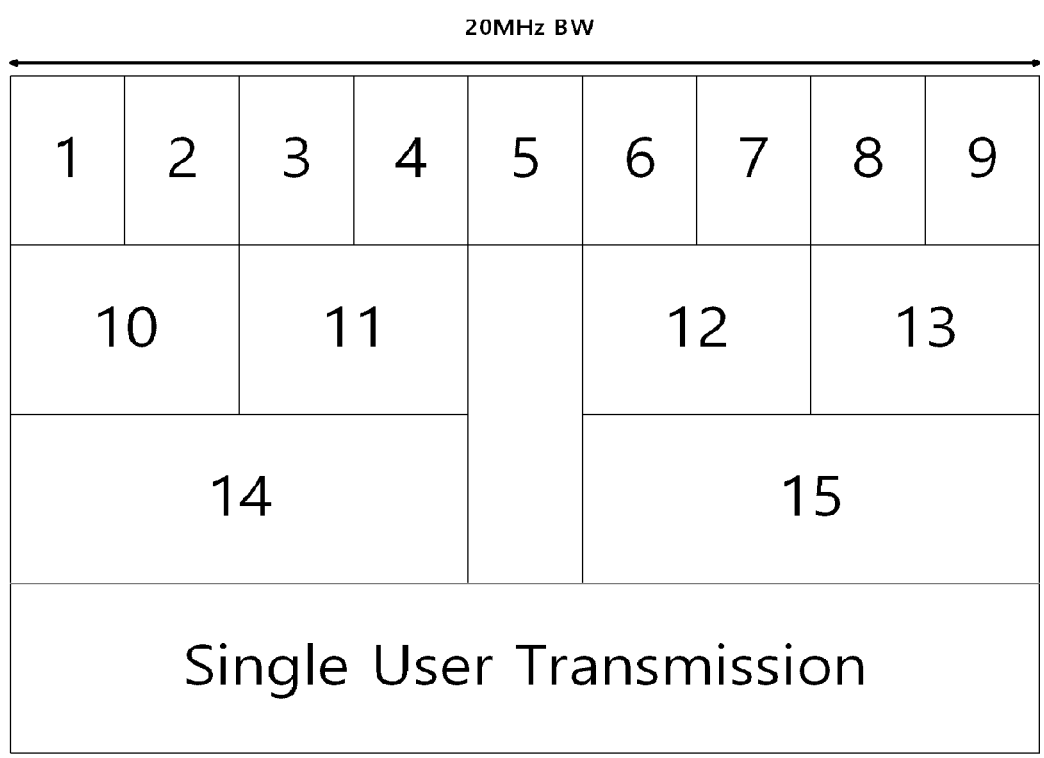
FIG. 12 is a view illustrating a sub-channel index in a frequency band of 20 MHz according to another embodiment of the present invention.

FIG. 12 is a view illustrating a sub-channel index in a frequency band of 20 MHz according to another embodiment of the present invention.

In a specific embodiment, the first wireless communication terminal and the second wireless communication terminal may divide a frequency hand having a minimum unit frequency bandwidth into nine sub-bands. The minimum unit frequency bandwidth may be 20 MHz. The first wireless communication terminal and the second wireless communication terminal may use the fifteen sub-channels as shown in FIG. 12 by combining eight sub-bands with adjacent sub-bands except for the fifth frequency sub-band. Except when all the minimum unit frequency bands are used, if the case that channel vector information is indicated using a group identifier is included, the total number of sub-channels is 15. In addition, the sub-channel index should cover the case that the second wireless communication terminal is included in the corresponding group but does not receive a sub-channel. Therefore, the number of cases that the sub-channel index should display is 16 in total. Therefore, the sub-channel index may be represented by a 4-bit field.

Figure 13:
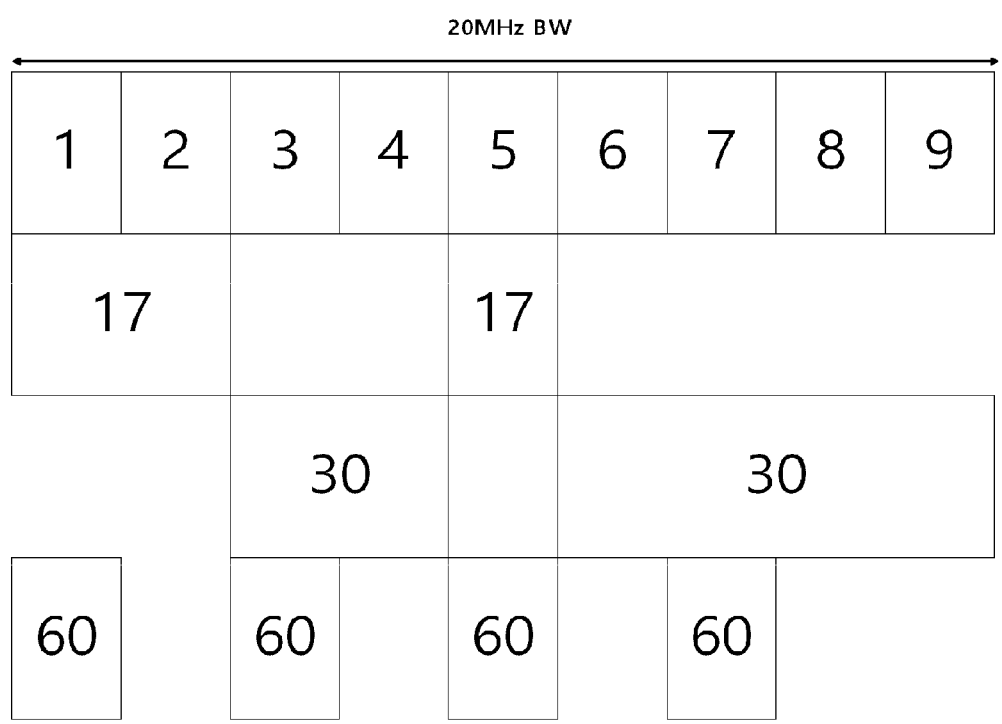
FIG. 13 is a view illustrating a sub-channel index in a frequency band of 20 MHz including a combination of non-contiguous sub-bands according to another embodiment of the present invention.

FIG. 13 is a view illustrating a sub-channel index in a frequency band of 20 MHz including a combination of non-contiguous sub-bands according to another embodiment of the present invention.

In a specific embodiment, the first wireless communication terminal and the second wireless communication terminal may divide a frequency band having a minimum unit frequency bandwidth into nine sub-bands. The minimum unit frequency bandwidth may be 20 MHz. The first wireless communication terminal and the second wireless communication terminal may combine the nine sub-bands without restriction and use them as a sub-channel. Specifically, the first wireless communication terminal and the second wireless communication terminal may combine non-continuous sub-bands and use them as one sub-channel. For example, as shown in FIG. 13, the sub-channel index 17 represents a frequency band obtained by combining frequency bands indicated by the sub-channel index 1, the sub-channel index 2, and the sub-channel index 5. In such a case, since the number of cases that a sub-channel index should represent is 16 or more, the sub-channel index may be represented by a field of 5 bits or more.

The preamble of a signal transmitted from the first wireless communication terminal to the second wireless communication terminal may include sub-channel or sub-carrier allocation information. In a specific embodiment, the preamble of a signal transmitted from the first wireless communication terminal to the second wireless communication terminal may include sub-channel index information. Through this, the second wireless communication terminal may decode the preamble signal transmitted from the first wireless communication terminal and obtain information on the sub-channel allocated to the second wireless communication terminal. In a specific embodiment, the preamble of a signal transmitted from the first wireless communication terminal to the second wireless communication terminal may include sub-channel index information in at least one of SIG-A, SIG-B, and SIG-C. The specific format of sub-channel information included in the preamble of a signal transmitted from the first wireless communication terminal to the second wireless communication terminal will be described with reference to FIGS. 14 to 18.

Figure 14:
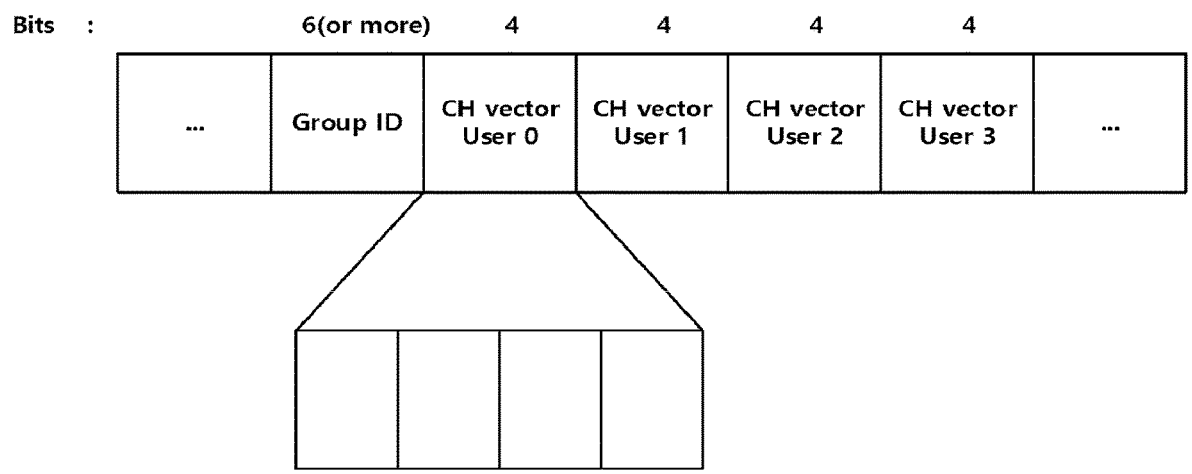
FIG. 14 is a view illustrating a preamble including sub-channel information according to an embodiment of the present invention.

FIG. 14 is a view illustrating a preamble including sub-channel information according to an embodiment of the present invention.

As described above, the channel vector information included in the poll frame may include channel allocation information by each group unit of the second wireless communication terminal including a plurality of second wireless communication terminals, instead of the second wireless communication terminal unit. At this time, the sub-channel information included in the preamble of a signal transmitted from the first wireless communication terminal to the second wireless communication terminal may include the group identifier of a group including the second wireless communication terminal to which the sub-channel is allocated.

In addition, the sub-channel information may include information indicating a sub-channel allocated to the second wireless communication terminal. At this time, the information indicating the sub-channel may be a sub-channel index indicating the sub-channel.

In a specific embodiment, the format of the sub-channel information included in the preamble may be one as shown in FIG. 14. Specifically, the sub-channel information may include a Group ID field indicating a group identifier. In a specific embodiment, the Group ID field may be a field of 6 bits or more. For example, when the maximum number of second wireless communication terminals connected to one first wireless communication terminal is 4, the Group ID field may be a 6-bit field. In addition, when the maximum number of second wireless communication terminals connected to one first wireless communication terminal is more than 4, the Group ID field may be a field of more than 6 bits.

In addition, the sub-channel information may include a CH vector field indicating a sub-channel allocated to the second wireless communication terminal. In a specific embodiment, the CH vector field may indicate that no sub-channel is allocated to the second wireless communication terminal corresponding to the CH vector field. In such a case, the value of the CH vector field corresponding to the second wireless communication terminal not participating in the transmission with the first wireless communication may be zero. In a specific embodiment, the CH vector field may be a 4-bit field. At present, Multi User-Multi Input and Multi Output (MU-MIMO) allows the simultaneous connection of a total of four wireless communication terminals to the first wireless communication terminal. Thus, the sub-channel information may include four CH vector fields. In addition, when the number of second wireless communication terminals that simultaneously access the first wireless communication terminal allowed by MU-MIMO is increased, the number of the CH vector fields may be increased In addition, the order of the second wireless communication terminal corresponding to the CH vector field may follow the order of the second wireless communication terminal identifier in the channel vector information included in the above-described poll frame. Therefore, the second wireless communication terminal may obtain the sub-channel information corresponding to the second wireless communication terminal itself based on the order of the second wireless communication terminal identifier of the channel vector information included in the poll frame.

Figure 15:
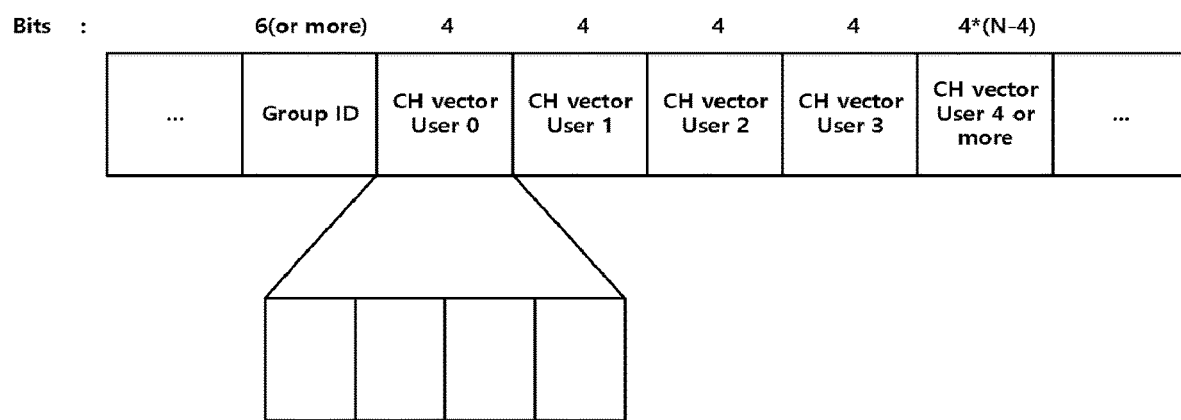
FIG. 15 is a view illustrating a preamble including sub-channel information according to another embodiment of the present invention.

FIG. 15 is a view illustrating a preamble including sub-channel information according to another embodiment of the present invention.

In preparation for the case that the number of second wireless communication terminals connected to one first wireless communication terminal at the same time is increased, the number of CH vector fields may not be limited as shown in FIG. 15.

Figure 16:
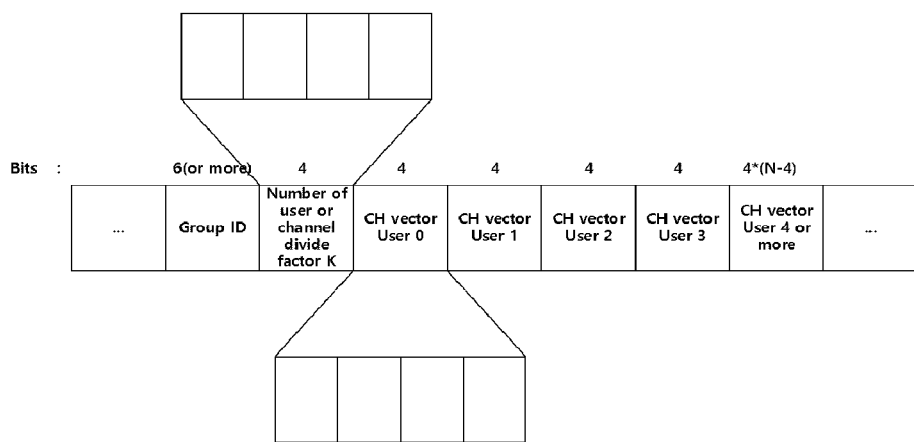
FIG. 16 is a view illustrating a preamble including sub-channel information according to another embodiment of the present invention.

FIG. 16 is a view illustrating a preamble including sub-channel information according to another embodiment of the present invention.

As described with reference to FIG. 15, when the number of CH vector fields is not limited, the second wireless communication terminal has to continuously decode a variable signal without knowing the number of CH vector fields. To solve this problem, the sub-channel information of the preamble included in a signal transmitted from the first wireless communication terminal to the second wireless communication terminal may include information indicating the number of the second wireless communication terminals to which the sub-channel is allocated. In another specific embodiment, if one second wireless communication terminal is allocated per one sub-channel, the sub-channel information may include the number of allocated sub-channels.

In a specific embodiment, the sub-channel information may include a Number of User field indicating the number of second wireless communication terminals to which a sub-channel is allocated, as in the embodiment of FIG. 16. At this time, the Number of User field may be a 4-bit field.

In another specific embodiment, the sub-channel information may include a Channel divide factor field indicating the number of allocated sub-channels, as in the embodiment of FIG. 16. At this time, the Channel divide factor field may be a 4-bit field.

Through such an embodiment, the second wireless communication terminal may accurately recognize the size of a preamble to be decoded.

Figure 17:
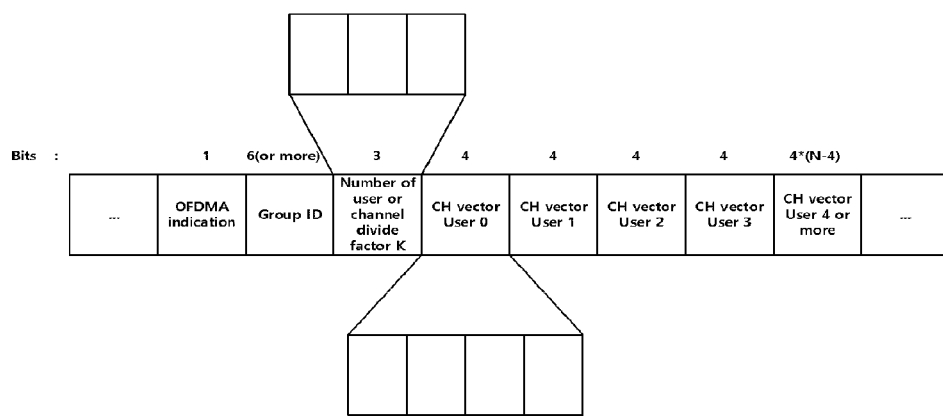
FIG. 17 is a view illustrating a preamble including sub-channel information according to another embodiment of the present invention.

FIG. 17 is a view illustrating a preamble including sub-channel information according to another embodiment of the present invention.

According to the above-described embodiment, even if a sub-channel is not allocated, the second wireless communication terminal should decode all the sub-channel information to determine whether the sub-channel is allocated. In order to prevent this, the sub-channel information included in the preamble of a signal transmitted from the first wireless communication terminal to the second wireless communication terminal may include information indicating whether the OFDMA communication using the sub-channel is used or not.

In a specific embodiment, the sub-channel information may include an OFDMA Indication field indicating whether to use OFDMA communication using a sub-channel, as in the embodiment of FIG. 17. In a specific embodiment, the OFDMA Indication field may be a 1-bit flag. For example, if the value of the OFDMA Indication field is 1, the OFDMA Indication field may indicate that the first wireless communication terminal allocates a sub-channel to the second wireless communication terminal for OFDMA communication using the sub-channel.

When the OFDMA Indication field is a 1-bit flag, the Number of User field described above may be a 3-bit field. Also, if the value indicated by the Number of User field is N, it may indicate that a sub-channel is allocated to the N-2 second wireless communication terminal. The reason why the sub-channel is allocated to the N-2 second wireless communication terminals instead of the N second wireless communication terminals is that the sub channel is allocated to two or more second wireless communication terminals when OFDMA communication using the sub-channel is used.

Figure 18:
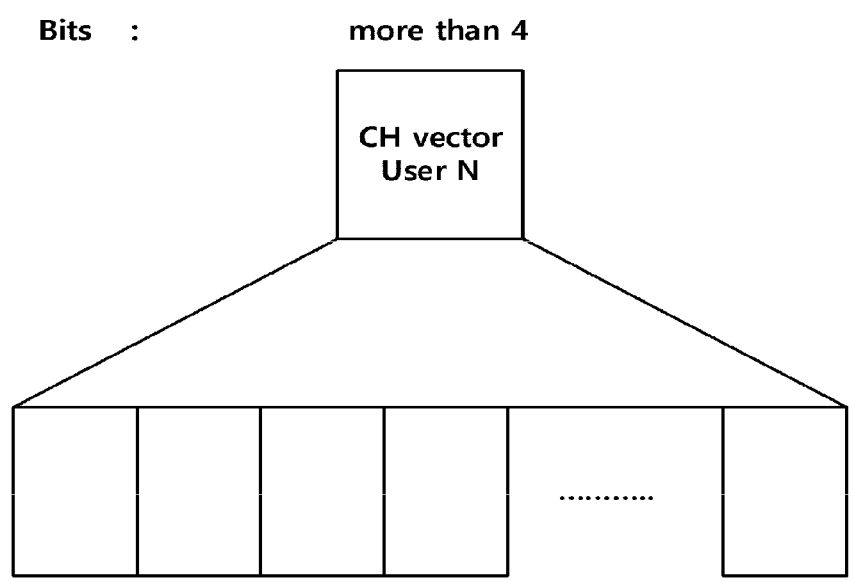
FIG. 18 is a view illustrating a CH vector field indicating a combination of non-contiguous sub-band channels according to another embodiment of the present invention.

FIG. 18 is a view illustrating a CH vector field indicating a combination of non-contiguous sub-band channels according to another embodiment of the present invention.

In the above-described specific embodiment, it is described that the CH vector field included in the sub-channel information may be 4 bits. However, when a sub-channel indicating a combination of non-contiguous sub-bands is supported, the number of sub-channels is increased, so that the CH vector field may be a field of 5 bits or more.

In a specific embodiment, the channel vector information may indicate that the second wireless communication terminal randomly accesses within a predetermined channel range. At this time, the second wireless communication terminal may attempt to access randomly within a specified channel range. If the second wireless communication terminal fails in transmission due to a collision with another wireless communication terminal at the time of random access, the second wireless communication terminal may try to access again.

It is described with reference to FIGS. 6 to 18 that frequency channel information allocated to each of the plurality of second wireless communication terminals is signaled for OFDMA communication between the first wireless communication terminal and the plurality of second wireless communication terminals. It is described with reference to FIGS. 19 to 30 that the first wireless communication terminal transmits data to the plurality of second wireless communication terminals at the same time.

When a wireless communication terminal performs one-to-one communication, it guarantees a Transmit Opportunity (TXOP) using a Ready To Send (RTS) frame indicating that it is ready for transmission and a Clear To Send (CTS) frame indicating that it is ready for reception. However, since the legacy RTS frame and the CTS frame are for one-to-one communication, a wireless communication terminal for transmitting data and a wireless communication terminal for receiving the data are limited to one. Therefore, there is a need for a new TXOP reserving method for a case in which any one wireless communication terminal simultaneously transmits data to a plurality of wireless communication terminals using OFDMA. This will be described with reference to FIGS. 19 to 29.

Figure 19:
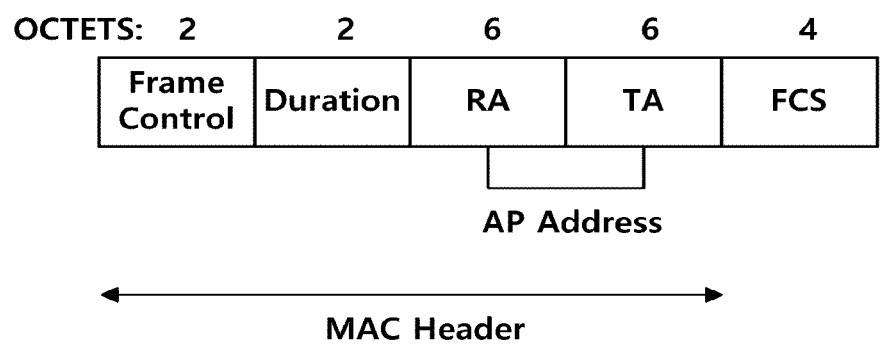
FIG. 19 is a view illustrating a structure of an RTS-to-Self frame according to an embodiment of the present invention.

FIG. 19 is a view illustrating a structure of an RTS-to-Self frame according to an embodiment of the present invention.

A first wireless communication terminal may transmit a frame for notifying a plurality of second wireless communication terminals that a transmission to the plurality of second wireless communication terminals starts. At this time, a frame for notifying that a transmission to a plurality of second wireless communication terminals starts may be modified by using an RTS frame.

The RTS frame includes a frame control field indicating information on frame control, a duration field indicating a value for updating a value of a network allocation vector (NAV), an RA field indicating the address of a wireless communication terminal that receives data, a TA field indicating the address of a wireless communication terminal that transmits data, and an FCS field including a cyclic redundancy check (CRC) value for error detection.

In order to notify that the transmission to the plurality of second wireless communication terminals starts, the first wireless communication terminal may set the value of the RA field and the value of the TA field in the RTS frame to its own address. For convenience of description, the RTS frame set in this manner is referred to as an RTS-to-Self frame. The first wireless communication terminal may transmit the RTS-to-Self frame through a plurality of channels. Specifically, the first wireless communication terminal may transmit the RTS-to-Self frame to the plurality of second wireless communication terminals in a BSS through a plurality of channels. Also, the first wireless communication terminal may set the value of the duration field based on the transmission time of the RTS-to-Self frame and the data transmission time for the plurality of second wireless communication terminals. Specifically, the first wireless communication terminal may set the value of the duration field to the sum of the transmission time of an RTS-to-Self frame, a short inter-frame space (SIFS) defined in the 802.11 standard, the transmission time of a poll frame, an SIFS, the transmission time of a CTS frame, an SIFS, a data transmission time, an SIFS, and the transmission time of an ACK frame.

At this time, when receiving the RTS-to-Self frame, a wireless communication terminal supporting an embodiment of the present invention receives a signal transmitted by the second wireless communication terminal until channel allocation information is checked. Also, a wireless communication terminal that does not support an embodiment of the present invention stops accessing to a channel and waits due to the duration field value of the RTS-to-Self frame. Accordingly, the first wireless communication terminal may secure a TXOP from both a wireless communication terminal supporting an embodiment of the present invention and a wireless communication terminal not supporting an embodiment of the present invention through the RTS-to-Self frame. A specific operation in which the first wireless communication terminal transmits data to the plurality of second wireless communication terminals using the RTS-to-Self frame will be described with reference to FIGS. 20 to 29.

Figure 20:
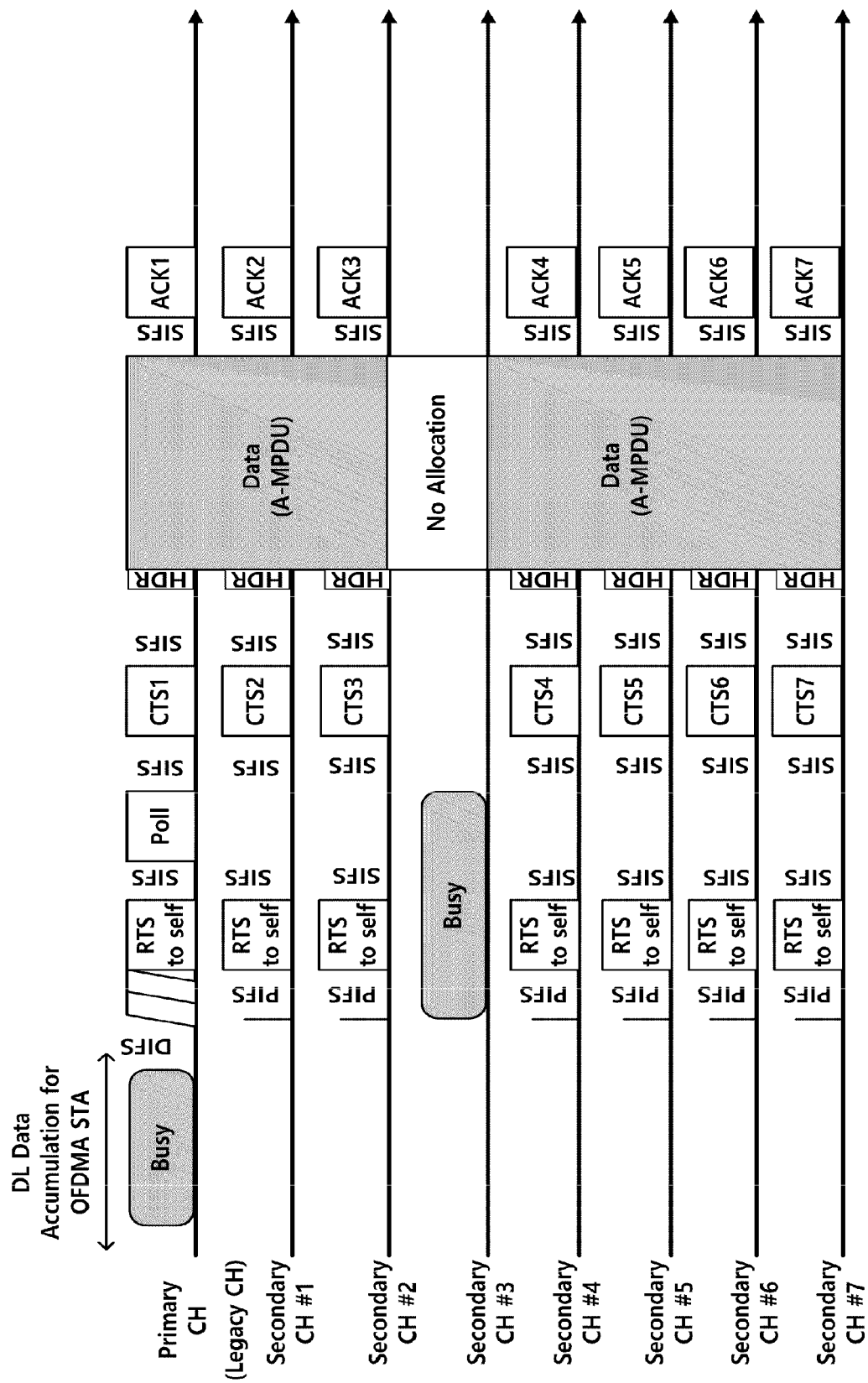
FIG. 20 is a view illustrating that an access point according to an embodiment of the present invention simultaneously transmits data to a plurality of stations using an RTS-to-Self frame.

FIG. 20 is a view illustrating that an access point according to an embodiment of the present invention simultaneously transmits data to a plurality of stations using an RTS-to-Self frame.

If a channel is in an idle state for a predetermined time, the first wireless communication terminal transmits an RTS-to-Self frame to a plurality of channels after waiting for a random value within a contention window value. Specifically, if a channel is in an idle state for a predetermined time, the first wireless communication terminal transmits an RTS-to-Self frame to a plurality of wireless communication terminals in a BSS after waiting for a random value within a contention window value. At this time, the first wireless communication terminal may transmit an RTS-to-Self frame to a plurality of idle channels other than a busy channel being currently used by another user. At this point, the predetermined time may be an Arbitration Inter-Frame Space (AIFS) or a Distributed Inter-Frame Space (DIFS) defined by the 802.11 standard.

The first wireless communication terminal transmits the above-described poll frame to the plurality of second wireless communication terminals. Specifically, the first wireless communication terminal may transmit the above-described poll frame to the plurality of second wireless communication terminals through one channel. In a specific embodiment, the first wireless communication terminal may transmit the above-described poll frame through a primary channel Primary CH after a predetermined time. At this time, the first wireless communication terminal may transmit a poll frame after a predetermined time. The predetermined time may be an SIFS.

The plurality of second wireless communication terminals receiving the poll frame obtain the channel vector information from the poll frame. Through this, the plurality of second wireless communication terminals may recognize the channel allocated to the plurality of second wireless communication terminals. In addition, as described above, the second wireless communication terminal may obtain the channel vector information based on the preamble of a communication signal.

The plurality of second wireless communication terminals transmit a CTS frame to the first wireless communication terminal based on the obtained channel vector information. Specifically, the plurality of second wireless communication terminals transmit the CTS frame through a channel allocated to each of the plurality of second wireless communication terminals. Specifically, after a predetermined time from the poll frame transmission, the plurality of second wireless communication terminals may transmit a CTS frame to the first wireless communication terminal. At this point, the predetermined time may be an SIFS.

The first wireless communication terminal transmits data to the plurality of second wireless communication terminals that transmit the CTS frame. Specifically, after a predetermined time from the CTS frame transmission, the first wireless communication terminal may transmit data to the plurality of second wireless communication terminals that transmit the CTS frame. At this point, the predetermined time may be an SIFS. Specifically, the first wireless communication terminal may transmit data to the plurality of second wireless communication terminals through a channel allocated to each of the plurality of second wireless communication terminals. The plurality of second wireless communication terminals that receive the data transmit the ACK frame to the first wireless communication terminal. Specifically, after a predetermined time, the plurality of second wireless communication terminals that receive the data may transmit the ACK frame to the first wireless communication terminal. At this point, the predetermined time may be an SIFS.

The first wireless communication terminal may simultaneously transmit data to the plurality of second wireless communication terminals using OFDMA. However, a frequency channel that the first wireless communication may use is limited. Therefore, the first wireless communication should efficiently allocate an available frequency channel and transmit the data. In addition, the size of data that the first wireless communication terminal transmits to the plurality of second wireless communication terminals at the same time may be all different. Therefore, it may be inefficient to allocate frequency channels of the same size to all the second wireless communication terminals. When the first wireless communication terminal aggregates data to be transmitted to the plurality of second wireless communication terminals and transmits the aggregated data to the plurality of second wireless communication terminals at the same time by using all available frequency channels, it may use an available frequency without waste. Additionally, in such a case, the first wireless communication terminal is not required to perform a complicated operation for allocating a channel to each second wireless communication terminal. Accordingly, a data transmission method through an aggregate-MAC protocol data unit where a plurality of MAC protocol data units including data to be transmitted to a plurality of second wireless communication terminals are aggregated is required. At this point, an aggregate-MAC protocol data unit for transmitting data to a plurality of second wireless communication terminals at the same time is different from a legacy aggregate-MAC protocol data unit (A-MPDU) that aggregates MPDUs to be transmitted to the same address and transmits the MPDUs. Accordingly, an aggregate-MAC protocol data unit for transmitting data to a plurality of second wireless communication terminals at the same time is referred to as plural terminal A-MPDUs or plural station A-MPDUs.

Also, the first wireless communication terminal may transmit the headers of plural terminal A-MPDUs, which respectively correspond to the plurality of second wireless communication terminals, to the plurality of second wireless communication terminals through a channel allocated to each of the plurality of second wireless communication terminals. The header signals information in the plural terminal A-MPDUs. In particular, the header may include the address of the second wireless communication terminal corresponding to the header. In addition, the header may include information indicating a position of data corresponding to each of the plurality of second wireless communication terminals. For convenience of description, this information is referred to as start point vector information. The start point vector information may include at least one of a time and a channel through which the second wireless communication terminal receives data. Also, the start point vector information may be located after the legacy MPDU header. In such a case, a wireless communication terminal not supporting an embodiment of the present invention treats the header like a payload. Also, a wireless communication terminal not supporting an embodiment of the present invention may know that another wireless communication terminal is using the corresponding channel through the header. And, a wireless communication terminal not supporting an embodiment of the present invention updates the TXOP based on the value of the duration field included in the header. Through this, compatibility with a wireless communication terminal that does not support an embodiment of the present invention may be achieved.

If a channel is in an idle state for a DIFS in an embodiment of FIG. 20, an access point transmits the RTS-to-Self frame to a plurality of channels after waiting for a random value within a contention window value. In a specific embodiment, if a channel is in an idle state for an AIFS, an access point may transmit the RTS-to-Self frame to a plurality of channels after waiting for a random value within a contention window value. Specifically, the access point transmits an RTS-to-Self frame to a plurality of stations in a BSS through the primary channel Primary CH, the first secondary channel Secondary CH #1, the second secondary channel Secondary CH #2, the fourth secondary channel Secondary CH #4, the fifth secondary channel Secondary CH #5, the sixth secondary channel Secondary CH #6, and the seventh secondary channel Secondary CH #7, each of which is in an idle state.

The access point transmits a poll frame to a plurality of stations. Specifically, the access point transmits a poll frame to a plurality of stations through the primary channel Primary CH.

The plurality of stations receiving the poll frame obtain the channel vector information from the poll frame.

The plurality of stations transmit a CTS frame to the first wireless communication terminal based on the obtained channel vector information. Specifically, each of the first station to the seventh station transmits a CTS frame through the primary channel Primary CH, the first secondary channel Secondary CH #1, the second secondary channel Secondary CH #2, the fourth secondary channel Secondary CH #4, the fifth secondary channel Secondary CH #5, the sixth secondary channel Secondary CH #6, and the seventh secondary channel Secondary CH #7.

The access point transmits plural terminal A-MPDUs to a plurality of stations that transmit the CTS frame. Specifically, the access point transmits plural terminal A-MPDUs to each of the first station to the seventh station through the primary channel Primary CH, the first secondary channel Secondary CH #1, the second secondary channel Secondary CH #2, the fourth secondary channel Secondary CH #4, the fifth secondary channel Secondary CH #5, the sixth secondary channel Secondary CH #6, and the seventh secondary channel Secondary CH #7. At this time, the access point transmits a header to the first station through the primary channel Primary CH, transmits a header to the second station through the first secondary channel Secondary CH #1, transmits a header to the third station through the second secondary channel Secondary CH #2, transmits a header to the fourth station through the fourth secondary channel Secondary CH #4, transmits a header to the fifth station through the fifth secondary channel Secondary CH #5, transmits a header to the sixth station through the sixth secondary channel Secondary CH #1, and transmits a header to the seventh station through the seventh secondary channel Secondary CH #7.

The plurality of stations receiving the plural terminal A-MPDUs transmit an ACK frame to the access point. Specifically, the first station to the seventh station transmit an ACK frame through the primary channel Primary CH, the first secondary channel Secondary CH #1, the second secondary channel Secondary CH #2, the fourth secondary channel Secondary CH #4, the fifth secondary channel Secondary CH #5, the sixth secondary channel Secondary CH #6, and the seventh secondary channel Secondary CH #7.

Figure 21:
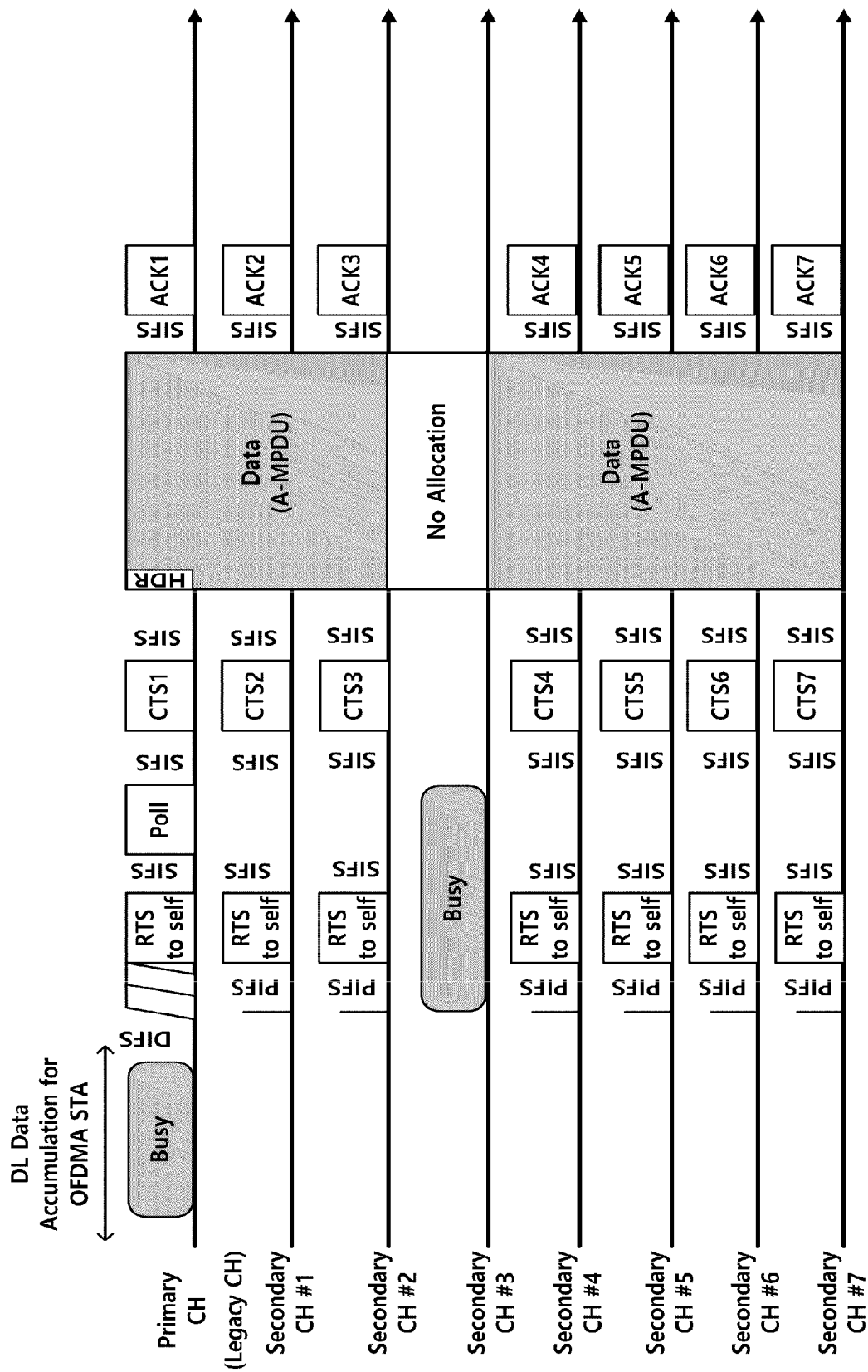
FIG. 21 is a view illustrating that an access point according to another embodiment of the present invention simultaneously transmits data to a plurality of stations using an RTS-to-Self frame.

FIG. 21 is a view illustrating that an access point according to another embodiment of the present invention simultaneously transmits data to a plurality of stations using an RTS-to-Self frame.

In the above-described embodiment, the first wireless communication terminal may transmit the headers of plural terminal A-MPDUs, which respectively correspond to the plurality of second wireless communication terminals, to the plurality of second wireless communication terminals through a channel allocated to each second wireless communication terminal. In another specific embodiment, the second wireless communication terminal may transmit a header for a plurality of second wireless communication terminals receiving plural terminal A-MPDUs through any one channel. At this point, the one channel may be the primary channel. The header may include the above-described start point vector information. As described above, the start point vector information may include a time and a channel through which the second wireless communication terminal receives data. Also, the start point vector information may be located after the legacy MPDU header. The header may include all the addresses of the plurality of second wireless communication terminals receiving the plural terminal A-MPDUs. Therefore, in such an embodiment, it is impossible for a wireless communication terminal that does not support an embodiment of the present invention to recognize that a channel is used for the transmission of plural terminal A-MPDUs through a header.

If a channel is in an idle state for a DIFS in an embodiment of FIG. 21, an access point transmits the RTS-to-Self frame to a plurality of channels after waiting for a random value within a contention window value. In a specific embodiment, if a channel is in an idle state for an AIFS, an access point may transmit the RTS-to-Self frame to a plurality of channels after waiting for a random value within a contention window value. Specifically, the access point transmits an RTS-to-Self frame to a plurality of stations in a BSS through the primary channel Primary CH, the first secondary channel Secondary CH #1, the second secondary channel Secondary CH #2, the fourth secondary channel Secondary CH #4, the fifth secondary channel Secondary CH #5, the sixth secondary channel Secondary CH #6, and the seventh secondary channel Secondary CH #7, each of which is in an idle state.

The access point transmits a poll frame to a plurality of stations. Specifically, the access point transmits a poll frame to a plurality of stations through the primary channel Primary CH.

The plurality of stations receiving the poll frame obtain the channel vector information from the poll frame.

The plurality of stations transmit a CTS frame to the access point based on the obtained channel vector information. Specifically, each of the first station to the seventh station transmits a CTS frame to the access point through the primary channel Primary CH, the first secondary channel Secondary CH #1, the second secondary channel Secondary CH #2, the fourth secondary channel Secondary CH #4, the fifth secondary channel Secondary CH #5, the sixth secondary channel Secondary CH #6, and the seventh secondary channel Secondary CH #7.

The access point transmits plural terminal A-MPDUs to a plurality of stations that transmit the CTS frame. Specifically, the access point transmits plural terminal A-MPDUs to each of the first station to the seventh station through the primary channel Primary CH, the first secondary channel Secondary CH #1, the second secondary channel Secondary CH #2, the fourth secondary channel Secondary CH #4, the fifth secondary channel Secondary CH #5, the sixth secondary channel Secondary CH #6, and the seventh secondary channel Secondary CH #7. At this time, the access point transmits the headers of plural terminal A-MPDUs respectively corresponding to the plurality of stations through a channel allocated to each of the plurality of stations.

The plurality of stations receiving the plural terminal A-MPDUs transmit an ACK frame to the access point. Specifically, each of the first station to the seventh station transmits an ACK frame to the access point through the primary channel Primary CH, the first secondary channel Secondary CH #1, the second secondary channel Secondary CH #2, the fourth secondary channel Secondary CH #4, the fifth secondary channel Secondary CH #5, the sixth secondary channel Secondary CH #6, and the seventh secondary channel Secondary CH #7.

It is described with reference to FIGS. 22 to 25 that the first wireless communication terminal transmits data instead of plural terminal A-MPDUs to the plurality of second wireless communication terminals. At this time, the data may be in the form of an A-MPDU.

The first wireless communication terminal may transmit data asynchronously to the plurality of second wireless communication terminals. Specifically, the transmission times (i.e., data airtimes) of data transmitted from the first wireless communication terminal to the plurality of second wireless communication terminals may be different from each other. Further, the first wireless communication terminal may receive data asynchronously from the plurality of second wireless communication terminals. Specifically, the transmission times (i.e., data airtimes) of data transmitted from each of the plurality of second wireless communication terminals to the first wireless communication terminal may be different from each other. The amount of data to be transmitted to each of the plurality of second wireless communication terminals may be different. Therefore, when the first wireless communication terminal transmits data asynchronously to the plurality of second wireless communication terminals or asynchronously receives data from the plurality of second wireless communication terminals, it is possible to maximize the time that another wireless communication terminal uses a corresponding channel by reducing the usage time of the corresponding channel. In addition, the first wireless communication terminal does not need to perform separate data padding or data fragmentation for synchronization. Also, the first wireless communication terminal does not need to perform scheduling for synchronization. In such an embodiment, the first wireless communication terminal may receive an ACK frame from one second wireless communication terminal while transmitting data to another second wireless communication terminal. It will be described with reference to FIGS. 22 and 23 that the first wireless communication terminal transmits data to the plurality of second wireless communication terminals asynchronously.

Figure 22:
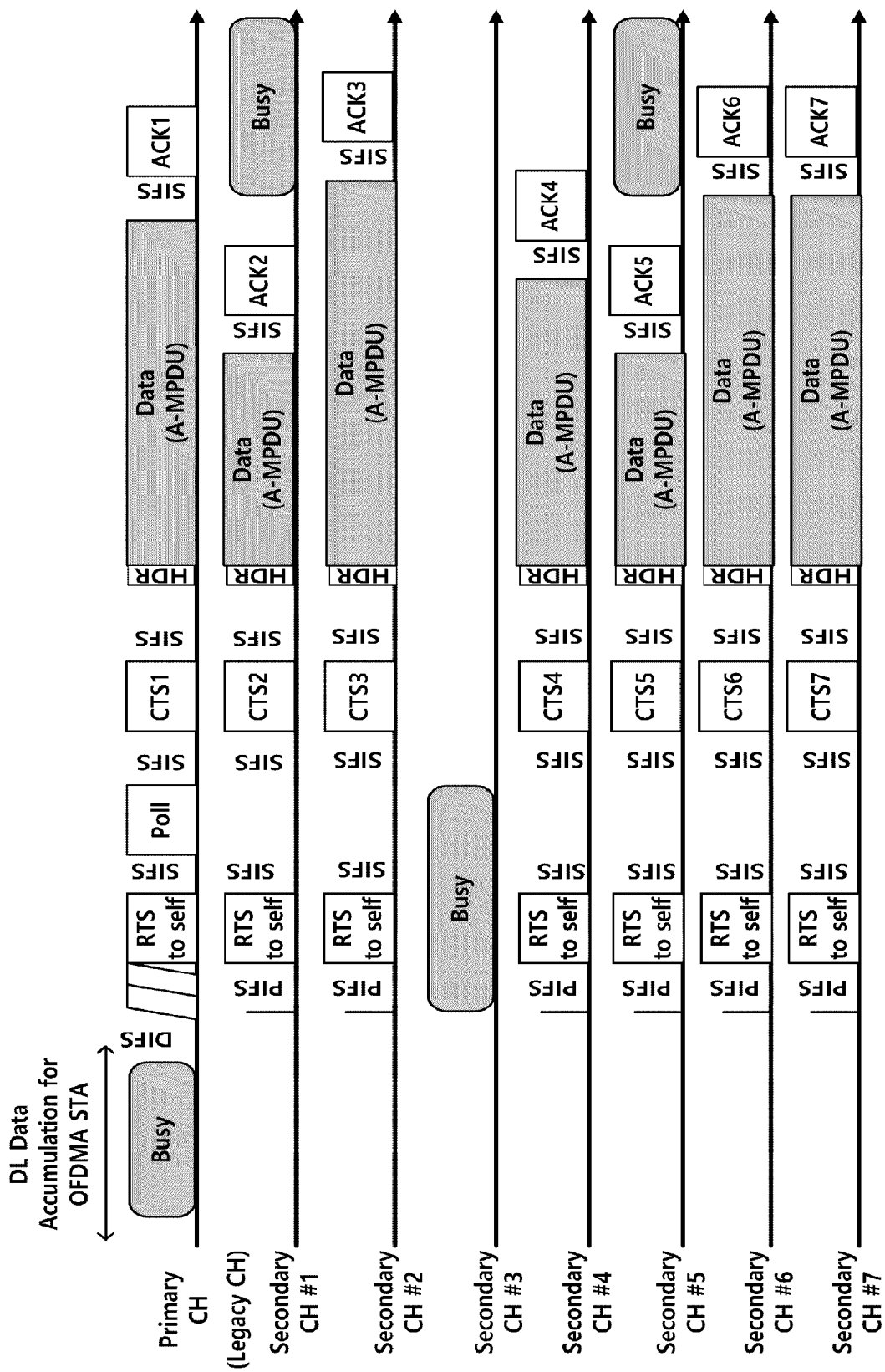
FIG. 22 is a view illustrating that an access point according to an embodiment of the present invention allocates one channel to each of a plurality of stations and asynchronously transmits data to the plurality of stations.

FIG. 22 is a view illustrating that an access point according to an embodiment of the present invention allocates one channel to each of a plurality of stations and asynchronously transmits data to the plurality of stations.

If a channel is in an idle state for a DIFS in an embodiment of FIG. 22, an access point transmits the RTS-to-Self frame to a plurality of channels after waiting for a random value within a contention window value. In a specific embodiment, if a channel is in an idle state for an AIFS, an access point may transmit the RTS-to-Self frame to a plurality of channels after waiting for a random value within a contention window value. Specifically, the access point transmits an RTS-to-Self frame to a plurality of stations in a BSS through the primary channel Primary CH, the first secondary channel Secondary CH #1, the second secondary channel Secondary CH #2, the fourth secondary channel Secondary CH #4, the fifth secondary channel Secondary CH #5, the sixth secondary channel Secondary CH #6, and the seventh secondary channel Secondary CH #7, each of which is in an idle state.

The access point transmits a poll frame to a plurality of stations. Specifically, the access point transmits a poll frame to a plurality of stations through the primary channel Primary CH. The access point notifies a station to participate in the transmission to the station of a corresponding BSS through the transmission of the poll frame.

The plurality of stations receiving the poll frame obtain the channel vector information from the poll frame. Through this, a plurality of stations participating in the transmission recognize the channel allocated to the plurality of stations themselves.

The plurality of stations transmit a CTS frame to the access point based on the obtained channel vector information. Specifically, each of the first station to the seventh station transmits a CTS frame to the access point through the primary channel Primary CH, the first secondary channel Secondary CH #1, the second secondary channel Secondary CH #2, the fourth secondary channel Secondary CH #4, the fifth secondary channel Secondary CH #5, the sixth secondary channel Secondary CH #6, and the seventh secondary channel Secondary CH #7. It is possible to solve a hidden terminal problem through the transmission of an A-RTS frame of an access point and the transmission of CTS frames of a plurality of stations.

The access point transmits data asynchronously to the plurality of stations that have transmitted the CTS frame. Specifically, the access point transmits data to each of the first station to the seventh station at different data transmission times through the primary channel Primary CH, the first secondary channel Secondary CH #1, the second secondary channel Secondary CH #2, the fourth secondary channel Secondary CH #4, the fifth secondary channel Secondary CH #5, the sixth secondary channel Secondary CH #6, and the seventh secondary channel Secondary CH #7.

The plurality of stations receiving the data asynchronously transmits the ACK frame to the access point. Specifically, each of the first station to the seventh station transmits an ACK frame to the access point at the same time through the primary channel Primary CH, the first secondary channel Secondary CH #1, the second secondary channel Secondary CH #2, the fourth secondary channel Secondary CH #4, the fifth secondary channel Secondary CH #5, the sixth secondary channel Secondary CH #6, and the seventh secondary channel Secondary CH #7.

Figure 23:
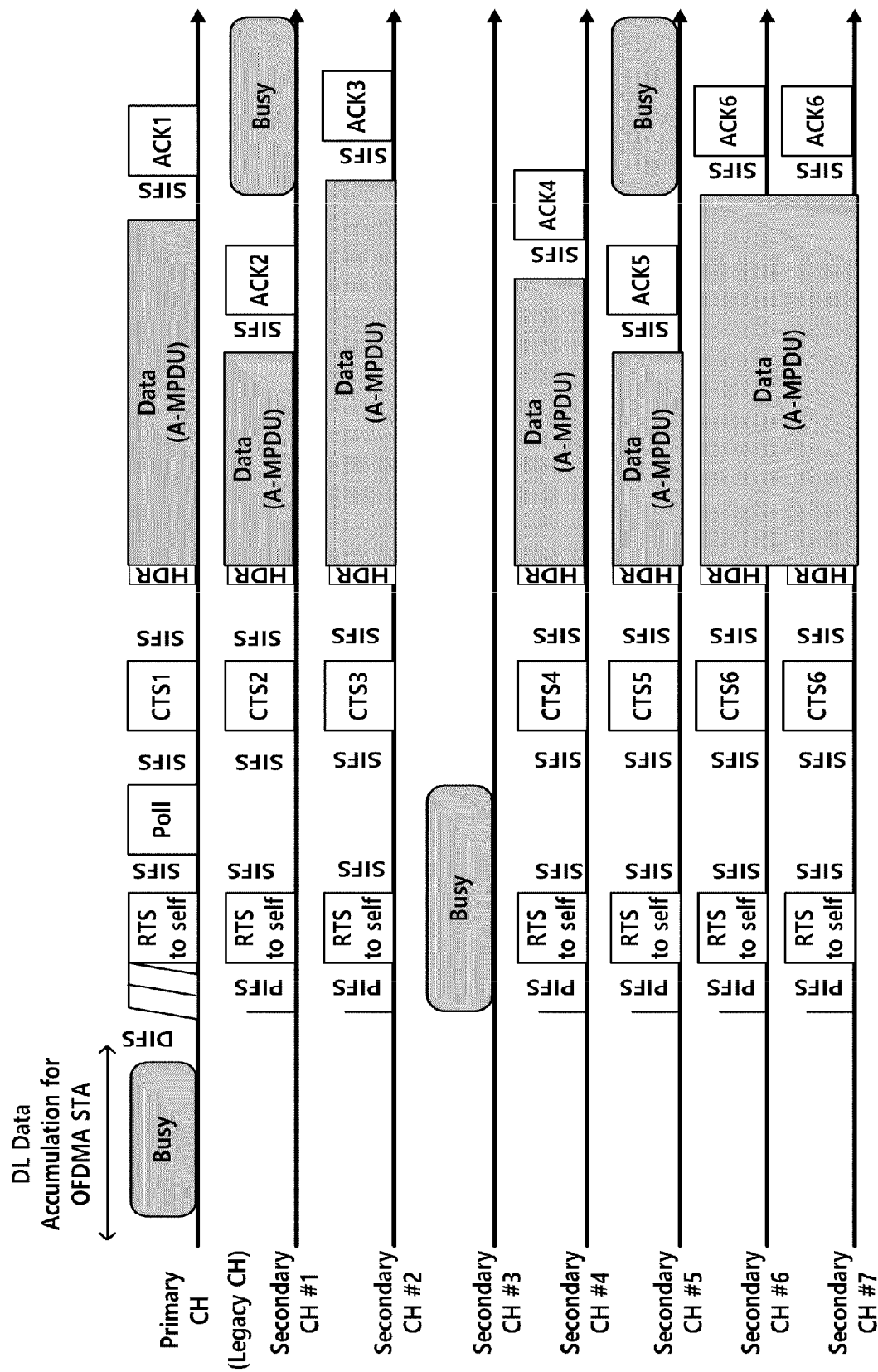
FIG. 23 is a view illustrating that an access point according to an embodiment of the present invention allocates one or more channels to each of a plurality of stations and asynchronously transmits data to the plurality of stations.

FIG. 23 is a view illustrating that an access point according to an embodiment of the present invention allocates one or more channels to each of a plurality of stations and asynchronously transmits data to the plurality of stations.

Although another operation in FIG. 23 is the same as that in FIG. 22, for the sixth station, the access point transmits data through the sixth secondary channel Secondary CH #6 and the seventh secondary channel Secondary CH #7. At this time, the sixth station recognize that the sixth secondary channel Secondary CH #6 and the seventh secondary channel Secondary CH #7 are allocated to itself through the poll frame. For such transmission, the sixth station transmits a CTS frame to each of the sixth secondary channel Secondary CH #6 and the seventh secondary channel Secondary CH #7. In addition, after receiving the data, the sixth station transmits an ACK frame to each of the sixth secondary channel Secondary CH #6 and the seventh secondary channel Secondary CH #7.

As described above, when the first wireless communication terminal transmits data asynchronously to the plurality of second wireless communication terminals and asynchronously receives data from the plurality of second wireless communication terminals, the first wireless communication terminal should transmit data to any one second wireless communication terminal and receive an ACK frame from another second wireless communication terminal at the same time. Additionally, in such a case, the operation of allocating, by the first wireless communication terminal, a channel to the second wireless communication terminal may become complicated. In order to solve such a problem, the first wireless communication terminal may transmit data synchronously to the plurality of second wireless communication terminals. Specifically, the transmission times (i.e., data airtimes) of data transmitted from the first wireless communication terminal to the plurality of second wireless communication terminals may be the same. In addition, the first wireless communication terminal may receive data synchronously from the plurality of second wireless communication terminals. Specifically, the transmission times (i.e., data airtimes) of data transmitted from each of the plurality of second wireless communication terminals to the first wireless communication terminal may be the same. For such synchronization, the first wireless communication terminal and the second wireless communication terminal may perform data padding or data fragmentation. Through this, the operation of allocating, by the first wireless communication terminal, a channel to the second wireless communication terminal may become simple.

Figure 24:
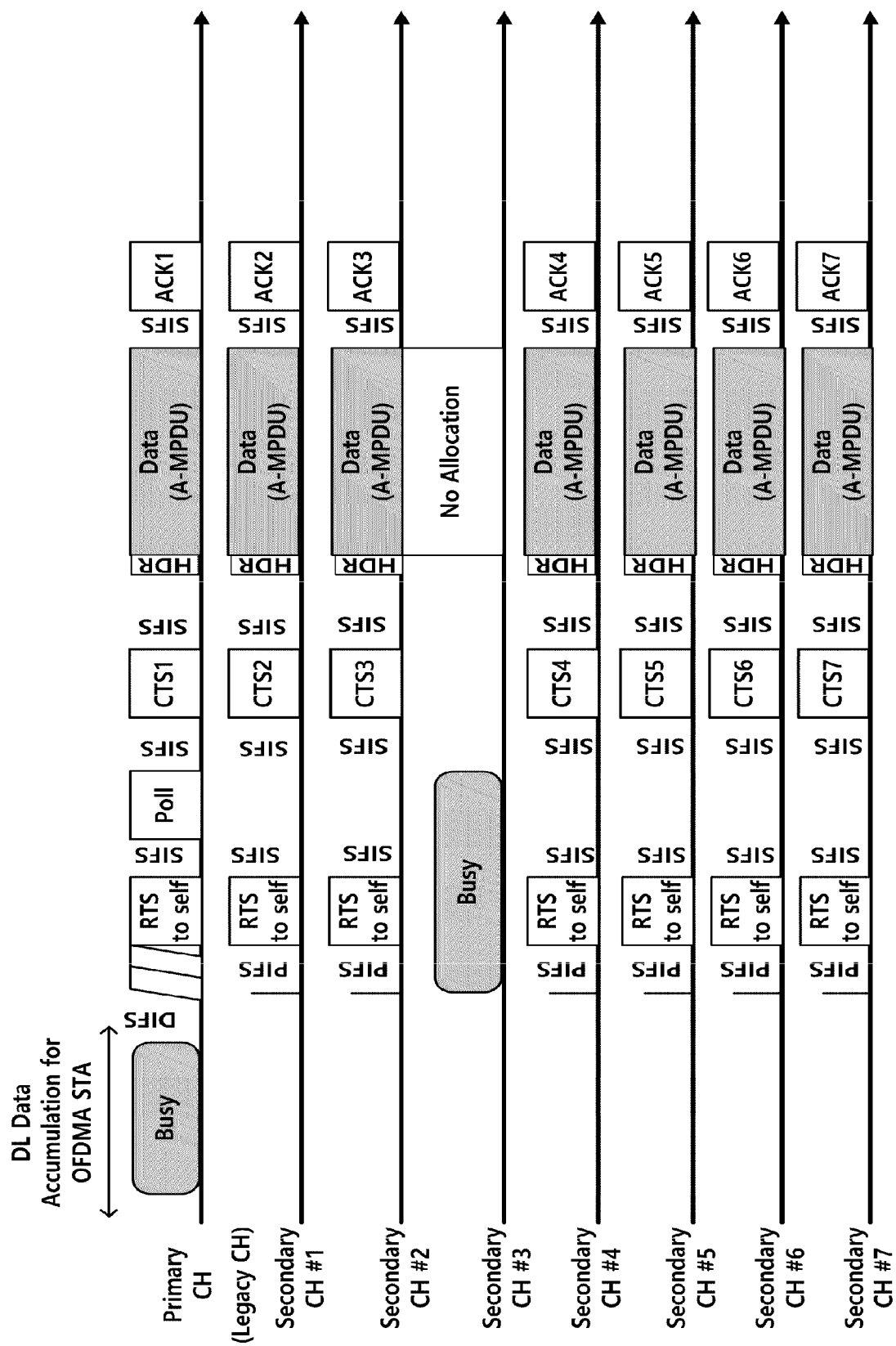
FIG. 24 is a view illustrating that an access point according to an embodiment of the present invention allocates one channel to each of a plurality of stations and synchronously transmits data to the plurality of stations.

FIG. 24 is a view illustrating that an access point according to an embodiment of the present invention allocates one channel to each of a plurality of stations and synchronously transmits data to the plurality of stations.

If a channel is in an idle state for a DIFS in an embodiment of FIG. 24, an access point transmits the RTS-to-Self frame to a plurality of channels after waiting for a random value within a contention window value. According to a specific embodiment, if a channel is in an idle state for an AIFS, an access point may transmit the RTS-to-Self frame to a plurality of channels after waiting for a random value within a contention window value. Specifically, the access point transmits an RTS-to-Self frame to a plurality of stations in a BSS through the primary channel Primary CH, the first secondary channel Secondary CH #1, the second secondary channel Secondary CH #2, the fourth secondary channel Secondary CH #4, the fifth secondary channel Secondary CH #5, the sixth secondary channel Secondary CH #6, and the seventh secondary channel Secondary CH #7, each of which is in an idle state.

The access point transmits a poll frame to a plurality of stations. Specifically, the access point transmits a poll frame to a plurality of stations through the primary channel Primary CH. The access point notifies a station to participate in the transmission to the station of a corresponding BSS through the transmission of the poll frame.

The plurality of stations receiving the poll frame obtain the channel vector information from the poll frame. Through this, a plurality of stations participating in the transmission recognize the channel allocated to the plurality of stations themselves.

The plurality of stations transmit a CTS frame to the access point based on the obtained channel vector information. Specifically, each of the first station to the seventh station transmits a CTS frame to the access point through the primary channel Primary CH, the first secondary channel Secondary CH #1, the second secondary channel Secondary CH #2, the fourth secondary channel Secondary CH #4, the fifth secondary channel Secondary CH #5, the sixth secondary channel Secondary CH #6, and the seventh secondary channel Secondary CH #7. It is possible to solve a hidden terminal problem through the transmission of an A-RTS frame of an access point and the transmission of CTS frames of a plurality of stations.

The access point transmits data synchronously to the plurality of stations that transmits the CTS frame. Specifically, the access point transmits data to each of the first station to the seventh station at the same data transmission time through the primary channel Primary CH, the first secondary channel Secondary CH #1, the second secondary channel Secondary CH #2, the fourth secondary channel Secondary CH #4, the fifth secondary channel Secondary CH #5, the sixth secondary channel Secondary CH #6, and the seventh secondary channel Secondary CH #7.

The plurality of stations receiving the data synchronously transmits the ACK frame to the access point. Specifically, each of the first station to the seventh station transmits an ACK frame to the access point at the same time through the primary channel Primary CH, the first secondary channel Secondary CH #1, the second secondary channel Secondary CH #2, the fourth secondary channel Secondary CH #4, the fifth secondary channel Secondary CH #5, the sixth secondary channel Secondary CH #6, and the seventh secondary channel Secondary CH #7.

Figure 25:
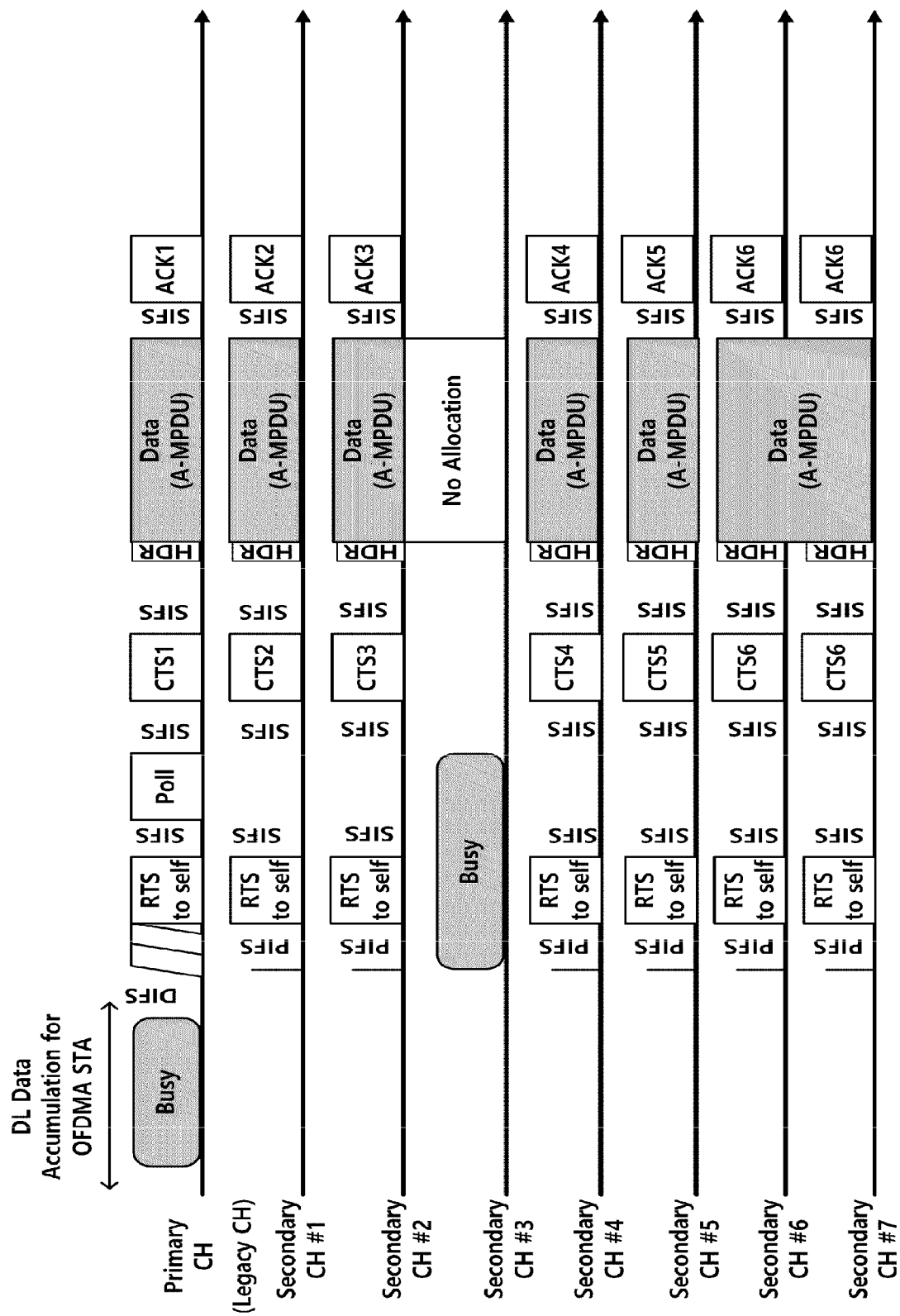
FIG. 25 is a view illustrating that an access point according to an embodiment of the present invention allocates one or more channels to each of a plurality of stations and synchronously transmits data to the plurality of stations.

FIG. 25 is a view illustrating that an access point according to an embodiment of the present invention allocates one or more channels to each of a plurality of stations and synchronously transmits data to the plurality of stations.

Although another operation in FIG. 25 is the same as that in FIG. 24, for the sixth station, the access point transmits data through the sixth secondary channel Secondary CH #6) and the seventh secondary channel Secondary CH #7. At this time, the sixth station recognizes that the sixth secondary channel Secondary CH #6 and the seventh secondary channel Secondary CH #7 are allocated to the sixth station through the poll frame. For such transmission, the sixth station transmits a CTS frame to each of the sixth secondary channel Secondary CH #6 and the seventh secondary channel Secondary CH #7. In addition, after receiving the data, the sixth station transmits an ACK frame to each of the sixth secondary channel Secondary CH #6 and the seventh secondary channel Secondary CH #7.

Through such an embodiment, the operation of the first wireless communication terminal to allocate a channel to the second wireless communication terminal may become simple. In addition, the first wireless communication terminal does not need to receive an ACK frame from one second wireless communication terminal while transmitting data to another second wireless communication terminal.

Figure 26:
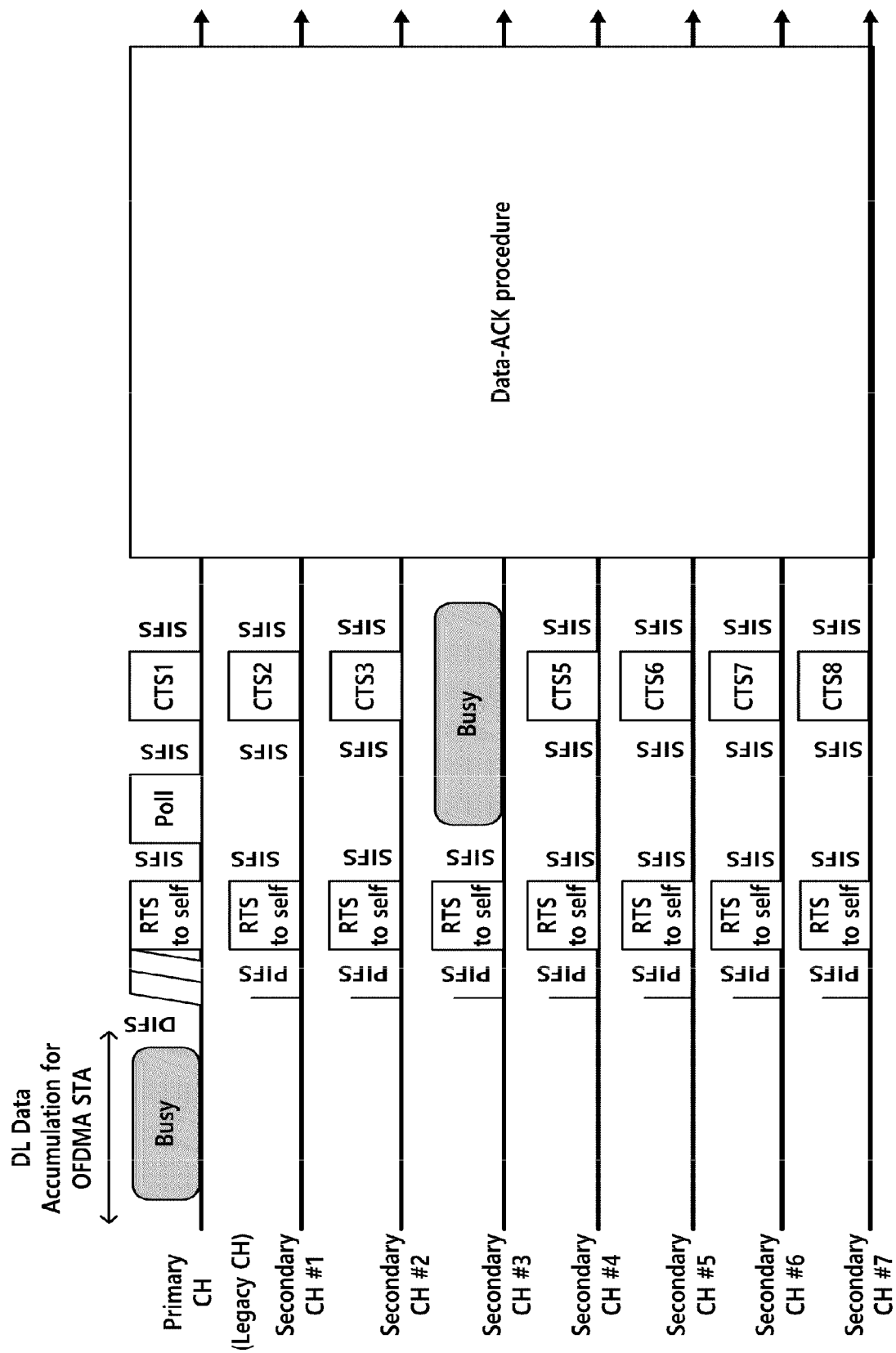
FIG. 26 is a view illustrating that an access point according to an embodiment of the present invention transmits data to a plurality of stations when not receiving a CTS frame from any one station.

FIG. 26 is a view illustrating that an access point according to an embodiment of the present invention transmits data to a plurality of stations when not receiving a CTS frame from any one station.

The first wireless communication terminal transmits data to the second wireless communication terminal that transmits the CTS frame. If even the second wireless communication terminal that receives a channel from a poll frame does not transmit a CTS frame, the first wireless communication terminal does not transmit data to a corresponding terminal. This may be applied to all of the data transmission embodiments using the above-described poll frame.

The embodiment of FIG. 26 shows that an access point according to an embodiment of the present invention transmits data to a plurality of stations when one station does not transmit a CTS frame by a hidden node.

If a channel is in an idle state for a DIFS in an embodiment of FIG. 26, an access point transmits the RTS-to-Self frame to a plurality of channels after waiting for a random value within a contention window value. According to a specific embodiment, if a channel is in an idle state for an AIFS, an access point may transmit the RTS-to-Self frame to a plurality of channels after waiting for a random value within a contention window value. Specifically, the access point transmits an RTS-to-Self frame to a plurality of stations in a BSS through the primary channel Primary CH, the first secondary channel Secondary CH #1, the second secondary channel Secondary CH #2, the third secondary channel Secondary CH #3, the fourth secondary channel Secondary CH #4, the fifth secondary channel Secondary CH #5, the sixth secondary channel Secondary CH #6, and the seventh secondary channel Secondary CH #7, each of which is in an idle state.

The access point transmits a poll frame to a plurality of stations. Specifically, the access point transmits a poll frame to a plurality of stations through the primary channel Primary CH. At this time, the access point allocates the primary channel Primary CH and the first secondary channel Secondary CH #1 to the seventh secondary channel Secondary CH #7 to the first station to the eighth station, respectively. The access point notifies a channel allocated to a plurality of stations to the station of a corresponding BSS through the transmission of the poll frame.

The plurality of stations receiving the poll frame obtain the channel vector information from the poll frame. Through this, a plurality of stations participating in the transmission recognize the channel allocated to the plurality of stations themselves.

The plurality of stations receiving the poll frame transmit a CTS frame to each of the plurality of stations through the allocated channel. Specifically, the fourth station whose allocated channel is not in an idle state does not transmit a CTS frame, and the first station to third station and the fifth station to the eighth station respectively transmit CTS frames to the access point through the primary channel Primary CH, the first secondary channel Secondary CH #1 and the second secondary channel Secondary CH #2, and the fourth secondary channel Secondary CH #4 to the seventh secondary channel Secondary CH #7.

The access point transmits data to the station that transmits the CTS frame. At this time, the access point may transmit data according to various embodiments described above.

In the above-described embodiment, the first wireless communication terminal may receive data from the plurality of second wireless communication terminals at the same time. However, when the first wireless communication terminal is not able to simultaneously receive data from the plurality of second wireless communication terminals, as in the above-described embodiments, the plurality of second wireless communication terminals may not simultaneously transmit CTS frames to the first wireless communication terminal. Therefore, in such a case, another method is required for the plurality of second wireless communication terminals to transmit CTS frames to the first wireless communication terminals.

Figure 27:
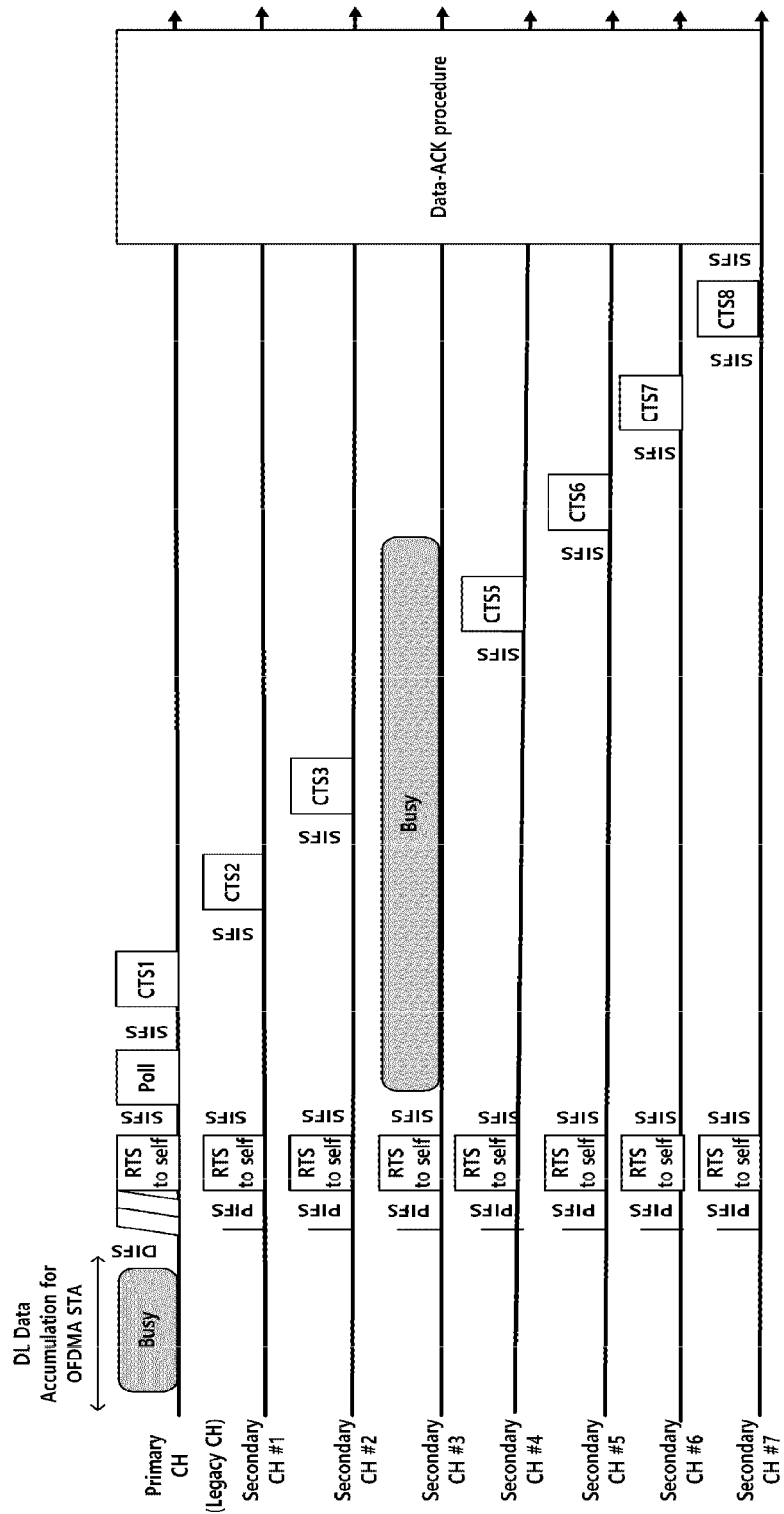
FIG. 27 is a view illustrating an operation of an access point to simultaneously transmit data to a plurality of stations when the access point is not able to simultaneously receive data from the plurality of stations according to another embodiment of the present invention.

FIG. 27 is a view illustrating an operation of an access point to simultaneously transmit data to a plurality of stations when the access point is not able to simultaneously receive data from the plurality of stations according to another embodiment of the present invention.

The plurality of second wireless communication terminals may sequentially transmit CTS frames to the first wireless communication terminal. At this time, the plurality of second wireless communication terminals may sequentially transmit CTS frames to the first wireless communication terminal at a predetermined time interval. Specifically, the second wireless communication terminal may wait for a time corresponding to an integer multiple of the sum of the transmission times of an SIFS and a CTS frame, and then transmit the CTS frame to the first wireless communication terminal. In addition, the plurality of second wireless communication terminals may sequentially transmit CTS frames to the first wireless communication terminal based on the poll frame. In a specific embodiment, the second wireless communication terminal may obtain the CTS frame transmission order specified to the second wireless communication terminal from the poll frame. Specifically, the arrangement order of the address of the second wireless communication terminal included in the poll frame may indicate the CTS frame transmission order of the corresponding second wireless communication terminal. At this time, a channel included with the address of the second wireless communication terminal of the poll frame may indicate a channel allocated to the second wireless communication terminal as described above.

In another specific embodiment, the number of second wireless communication terminals for simultaneously transmitting data to the first wireless communication terminal may be limited. In this case, after a predetermined number of the second wireless communication terminals among the plurality of second wireless communication terminals transmit CTS frames to the first wireless communication terminal, the remaining second wireless communication terminal may transmit the CTS frames to the first wireless communication terminal. At this time, the second wireless communication terminal may obtain from the poll frame the order in which the second wireless communication terminal transmits CTS frames to the first wireless communication terminal. Specifically, the arrangement order of the address of the second wireless communication terminal included in the CTS frame may indicate the order in which the corresponding second wireless communication terminal transmits the CTS frame.

If a channel is in an idle state for a DIFS in an embodiment of FIG. 27, an access point transmits the RTS-to-Self frame to a plurality of channels after waiting for a random value within a contention window value. According to a specific embodiment, if a channel is in an idle state for an AIFS, an access point may transmit the RTS-to-Self frame to a plurality of channels after waiting for a random value within a contention window value. Specifically, the access point transmits an RTS-to-Self frame to a plurality of stations in a BSS through the primary channel Primary CH, the first secondary channel Secondary CH #1, the second secondary channel Secondary CH #2, the fourth secondary channel Secondary CH #4, the fifth secondary channel Secondary CH #5, the sixth secondary channel Secondary CH #6, and the seventh secondary channel Secondary CH #7, each of which is in an idle state.

The access point transmits a poll frame to a plurality of stations. Specifically, the access point transmits a poll frame to a plurality of stations through the primary channel Primary CH. The access point notifies a channel allocated to a plurality of stations to the station of a corresponding BSS through the transmission of the poll frame.

The plurality of stations receiving the poll frame obtain the channel vector information from the poll frame. Through this, a plurality of stations participating in the transmission recognize the channel allocated to the plurality of stations themselves.

The plurality of stations sequentially transmit the CTS frame to the access point through the channel allocated to the plurality of stations the plurality of stations. Specifically, after receiving the poll frame and an SIFS elapses, the first station transmits the CTS frame to the access point through the primary channel Primary CH. After the first station transmits the CTS frame and an SIFS elapses, the second station transmits a CTS frame to the access point through the first secondary channel Secondary CH #1. After the second station transmits the CTS frame and an SIFS elapses, the third station transmits a CTS frame to the access point through the second secondary channel Secondary CH #2. After the third station transmits the CTS frame and an SIFS elapses, the fifth station transmits a CTS frame to the access point through the fourth secondary channel Secondary CH #4. After the fifth station transmits the CTS frame and an SIFS elapses, the sixth station transmits a CTS frame to the access point through the fifth secondary channel Secondary CH #5. After the sixth station transmits the CTS frame and an SIFS elapses, the seventh station transmits a CTS frame to the access point through the sixth secondary channel Secondary CH #6. After the seventh station transmits the CTS frame and an SIFS elapses, the eighth station transmits a CTS frame to the access point through the seventh secondary channel Secondary CH #7. At this time, each of the plurality of stations may obtain a CTS frame transmission order specified to the plurality of stations the plurality of stations based on the poll frame as described above. Specifically, the arrangement order of the address of a station included in the poll frame may indicate the CTS frame transmission order of the corresponding station.

The access point transmits data to the station that transmits the CTS frame. At this time, the access point may transmit data according to various embodiments described above.

In the above described embodiment, the second wireless communication terminal transmits the CTS frame to the first wireless communication terminal when a predetermined time elapses from the time when the first wireless communication terminal transmits the poll frame to the second wireless communication terminal. In a specific embodiment, the predetermined time may be an SIFS. If the second wireless communication terminal takes a long time to process the poll frame, the predetermined time may be longer than the SIFS. Specifically, the predetermined time may be a PCF inter-frame space (PIFS) defined in 802.11. For example, after a PIFS from the time when the first wireless communication terminal transmits the poll frame to the plurality of second wireless communication terminals, the plurality of second wireless communication terminals may transmit a CTS frame to the first wireless communication terminal.

Figure 28:
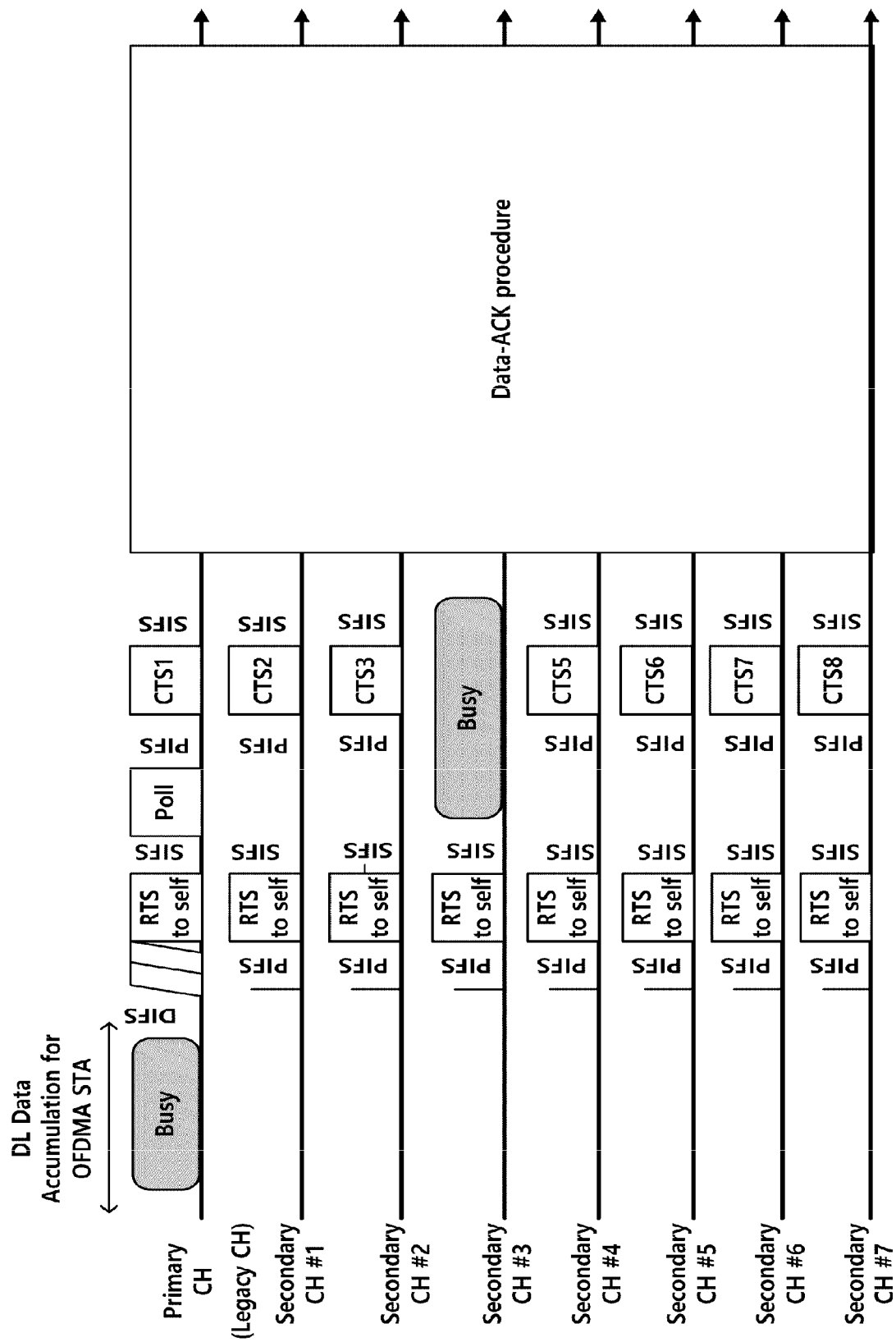
FIG. 28 is a view illustrating that when an access point according to an embodiment of the present invention transmits data to a plurality of stations, after a PIFS elapses from the time when the access point transmits a poll frame to the plurality of stations, the plurality of stations transmit a CTS frame to the access point.

FIG. 28 is a view illustrating that when an access point according to an embodiment of the present invention transmits data to a plurality of stations, after a PIFS from the time when the access point transmits a poll frame to the plurality of stations, the plurality of stations transmit a CTS frame to the access point.

If a channel is in an idle state for a DIFS in an embodiment of FIG. 28, an access point transmits the RTS-to-Self frame to a plurality of channels after waiting for a random value within a contention window value. According to a specific embodiment, if a channel is in an idle state for an AIFS, an access point may transmit the RTS-to-Self frame to a plurality of channels after waiting for a random value within a contention window value. Specifically, the access point transmits an RTS-to-Self frame to a plurality of stations in a BSS through the primary channel Primary CH, the first secondary channel Secondary CH #1, the second secondary channel Secondary CH #2, the fourth secondary channel Secondary CH #4, the fifth secondary channel Secondary CH #5, the sixth secondary channel Secondary CH #6, and the seventh secondary channel Secondary CH #7, each of which is in an idle state.

The access point transmits a poll frame to a plurality of stations. Specifically, the access point transmits a poll frame to a plurality of stations through the primary channel Primary CH. The access point notifies a channel allocated to a plurality of stations to the station of a corresponding BSS through the transmission of the poll frame.

The plurality of stations receiving the poll frame obtain the channel vector information from the poll frame. Through this, a plurality of stations participating in the transmission recognize the channel allocated to the plurality of stations themselves.

After a PIFS from the time when the access point transmits the poll frame, the plurality of stations transmit a CTS frame through the channel allocated to the plurality of stations themselves. The fourth station whose allocated channel is not in an idle state does not transmit a CTS frame. Each of the first station to the third station and the fifth station to the eighth station transmits a CTS frame to the access point through the primary channel Primary CH, the first secondary channel Secondary CH #1 and the second secondary channel Secondary CH #2, and the fourth secondary channel Secondary CH #4 to the seventh secondary channel Secondary CH #7.

The access point transmits data to the station that transmits the CTS frame. At this time, the access point may transmit data according to various embodiments described above.

In the above-described embodiment, the first wireless communication terminal transmits the RTS-to-Self frame to the second wireless communication terminal, and then transmits the poll frame. According to a specific embodiment, the first wireless communication terminal may transmit the poll frame and then transmit the RTS-to-Self frame. In such a case, the second wireless communication terminal may recognize that data is transmitted to the second wireless communication terminal before receiving the RTS-to-Self frame. In addition, at this time, the second wireless communication terminal may recognize the channel allocated to the second wireless communication terminal. Accordingly, the second wireless communication terminal has a sufficient time to prepare for CTS frame transmission to the first wireless communication terminal.

Figure 29:
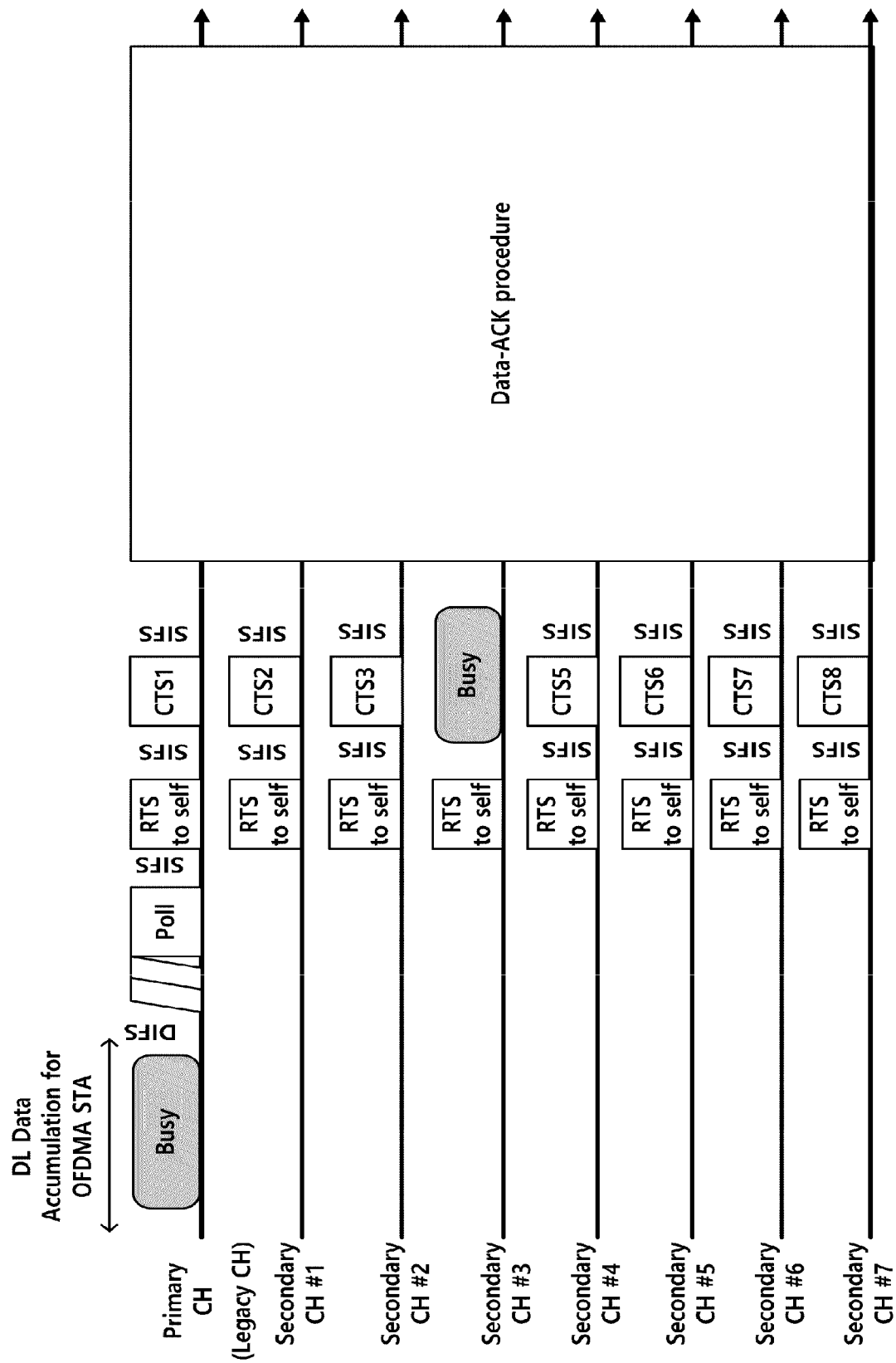
FIG. 29 is a view illustrating that an access point according to an embodiment of the present invention transmits a poll frame to a plurality of stations and transmits data after transmitting an RTS-to-Self frame.

FIG. 29 is a view illustrating that an access point according to an embodiment of the present invention transmits a poll frame to a plurality of stations and transmits data after transmitting an RTS-to-Self frame.

If a channel is in an idle state for a DIFS in an embodiment of FIG. 29, an access point transmits a poll frame to a plurality of stations after waiting for a random value within a contention window value. In a specific embodiment, if a channel is in an idle state for an AIFS, an access point may transmit the poll frame to a plurality of stations after waiting for a random value within a contention window value. Specifically, the access point transmits a poll frame to a plurality of stations through the primary channel Primary CH. The access point notifies a channel allocated to a plurality of stations to the station of a corresponding BSS through the transmission of the poll frame. In addition, the plurality of stations receiving the poll frame obtain the channel vector information from the poll frame. Through this, a plurality of stations participating in the transmission recognize the channel allocated to the plurality of stations themselves. Through this, before receiving the RTS-to-Self frame, the plurality of stations may know the data to be transmitted to them and the channel allocated to them. Through this, the plurality of stations may prepare for the transmission of a CTS frame in advance.

The access point transmits the RTS-to-Self frame through a plurality of channels. Specifically, the access point transmits an RTS-to-Self frame to a plurality of stations in a BSS through the primary channel Primary CH, the first secondary channel Secondary CH #1, the second secondary channel Secondary CH #2, the fourth secondary channel Secondary CH #4, the fifth secondary channel Secondary CH #5, the sixth secondary channel Secondary CH #6, and the seventh secondary channel Secondary CH #7, each of which is in an idle state.

The plurality of stations transmit the CTS frame through the channel allocated to the plurality of stations the plurality of stations. The fourth station whose allocated channel is not in an idle state does not transmit a CTS frame. Each of the first station to the third station and the fifth station to the eighth station transmits a CTS frame to the access point through the primary channel Primary CH, the first secondary channel Secondary CH #1 and the second secondary channel Secondary CH #2, and the fourth secondary channel Secondary CH #4 to the seventh secondary channel Secondary CH #7.

The access point transmits data to the station that transmits the CTS frame. At this time, the access point may transmit data according to various embodiments described above.

In another specific embodiment, the first wireless communication terminal may transmit data to the plurality of wireless communication terminals by modifying the RTS frame without using the poll frame. For convenience of description, the modified RTS frame is referred to as an M-RTS frame. This will be described with reference to FIG. 30.

Figure 30:
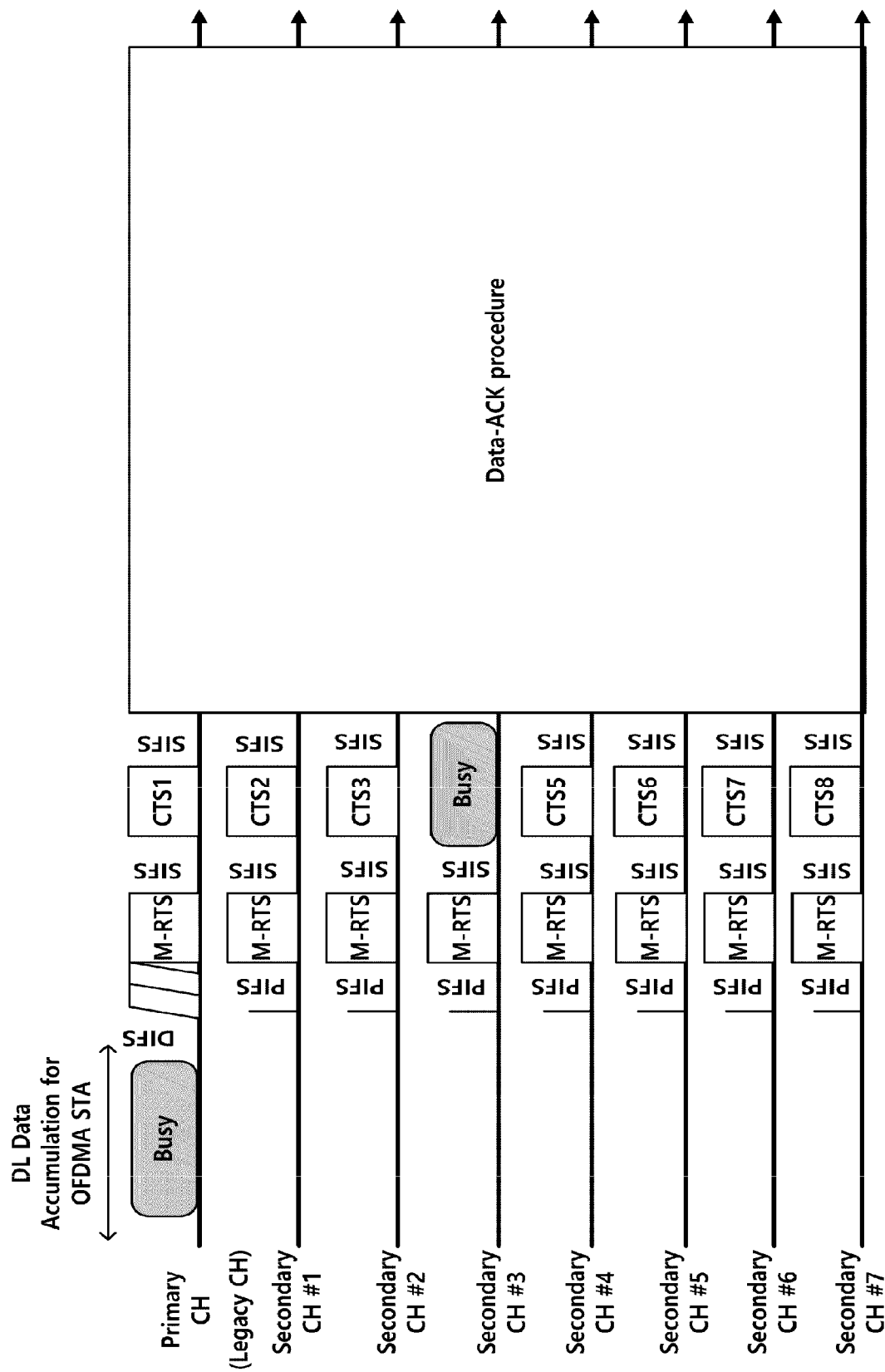
FIG. 30 is a view illustrating that an access point according to an embodiment of the present invention transmits data to a plurality of stations using an M-RTS frame.

FIG. 30 is a view illustrating that an access point according to an embodiment of the present invention transmits data to a plurality of stations using an M-RTS frame.

The first wireless communication terminal may transmit a plurality of M-RTS frames to the plurality of second wireless communication terminals, respectively. At this time, the M-RTS frame may be a legacy RTS frame in which the address of the second wireless communication terminal allocated with the channel through which the M-RTS frame is transmitted is set to the RA field value. Therefore, in the plurality of M-RTS frames, the values of the RA fields are different. In such an embodiment, the second wireless communication terminal should scan all channels.

In another specific embodiment, the first wireless communication terminal may transmit an M-RTS frame to the plurality of second wireless communication terminals through any one channel. At this point, the one channel may be the primary channel. Also, the M-RTS frame may have a structure in which the legacy RTS frame further includes the channel vector information described above. For example, the structure of the M-RTS frame may be a structure in which the channel vector information is located after the FCS field of the legacy RTS frame.

If a channel is in an idle state for a DIFS in an embodiment of FIG. 30, an access point transmits the M-RTS frame to a plurality of stations through a plurality of channels after waiting for a random value within a contention window value. In a specific embodiment, if a channel is in an idle state for an AIFS, an access point may transmit the M-RTS frame to a plurality of stations through a plurality of channels after waiting for a random value within a contention window value. Specifically, the access point transmits an M-RTS frame to a plurality of stations through the primary channel Primary CH, the first secondary channel Secondary CH #1, the second secondary channel Secondary CH #2, the fourth secondary channel Secondary CH #4, the fifth secondary channel Secondary CH #5, the sixth secondary channel Secondary CH #6, and the seventh secondary channel Secondary CH #7, each of which is in an idle state.

The plurality of stations recognize a channel allocated to the plurality of stations the plurality of stations based on the channel through which the M-RTS is transmitted and the RA field value of the M-RTS.

The plurality of stations transmit the CTS frame through the channel allocated to the plurality of stations the plurality of stations. The fourth station whose allocated channel is not in an idle state does not transmit a CTS frame. Each of the first station to the third station and the fifth station to the eighth station transmits a CTS frame to the access point through the primary channel Primary CH, the first secondary channel Secondary CH #1 and the second secondary channel Secondary CH #2, and the fourth secondary channel Secondary CH #4 to the seventh secondary channel Secondary CH #7.

The access point transmits data to the station that transmits the CTS frame. At this time, the access point may transmit data according to various embodiments described above.

The plurality of second wireless communication terminals may simultaneously transmit data to the first wireless communication terminal as described above. For this, a method of the first wireless communication terminal to allocate a channel to the plurality of second wireless communication terminals and a method of the plurality of second wireless communication terminals to reserve a TXOP are required. This will be described with reference to FIGS. 31 to 41. In particular, it is described with reference to FIGS. 31 to 37 that after the first wireless communication terminal transmits data to a plurality of second wireless communication terminals, a plurality of second wireless communication terminals transmit data to the first wireless terminal. For convenience of description, what the first wireless communication terminal transmits data to a plurality of second wireless communication terminals is referred to as downlink transmission, and what a plurality of second wireless communication terminals transmit data to the first wireless terminal is referred to as an uplink transmission.

The second wireless communication terminal may notify whether or not there is data to be transmitted to the first wireless communication terminal by transmitting a specific frame. Accordingly, the frame transmitted from the second wireless communication terminal to the first wireless communication terminal may indicate whether there is data to be transmitted from the second wireless communication terminal to the first wireless communication terminal. In a specific embodiment, an ACK frame transmitted from the second wireless communication terminal to the first wireless communication terminal may indicate whether there is data to be transmitted from the second wireless communication terminal to the first wireless communication terminal. In addition, the more data field of a frame transmitted from the second wireless communication terminal to the first wireless communication terminal may indicate whether there is data to be transmitted from the second wireless communication terminal to the first wireless communication terminal. For example, the more data field of an ACK frame transmitted from the second wireless communication terminal to the first wireless communication terminal may indicate whether there is data to be transmitted from the second wireless communication terminal to the first wireless communication terminal. The more data field indicates that there is a bufferable unit (BU) to be transmitted from an access point to a station in a power saving (PS) mode. Therefore, a station receiving a frame in which the more data field is 1 continuously wakes up in the PS mode and waits for the data transmission of an access point. However, if the access point is not in a downlink transmission session for transmitting data to the station, the more data field is not used. Accordingly, as described above, the second wireless communication terminal may use the more data field to notify whether there is data to be transmitted to the first wireless communication terminal. Through such an embodiment, the first wireless communication terminal may know that there is data to be transmitted from the second wireless communication terminal to the first wireless communication terminal itself. Specifically, the presence of data to be transmitted may mean a buffer status indicating whether there is data to be transmitted to the first wireless communication terminal in the buffer of the second wireless communication terminal.

The first wireless communication terminal allocates a channel to be used by the second wireless communication terminal. The first wireless communication terminal transmits the above-described poll frame to the plurality of second wireless communication terminals. At this time, the poll frame may include channel vector information indicating information of a channel allocated to the second wireless communication terminal. Additionally, the first wireless communication terminal may transmit the poll frame through a primary channel. In another specific embodiment, the first wireless communication terminal may transmit the poll frame to the plurality of second wireless communication terminals through the channel used for transmitting data. In another specific embodiment, the first wireless communication terminal may transmit the poll frame to the plurality of second wireless communication terminals through a channel allocated to each second wireless communication terminal. In addition, the poll frame may be referred to as a trigger frame as described above.

The second wireless communication terminal obtains channel vector information based on the poll frame. Specifically, the second wireless communication terminal may obtain information on the channel that the first wireless communication terminal allocates to the second wireless communication terminal the second wireless communication terminal from the channel vector information of the poll frame.

The second wireless communication terminal transmits data to the first wireless communication terminal through the channel allocated to the second wireless communication terminal the second wireless communication terminal. According to a specific embodiment, the second wireless communication terminal may transmit data to the first wireless communication terminal without receiving a separate frame after receiving the poll frame. Specifically, if all the TXOPs of the channels used in the uplink transmission session are protected in the downlink transmission session, the second wireless communication terminal may transmit data to the first wireless communication terminal after receiving the poll frame. At this time, since the second wireless communication terminal receives the poll frame and transmits data after a predetermined time, the data transmission time becomes identical to that of another second wireless communication terminal. In another specific embodiment, the second wireless communication terminal may transmit the ACK frame for the poll frame to terminate the downlink transmission session and transmit data to the first wireless communication terminal. Specifically, after the second wireless communication terminal transmits the ACK frame, the first wireless communication terminal transmits the CTS-to-Self frame to reserve the TXOP of the uplink transmission session. At this time, the CTS-to-Self frame indicates a case in which the RA field of the CTS frame is the MAC address of a wireless communication terminal transmitting the CTS frame. The wireless communication terminal receiving the CTS-to-Self frame may not access the corresponding channel. Therefore, the CTS-to-Self frame serves to reserve the TXOP. After the first wireless communication terminal obtains the TXOP of the uplink transmission session, the second wireless communication terminal may transmit data to the first wireless communication terminal.

Figure 31:
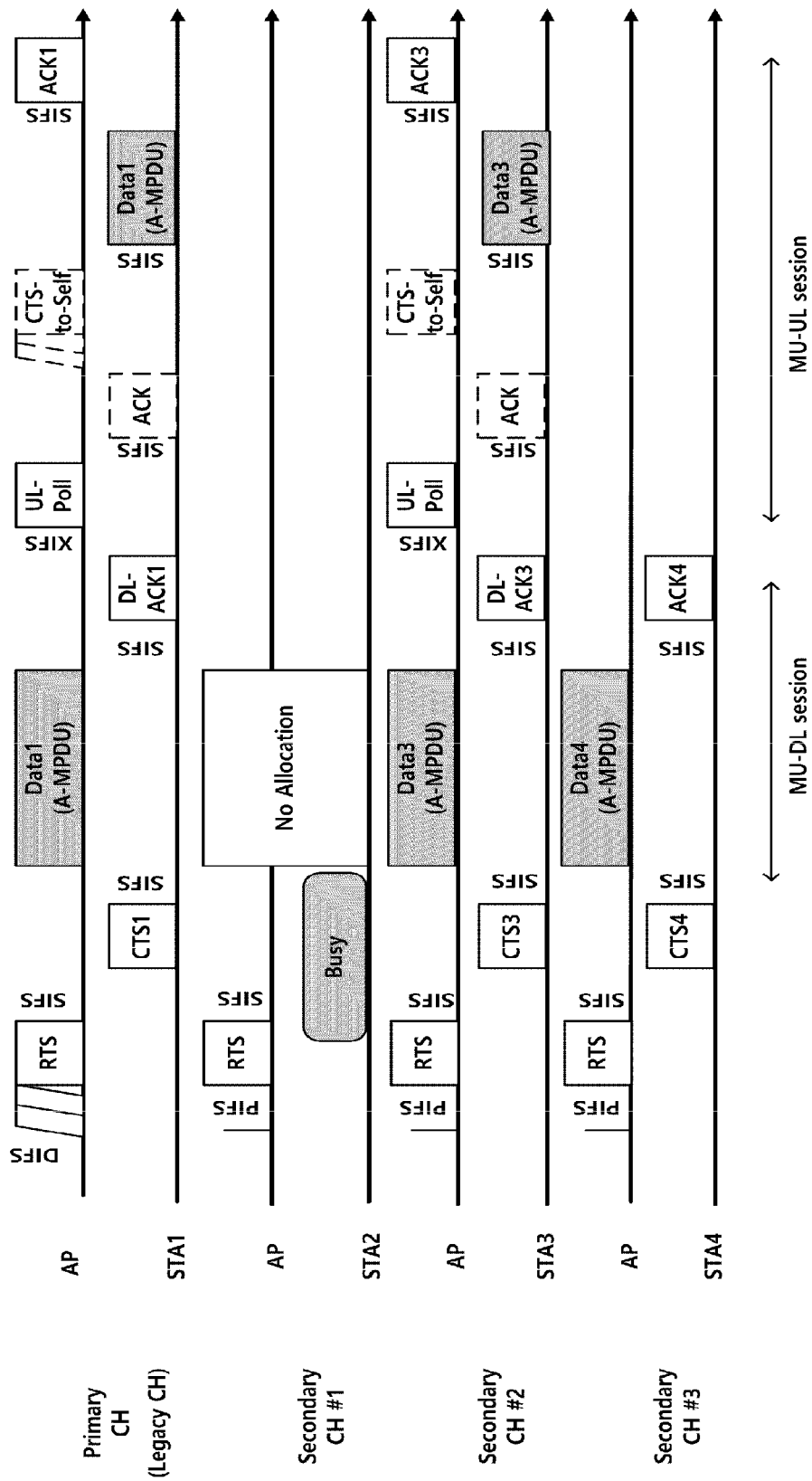
FIG. 31 is a view illustrating that a plurality of stations according to an embodiment of the present invention transmit data to an access point after receiving data from the access point.

FIG. 31 is a view illustrating that a plurality of stations according to an embodiment of the present invention transmit data to an access point after receiving data from the access point.

In the embodiment of FIG. 31, the access point transmits data to the plurality of stations. Specifically, the access point transmits data to the first station, the third station, and the fourth station. For this, the access point transmits an RTS frame to the plurality of stations, and receives a CTS frame from the plurality of stations to reserve a TXOP.

The first station, the third station, and the fourth station, which receive data from the access point, transmit an ACK frame to the access point. At this time, the first station and the third station, which have data to be transmitted to the access point, transmit an ACK frame indicating whether there is data to be transmitted. At this time, if the value of the more data field in the ACK frame is 1, the ACK frame may indicate that the station transmitting the ACK frame has data to be transmitted to the access point.

The access point allocates a channel to the first station and the third station. The access point transmits a poll frame including information on the allocated channel to the first station and the third station.

The first station and the third station receive the poll frame and transmit an ACK frame for the poll frame to the access point. As described above, after receiving the poll frame, the first station and the third station may transmit data to the access point without transmitting a separate frame.

The access point transmits the RTS-to-Self frame to a plurality of stations. Through this, the access point obtains a TXOP through which the first station and the third station are able to transmit data to the first station and the third station themselves.

Each of the first station and the third station transmits data to the access point through a channel allocated to the first station and the third station themselves.

The first wireless communication terminal may allocate a channel to be used for the uplink transmission session to the plurality of second wireless communication terminals based on the channel used in the downlink transmission session and the plurality of second wireless communication terminals participating in the downlink transmission. This will be described with reference to FIG. 32.

Figure 32:
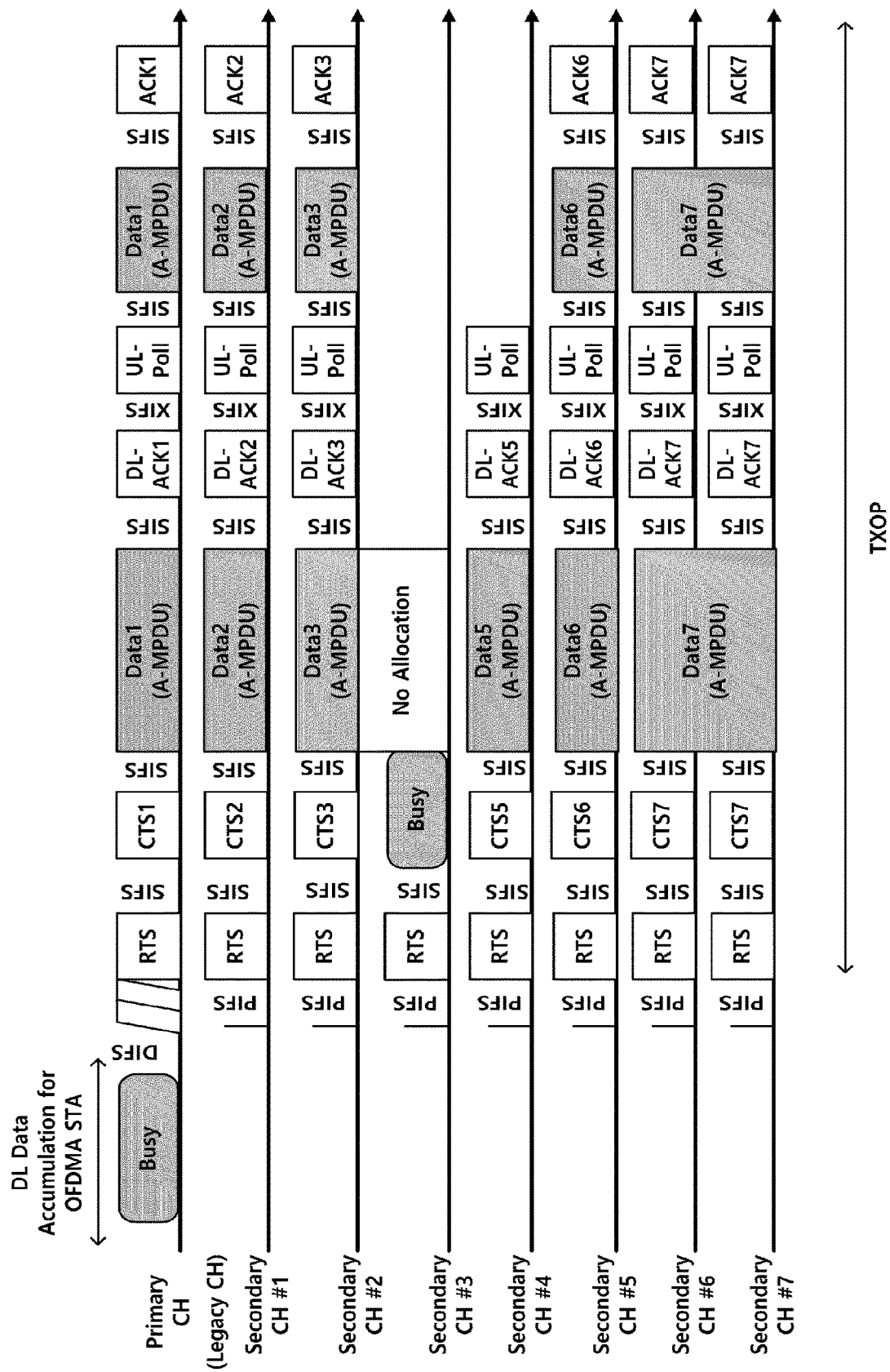
FIG. 32 is a view illustrating that each of a plurality of stations according to an embodiment of the present invention transmits data to an access point through a channel used when the access point transmits data to each of the plurality of stations.

FIG. 32 is a view illustrating that each of a plurality of stations according to an embodiment of the present invention transmits data to an access point through a channel used when the access point transmits data to each of the plurality of stations.

The first wireless communication terminal may allocate a channel used for downlink transmission to the second wireless communication terminal participating in downlink transmission as a channel for uplink transmission. At this time, each of the first wireless communication terminal and the second wireless communication terminal may perform downlink transmission using the TXOP obtained during the downlink transmission. Specifically, the first wireless communication terminal and the second wireless communication terminal may use the TXOP set and updated through the duration field values of the RTS frame and the CTS frame. Such a channel allocation may be specifically performed through the following operations.

The second wireless communication terminal may transmit to the first wireless communication terminal at least any one of information indicating whether there is data to be transmitted to the first wireless communication terminal, information on the size of data to be transmitted to the first wireless communication terminal, and information on an available channel. Specifically, the second wireless communication terminal may transmit to the first wireless communication terminal a frame including at least any one of information indicating whether there is data to be transmitted to the first wireless communication terminal, information on the size of data to be transmitted to the first wireless communication terminal, and information on an available channel. For example, the ACK frame transmitted from the second wireless communication terminal to the first wireless communication terminal includes at least one of information indicating whether there is data to be transmitted to the first wireless communication terminal, the size of data to be transmitted to the first wireless communication terminal, and information on an available channel. At this time, the available channel information notifies the first wireless communication terminal of a hidden terminal that the first wireless communication terminal does not detect. Through this, the first wireless communication terminal may allocate a channel except for a channel used by the hidden terminal, so that it prevents transmission collision with the hidden terminal during the data transmission from the second wireless communication terminal to the first wireless communication terminal. Further, the first wireless communication terminal may prepare a buffer for data reception based on the size of data to be transmitted.

The first wireless communication terminal allocates a channel to each of the plurality of second wireless communication terminals based on information received from the second wireless communication terminal, a channel used for the downlink transmission, and the plurality of second wireless communication terminals participating in the downlink transmission. Specifically, the first wireless communication terminal may allocate a channel allocated during downlink transmission to the plurality of wireless second wireless communication terminals as an uplink transmission channel. Through this, the first wireless communication terminal and the second wireless communication terminal may utilize the TXOP obtained during a downlink transmission session.

The first wireless communication terminal transmits a poll frame to a plurality of stations. As described above, the poll frame includes information on a channel allocated to the second wireless communication terminal by the first wireless communication terminal. The first wireless communication terminal may transmit a poll frame to the plurality of stations after a predetermined time from the time when the ACK frame is received. Specifically, the first wireless communication terminal may transmit a poll frame to the plurality of stations after an SIFS from the time when the ACK frame is received. According to the complexity of scheduling or a calculation time, the first wireless communication terminal may transmit a poll frame to the plurality of stations after more than an SIFS from the time when the ACK frame is received.

In the embodiment of FIG. 32, the access point transmits data to the plurality of stations. Specifically, the access point transmits data to each of the first station to the third station and the fifth station to the seventh station through the primary channel Primary CH, the first secondary channel Secondary CH #1 and the second secondary channel Secondary CH #2, and the fourth secondary channel Secondary CH #4 to the seventh secondary channel Secondary CH #7. For this, the access point transmits an RTS frame to the plurality of stations, and receives a CTS frame from the plurality of stations to reserve a TXOP.

The plurality of stations receiving data from the access point transmit an ACK frame to the access point through a channel allocated to each of the plurality of stations. Specifically, each of the first station to the third station and the fifth station to the eighth station transmits an ACK frame to the access point through the primary channel Primary CH, the first secondary channel Secondary CH #1 and the second secondary channel Secondary CH #2, and the fourth secondary channel Secondary CH #4 to the seventh secondary channel Secondary CH #7. At this time, each of the first station to the third stations and the sixth station and the seventh station, which have data to be transmitted to the access point, transmits an ACK frame indicating whether there is data to be transmitted. At this time, if the value of the more data field in the ACK frame is 1, the ACK frame may indicate that the station transmitting the ACK frame has data to be transmitted to the access point.

The access point allocates a channel to be used for data transmission to the plurality of stations that transmit an ACK frame indicating that there is data to be transmitted to the access point. Specifically, the access point allocates a channel to be used for data transmission to each of the first station to the third station and the sixth station and the seventh station. Specifically, the access point may allocate channels, which are used by each of the first station to the third station and the sixth station and the seventh station in a downlink transmission session, to the first station to the third station and the sixth station, respectively.

The access point transmits a poll frame including information on the allocated channel to a plurality of stations. The access point transmits the poll frame including the information on the allocated channel to the first station to the third station and the sixth station and the seventh station.

After receiving the poll frame, the plurality of stations transmit data to the access point. Specifically, the first station to the third station and the sixth station and the seventh station receive the poll frame, and then transmit data to the access point.

Each of the plurality of stations transmits data to the access point through a channel allocated to the plurality of stations themselves. Each of the first station to the third station and the sixth station and the seventh station transmits data to the access point through the primary channel Primary CH, the first secondary channel Secondary CH #1 and the second secondary channel Secondary CH #2, and the fifth secondary channel Secondary CH #5 to the seventh secondary channel Secondary CH #7.

The access point receiving the data transmits an ACK frame to the first station to the third station and the sixth station and the seventh station through the primary channel Primary CH, the first secondary channel Secondary CH #1 and the second secondary channel Secondary CH #2, and the fifth secondary channel Secondary CH #5 to the seventh secondary channel Secondary CH #7.

However, only some of the plurality of second wireless communication terminals that receive data from the first wireless communication terminal may transmit data to the first wireless communication terminal. Alternatively, there may be a large difference between the size of the data received from the first wireless communication terminal and the size of the data to be transmitted by the second wireless communication terminal. In such a case, as described with reference to FIG. 32, it is inefficient in terms of bandwidth utilization that the second wireless communication terminal uses a channel used for downlink transmission as it is. Therefore, the first wireless communication terminal may allocate a channel to the second wireless communication terminal without considering a channel allocated to the second wireless communication terminal in downlink transmission. This will be described with reference to FIGS. 33 and 34.

Figure 33:
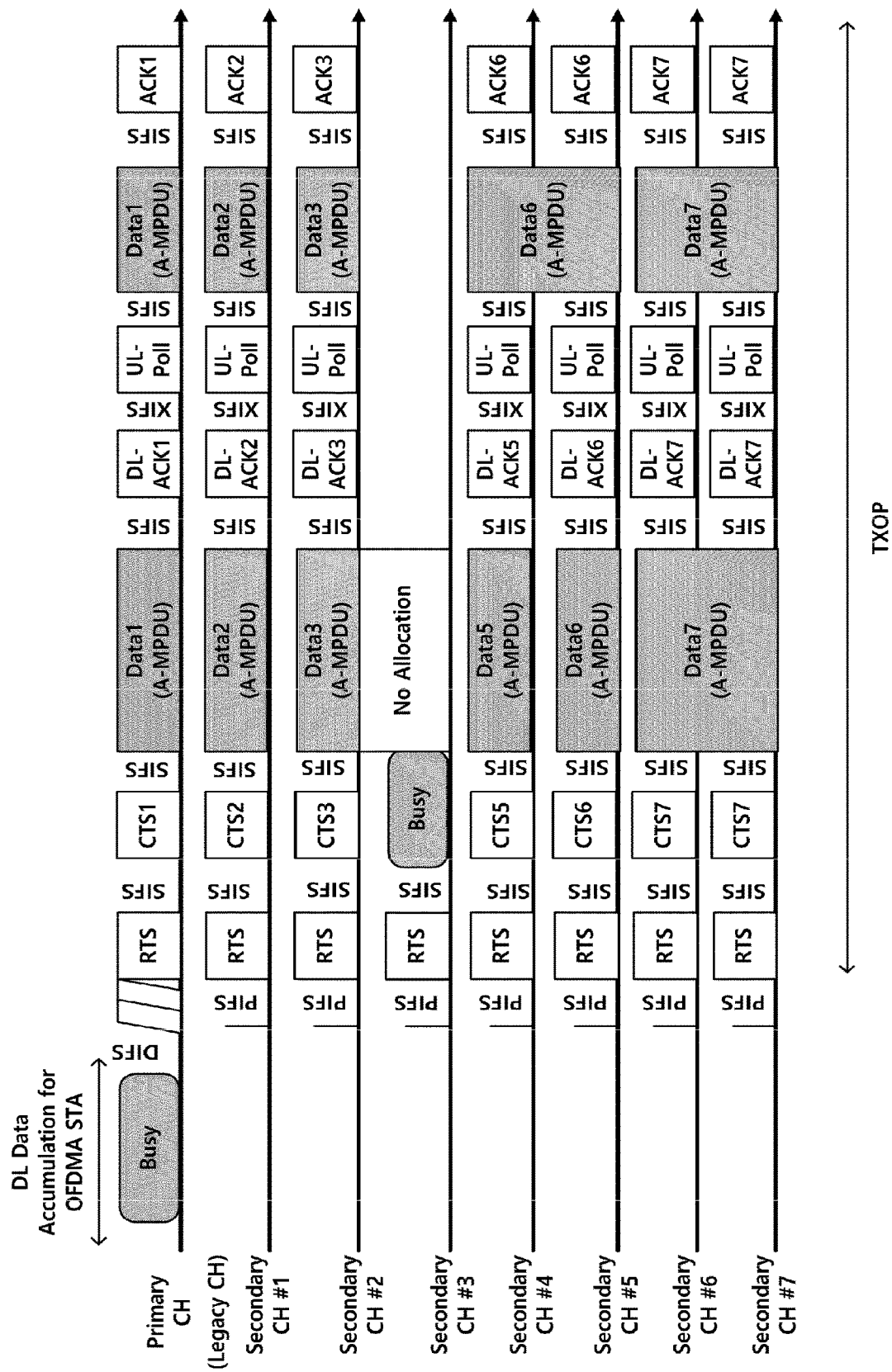
FIG. 33 is a view illustrating that a plurality of stations according to an embodiment of the present invention receive an allocated channel to transmit data to an access point regardless of whether the access point uses a corresponding channel when transmitting data to the plurality of stations.

FIG. 33 is a view illustrating that a plurality of stations according to an embodiment of the present invention receive an allocated channel to transmit data to an access point regardless of whether the access point uses a corresponding channel when transmitting data to the plurality of stations.

The first wireless communication terminal may allocate a channel for uplink transmission to each of the plurality of second wireless communication terminals regardless of whether a corresponding channel is used in downlink transmission to the plurality of second wireless communication terminals. In such a case, a channel may be allocated to match the current channel situation, and the channel usage rate may be increased. Therefore, the data transmission speed from the second wireless communication terminal to the first wireless communication terminal may be improved.

As described above, the second wireless communication terminal may transmit to the first wireless communication terminal at least any one of information indicating whether there is data to be transmitted to the first wireless communication terminal, information on the size of data to be transmitted to the first wireless communication terminal, and information on an available channel. Specifically, the second wireless communication terminal may transmit to the first wireless communication terminal a frame including at least any one of information indicating whether there is data to be transmitted to the first wireless communication terminal, information on the size of data to be transmitted to the first wireless communication terminal, and information on an available channel. For example, the ACK frame transmitted from the second wireless communication terminal to the first wireless communication terminal includes at least one of information indicating whether there is data to be transmitted to the first wireless communication terminal, the size of data to be transmitted to the first wireless communication terminal, and information on an available channel. At this time, the available channel information notifies the first wireless communication terminal of a hidden terminal that the first wireless communication terminal does not detect. Through this, the first wireless communication terminal may allocate a channel except for a channel used by the hidden terminal, so that it prevents transmission collision with the hidden terminal during the data transmission from the second wireless communication terminal to the first wireless communication terminal. Further, the first wireless communication terminal may prepare a buffer for data reception based on the size of data to be transmitted.

The first wireless communication terminal may allocate a channel to each of the plurality of second wireless communication terminals based on the information received from the second wireless communication terminal. Specifically, the first wireless communication terminal may allocate a channel to be used for uplink transmission by the second wireless communication terminal based on at least any one of information indicating whether there is data to be transmitted by the second wireless communication terminal, information on the size of data to be transmitted by the second wireless communication terminal, and information on an available channel. For example, the first wireless communication terminal may allocate a channel bandwidth according to the size of data to be transmitted by each of the plurality of second wireless communication terminals. Through this, the first wireless communication terminal may maximize the channel usage efficiency.

However, unlike the embodiment of FIG. 32, since the TXOP obtained during uplink transmission is not utilized, there may be a risk that a collision with the transmission of another wireless communication terminal occurs when the second wireless communication terminal transmits data to the first wireless communication terminal. Specifically, when the first wireless communication terminal transmits an RTS frame through all the channels in an idle state before downlink transmission, a wireless communication terminal around the first wireless communication terminal may set an NAV value by the RTS frame. Therefore, the probability of collision with the data transmission of the wireless communication terminal around the first wireless communication terminal is low. However, since the second wireless communication terminal does not transmit a CTS frame previously through an allocated channel, the NAV may not be set. However, even in such a case, since the wireless communication terminal around the second wireless communication terminal performs a Clear Channel Assessment (CCA) by Energy Detection (ED), the possibility of data transmission collision may not be high.

In the embodiment of FIG. 33, the access point transmits data to the plurality of stations. Specifically, the access point transmits data to each of the first station to the third station and the fifth station to the seventh station through the primary channel Primary CH, the first secondary channel Secondary CH #1 and the second secondary channel Secondary CH #2, and the fourth secondary channel Secondary CH #4 to the seventh secondary channel Secondary CH #7. For this, the access point transmits an RTS frame to the plurality of stations, and receives a CTS frame from the plurality of stations to reserve a TXOP.

The plurality of stations receiving data from the access point transmit an ACK frame to the access point through a channel allocated to each of the plurality of stations. Specifically, each of the first station to the third station and the fifth station to the eighth station transmits an ACK frame to the access point through the primary channel Primary CH, the first secondary channel Secondary CH #1 and the second secondary channel Secondary CH #2, and the fourth secondary channel Secondary CH #4 to the seventh secondary channel Secondary CH #7. At this time, each of the first station to the third stations and the sixth station and the seventh station, which have data to be transmitted to the access point, transmits an ACK frame indicating that there is data to be transmitted. At this time, if the value of the more data field in the ACK frame is 1, the ACK frame may indicate that the station transmitting the ACK frame has data to be transmitted to the access point.

The access point allocates a channel to be used for data transmission to the plurality of stations that transmit an ACK frame indicating that there is data to be transmitted to the access point. Specifically, the access point allocates a channel to be used for data transmission to each of the first station to the third station and the sixth station and the seventh station. Specifically, the access point may allocate a channel to be used for uplink transmission to each of the first station to the third station and the sixth station regardless of whether the corresponding channel is used in the downlink transmission session. Specifically, the access point allocates the primary channel Primary CH to the first station, allocates the first secondary channel Secondary CH #1 to the second station, allocates the second secondary channel Secondary CH #2 to the third station, allocates the fourth secondary channel Secondary CH #4 and the fifth secondary channel Secondary CH #5 to the sixth station, and allocates the sixth secondary channel Secondary CH #6 and the seventh secondary channel Secondary CH #7 to the seventh station. At this time, the access point allocates the fourth secondary channel Secondary CH #4 not being used by the sixth station to the sixth station.

The access point transmits a poll frame including information on the allocated channel to the plurality of stations. The access point transmits the poll frame including the information on the allocated channel to the first station to the third station and the sixth station and the seventh station.

After receiving the poll frame, the plurality of stations transmit data to the access point. Specifically, the first station to the third station and the sixth station and the seventh station receive the poll frame, and then transmit data to the access point.

Each of the plurality of stations transmits data to the access point through a channel allocated to the plurality of stations themselves. Each of the first station to the third station and the sixth station and the seventh station transmits data to the access point through the primary channel Primary CH, the first secondary channel Secondary CH #1 and the second secondary channel Secondary CH #2, and the fifth secondary channel Secondary CH #5 to the seventh secondary channel Secondary CH #7.

The access point receiving the data transmits an ACK frame to the first station to the third station and the sixth station and the seventh station through the primary channel Primary CH, the first secondary channel Secondary CH #1 and the second secondary channel Secondary CH #2, and the fifth secondary channel Secondary CH #5 to the seventh secondary channel Secondary CH #7.

As the embodiments of FIGS. 31 and 32 are described above, it is described that the second wireless communication terminal transmits information on available channels to the first wireless communication terminal, and through this, collision with the transmission of another wireless communication terminal is prevented during data transmission. The first wireless communication terminal may allocate a channel to be used during the uplink transmission of the second wireless communication terminal based on available channel information transmitted by the second wireless communication terminal and available channel information detected by the first wireless communication terminal. This will be described with reference to FIG. 34.

Figure 34:
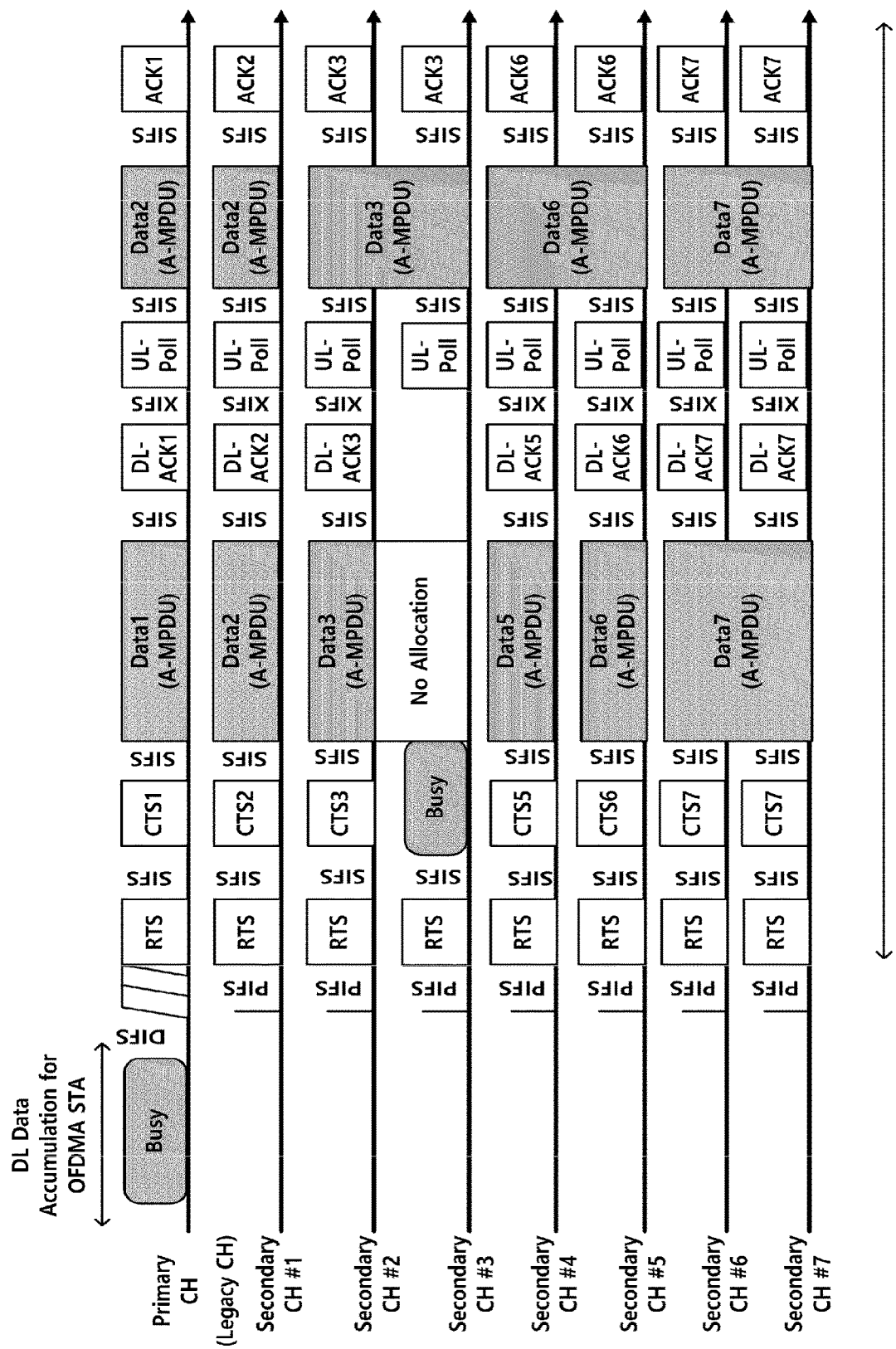
FIG. 34 is a view illustrating that an access point according to an embodiment of the present invention allocates a channel to a plurality of stations based on information on an available channel transmitted by a station, and the plurality of stations transmit data to the access point according to the allocated channel.

FIG. 34 is a view illustrating that an access point according to an embodiment of the present invention allocates a channel to a plurality of stations based on information on an available channel transmitted by a station, and the plurality of stations transmit data to the access point according to the allocated channel.

The second wireless communication terminal may detect an available channel and transmit the information on the available channel to the first wireless communication terminal. Specifically, a frame transmitted from the second wireless communication terminal to the first wireless communication terminal may include information on an available channel detected by the second wireless communication terminal. At this time, a frame transmitted to the first wireless communication terminal from the second wireless communication terminal may be an ACK frame.

The first wireless communication terminal may allocate a channel that the second wireless communication terminal is to use for the uplink transmission to the second wireless communication terminal based on available channel information received from the second wireless communication terminal and available channel information detected by the first wireless communication terminal. At this time, the first wireless communication terminal may detect an available channel by CCA through energy detection. In addition, as described above, the first wireless communication terminal may further receive at least one of information indicating that there is data to be transmitted by the second wireless communication terminal and the size of data to be transmitted by the second wireless communication terminal, and by considering it together with available channel information received from the second wireless communication terminal and available channel information detected by the first wireless communication terminal, allocate a channel used for uplink transmission by the second wireless communication terminal to the second wireless communication terminal.

In the embodiment of FIG. 34, the access point receives information that the third secondary channel Secondary CH #3 is available from the third station. Also, the access point detects that the third secondary channel Secondary CH #3 is available. Therefore, the access point allocates the third secondary channel Secondary CH #3 as well as the second secondary channel Secondary CH #2 to the third station, and the third station transmits data to the access point through the second secondary channel Secondary CH #2 and the third secondary channel Secondary CH #3. Except this, operations of the access point and the plurality of stations are the same as those of the embodiment of FIG. 33.

In such an embodiment, without considering whether a channel is previously used, the first wireless communication terminal considers only whether the second wireless communication terminal determines it as a currently available channel and whether it is a first available channel, so that the channel usage rate may be increased. However, there is a high possibility that the data transmission of the second wireless communication terminal causes a collision with the data transmission of another wireless communication compared to a case in which a channel that obtains a TXOP using the RTS frame and the CTS frame is allocated.

As described above, the second wireless communication terminal may receive the poll frame from the first wireless communication terminal and terminate the downlink transmission session by transmitting the ACK frame for the poll frame. At this time, the second wireless communication terminal may transmit data to the first wireless communication terminal through a contention procedure. This will be described with reference to FIG. 35.

Figure 35:
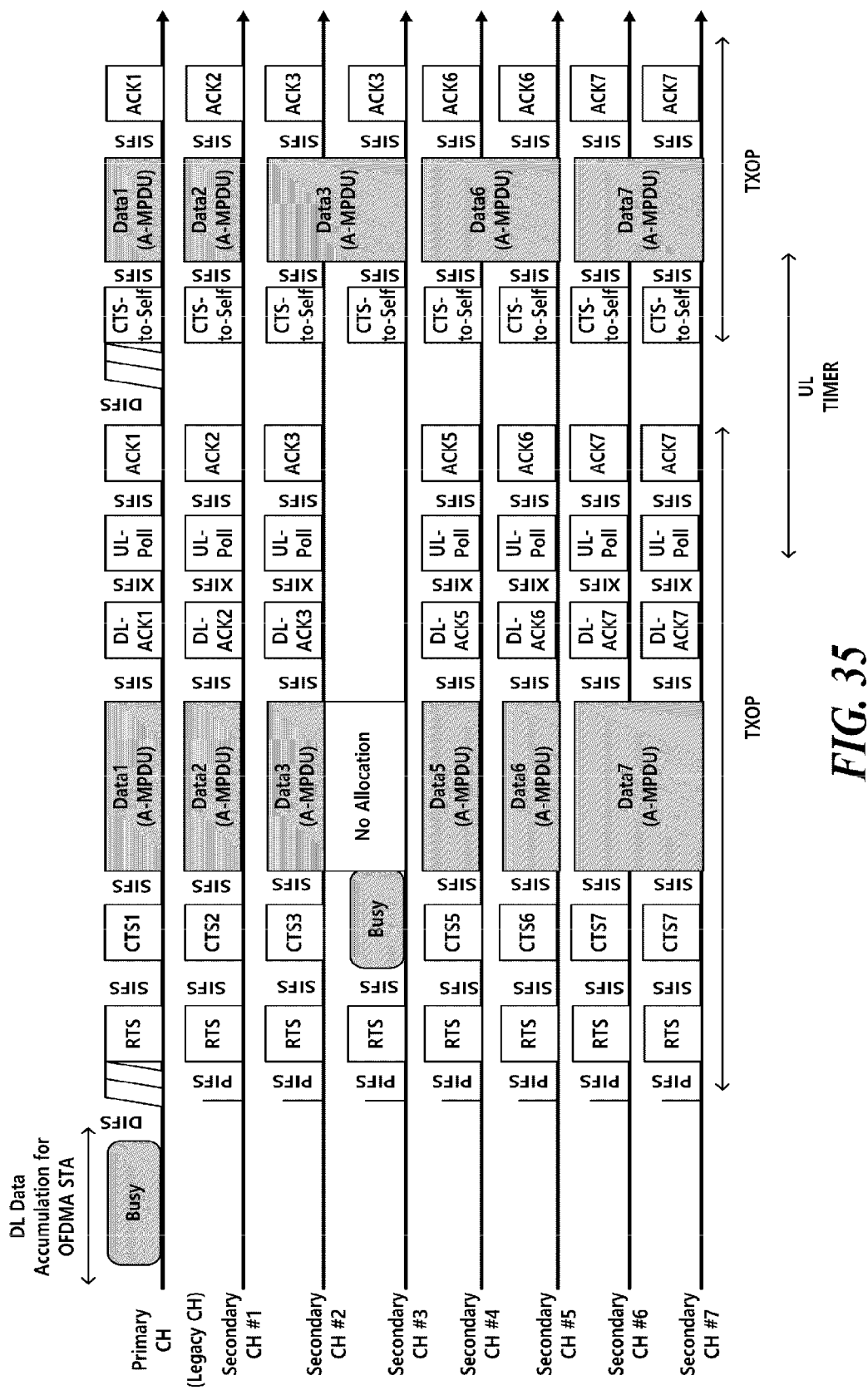
FIG. 35 is a view illustrating that an access point according to an embodiment of the present invention obtains a TXOP through a contention procedure and a CTS-to-Self frame, and a plurality of stations transmit data to the access point.

FIG. 35 is a view illustrating that an access point according to an embodiment of the present invention obtains a TXOP through a contention procedure and a CTS-to-Self frame, and a plurality of stations transmit data to the access point.

The second wireless communication terminal may receive the poll frame from the first wireless communication terminal and terminate the downlink transmission session by transmitting the ACK frame for the poll frame. Then, the first wireless communication terminal transmits the CTS-to-Self frame through the contention procedure. Specifically, the first wireless communication terminal transmits the CTS-to-Self frame to the plurality of second wireless communication terminals through a channel allocated to the plurality of second wireless communication terminals using a contention procedure. In a specific embodiment, the first wireless communication terminal may wait for a random value in the contention window if a channel allocated to the second wireless communication terminal is in an idle state for a predetermined time. At this point, the predetermined time may be an AIFS or a DIFS. If the corresponding channel is in an idle state even after waiting for the random value, the first wireless communication terminal may transmit data to the second wireless communication terminal through a channel allocated to the second wireless communication terminal. At this time, the second wireless communication terminal determines whether a CTS-to-Self frame is transmitted through a channel allocated to the second wireless communication terminal itself within a predetermined time. For convenience of description, the predetermined time is referred to as a UL Timer. When a CTS-to-Self frame is transmitted in the UL Timer, the second wireless communication terminal transmits data to the access point through the channel allocated to the second wireless communication terminal itself. If the CTS-to-Self frame is not transmitted in the UL Timer, the second wireless communication terminal transmits data to the access point through a channel allocated to the second wireless communication terminal itself using the contention procedure. Specifically, the second wireless communication terminal may wait for a random value in the contention window when a channel allocated to the second wireless communication terminal is in an idle state for a predetermined time. At this point, the predetermined time may be an AIFS or a DIFS. If the channel is in an idle state even after waiting for the random value, the second wireless communication terminal may transmit data to the first wireless communication terminal through the channel allocated to the second wireless communication terminal itself.

In such an embodiment, since the first wireless communication terminal performs the contention procedure based on the UL timer, the UL timer, the contention window, and the TXOP value needs to be appropriately set so that the plurality of second wireless communication terminals may efficiently transmit data to the first wireless communication terminal. In order to increase the priority of data transmission of the second wireless communication terminal, the value of the UL timer should be large, the value of the contention window should be small, and the value of TXOP should be large. On the contrary, in order to decrease the priority of data transmission of the second wireless communication terminal, the value of the UL timer should be small, the value of the contention window should be large, and the value of TXOP should be small. The values of the UL timer, the Contention Window (CW), and the TXOP may be defined by the following equations.

$$\alpha > 0, \beta > 0, \gamma > 0$$

$$TXOP = \alpha \cdot TXOP_{base}$$

$$UL\_Timer = \beta \cdot UL\_Timer_{base}$$

$$CW = \gamma \cdot CW_{base}$$

In this case, alpha and beta in the equation are variables in which the values increase as the priority of the second wireless communication terminal data transmission increases, and gamma in the equation is a variable in which the value decreases as the priority of the second wireless communication terminal data transmission increases. In addition, $TXOP_{base}$ is a reference value for TXOP calculation, $UL\_Timer_{base}$ is a reference value for calculating a UL timer value, and $CW_{base}$ is a reference value for calculating a CW value. Specifically, at this time, the values of the UL timer, CW, and TXOP may be changed according to a specific BSS situation.

Also, as described above, the first wireless communication terminal calculates a random value within a contention window value when a channel allocated to the second wireless communication terminal is in an idle state, and determines whether the corresponding channel is in an idle state after waiting for the calculated random value. If the channel is in an idle state even after waiting for the calculated random value, the first wireless communication terminal transmits a CTS-to-Self frame through the corresponding channel. At this time, the first wireless communication terminal may obtain a random value a plurality of times and wait for the minimum value among the obtained random values in order to give a priority to the data transmission of the second wireless communication terminal. Specifically, the first wireless communication terminal may obtain a random value as much as the number of the second wireless communication terminals that are to transmit data to the first wireless communication terminal, and wait for the minimum value among the obtained random values. By this method, probability distribution according to the following probability distribution function is shown.

$$Backoff_{MU-UL} = Min(Backoff_i) \; i \text{ is index of } STAs$$

$$\begin{aligned}CDFof \; Backoff &= pr(Min(Backoff_i) < z) = 1 - pr(Min(Backoff_i) > z)\\&= 1 - \prod_n pr(Backoff_i > z) = 1 - [pr(Backoff_i > z)]^n\\&= 1 - \left(\frac{CW - z}{CW}\right)^n \text{ where } n \text{ is number of } STAs\\&\quad \text{participating } MU - UL\end{aligned}$$

$$PDF \text{ of } Backoff = n\left(\frac{CW - z}{CW}\right)^{n-1}$$

Therefore, if the number n of users increases, the probability that the first wireless communication terminal will have a low back-off value increases.

In the embodiment of FIG. 35, a plurality of stations that receive a poll frame transmit an ACK frame to the access point.

Thereafter, the access point determines whether a channel allocated to the plurality of stations during a DIFS time is in an idle state. According to a specific embodiment, the access point can determine if a channel allocated to a plurality of stations during the AIFS time period is idle. If the channel allocated to the plurality of stations is in an idle state, the access point obtains a random value in a contention window and determines whether the corresponding channel is in an idle state. At this time, the access point may obtain a random value as much as the number of stations that are to transmit data to the access point as described above and wait for the minimum value among the obtained random values. When the corresponding channel is in an idle state, the access point transmits a CTS-to-Self frame to a plurality of stations through a channel allocated to the plurality of stations. Specifically, in the embodiment of FIG. 35, the access point transmits the CTS-to-Self frame to the first station through the primary channel Primary CH. Also, the access point transmits the CTS-to-Self frame to the second station through the first secondary channel Secondary CH #1. Also, the access point transmits the CTS-to-Self frame to the third station through the second secondary channel Secondary CH #2 and the third secondary channel Secondary CH #3. Also, the access point transmits the CTS-to-Self frame to the sixth station through the fourth secondary channel Secondary CH #4 and the fifth secondary channel Secondary CH #5. Also, the access point transmits the CTS-to-Self frame to the seventh station through the sixth secondary channel Secondary CH #6 and the seventh secondary channel Secondary CH #7.

The plurality of stations that receive the CTS-to-Self frame transmit data to the access point through the allocated channel. Specifically, the first station transmits data to the access point through the primary channel Primary CH. Also, the second station transmits data to the access point through the first secondary channel Secondary CH #1. Also, the third station transmits a data frame to the access point through the second secondary channel Secondary CH #2 and the third secondary channel Secondary CH #3. Also, the sixth station transmits a data frame to the access point through the fourth secondary channel Secondary CH #4 and the fifth secondary channel Secondary CH #5. Also, the seventh station transmits a data frame to the access point through the sixth secondary channel Secondary CH #6 and the seventh secondary channel Secondary CH #7.

As described above, the frame transmitted from the second wireless communication terminal to the first wireless communication terminal may indicate that there is data to be transmitted from the second wireless communication terminal to the first wireless communication terminal. In a specific embodiment, an ACK frame transmitted from the second wireless communication terminal to the first wireless communication terminal may indicate that there is data to be transmitted from the second wireless communication terminal to the first wireless communication terminal. Specifically, by setting a specific field of the ACK frame to a specific value, it is possible to indicate that there is data to be transmitted from the second wireless communication terminal to the first wireless communication terminal.

In addition, the second wireless communication terminal may set the value of the duration field in a frame indicating that there is data to be transmitted based on the time required for data transmission. Accordingly, the NAV of a neighbor wireless communication terminal that receives the frame indicating that there is data to be transmitted may be reset. Accordingly, when the second wireless communication terminal transmits data through the allocated channel, it is possible to prevent another wireless communication terminal from accessing the corresponding channel.

At this time, when there is no data to be transmitted from the second wireless communication terminal to the first wireless communication terminal, the second wireless communication terminal may transmit the conventional ACK frame in which a specific field is not set to a specific value. Through this, the second wireless communication terminal having no data to be transmitted to the first wireless communication terminal may quickly return the allocated channel. Specific embodiments will be described with reference to FIGS. 36 and 37.

Figure 36:
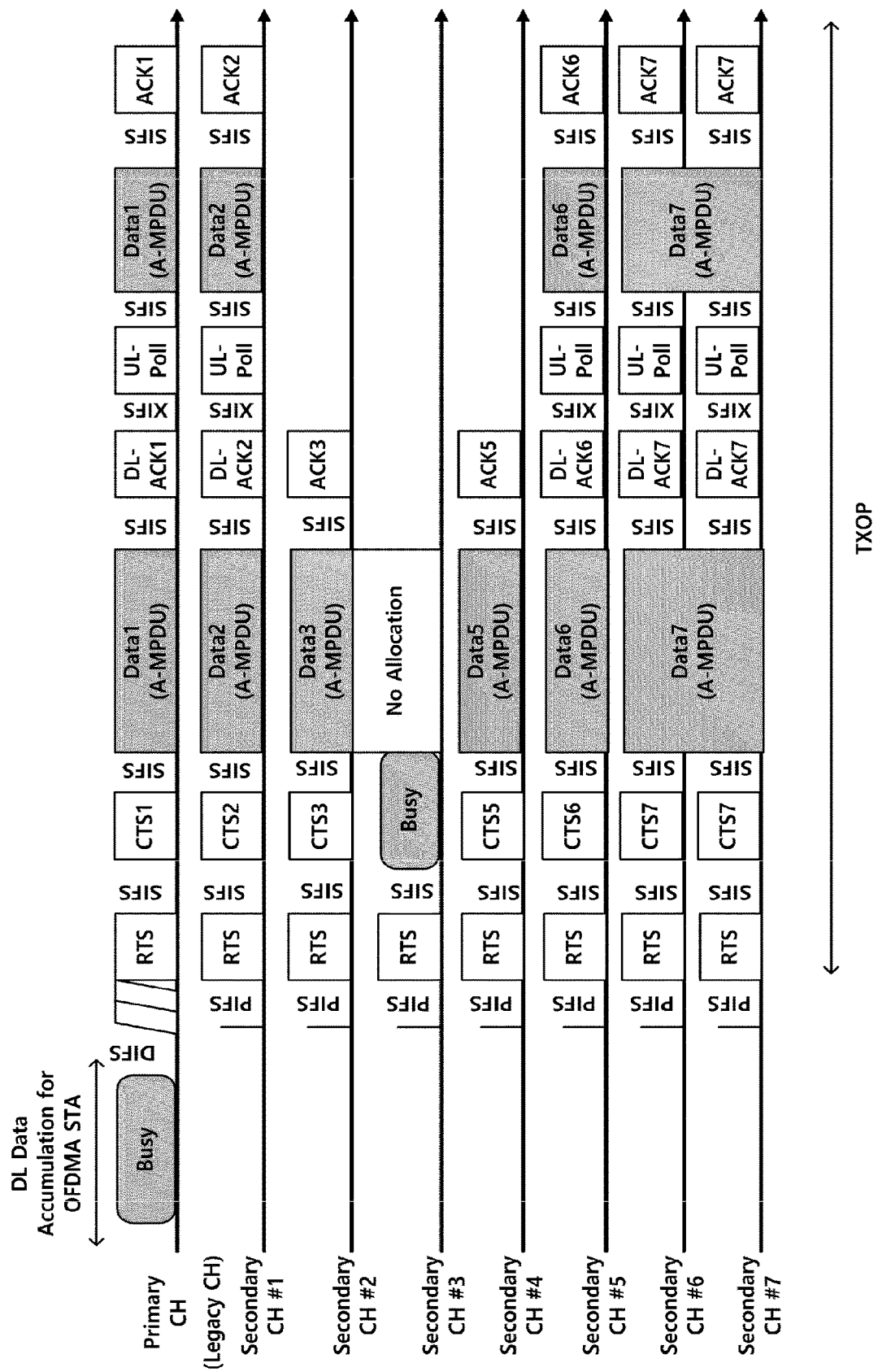
FIG. 36 is a view illustrating data transmission between an access point and a plurality of stations when there is no data to be transmitted to the access point by some of the plurality of stations according to an embodiment of the present invention.

FIG. 36 is a view illustrating data transmission between an access point and a plurality of stations when there is no data to be transmitted to the access point by some of the plurality of stations according to an embodiment of the present invention.

In the embodiment of FIG. 36, the first station, the second station, the sixth station, and the seventh station have data to be transmitted to the access point. Accordingly, the first station, the second station, the sixth station, and the seventh station notify the access point that there is data to be transmitted through an ACK frame for the data transmission of the access point. However, since there is no data to be transmitted to the access point, the third station and the fifth station transmit the conventional ACK frame and return the corresponding channel. The other operations of the access point and the plurality of stations are the same as those of the above-described embodiments.

Figure 37:
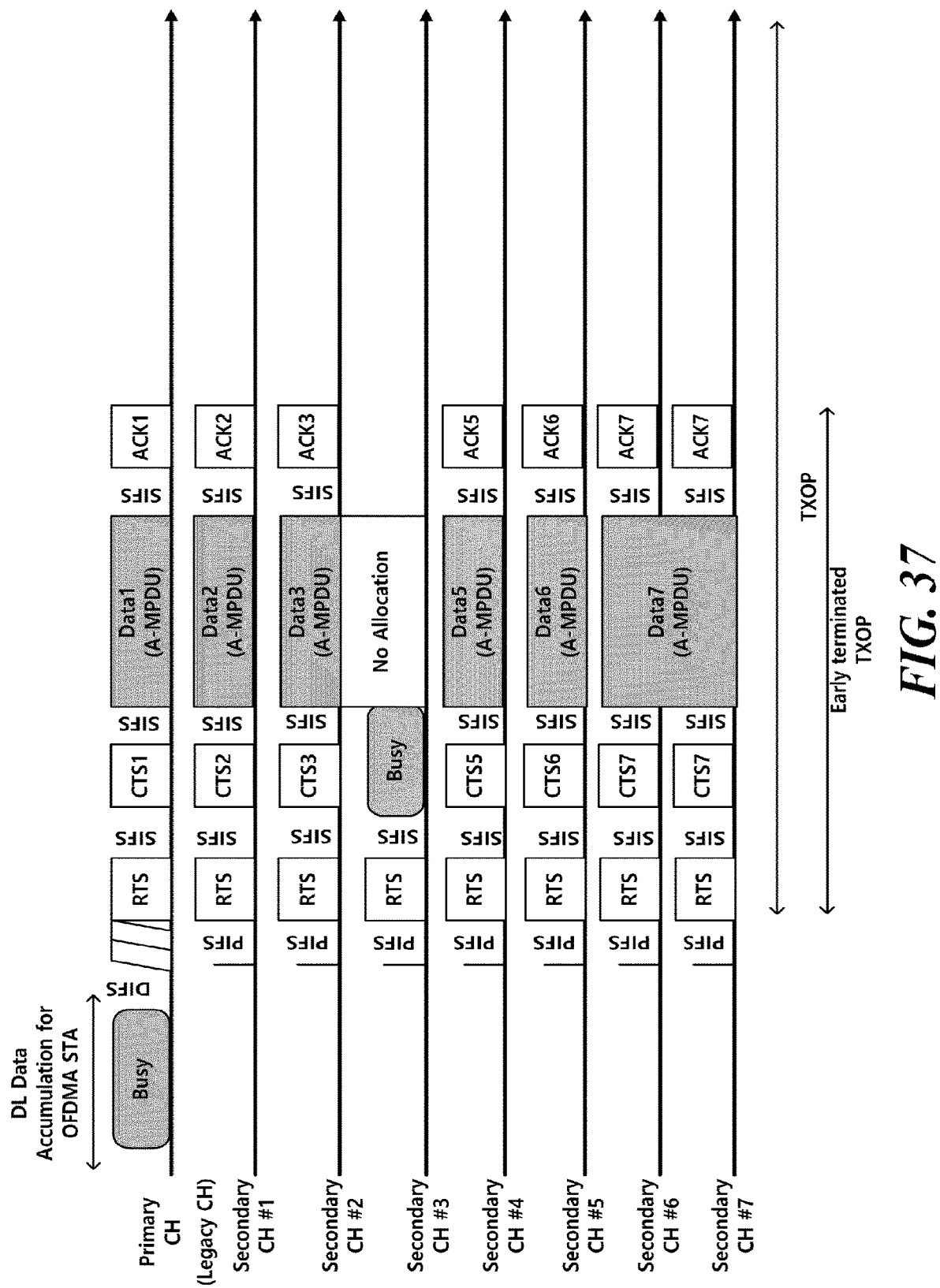
FIG. 37 is a view illustrating data transmission between an access point and a plurality of stations when there is no data to be transmitted to the access point by the plurality of stations according to an embodiment of the present invention.

FIG. 37 is a view illustrating data transmission between an access point and a plurality of stations when there is no data to be transmitted to the access point by the plurality of stations according to an embodiment of the present invention.

In the embodiment of FIG. 37, the first station, the second station, the third station, the fifth station, the sixth station, and the seventh station receive data from the access point. Since the first station, the second station, the third station, the fifth station, the sixth station, and the seventh station do not have any data to be transmitted to the access point, the conventional ACK frame is transmitted to return the allocated channel.

In such a manner, when there is no data to be transmitted from the second wireless communication terminal to the first wireless communication terminal, operations in an embodiment of the present invention are performed identical to those of the legacy wireless communication terminal. Therefore, a transmission method between a plurality of wireless communication terminals according to an embodiment of the present invention does not cause the performance degradation of a wireless communication terminal in the legacy environment.

In the above-described embodiment, when the second wireless communication terminal transmits a frame indicating whether there is data to be transmitted, the first wireless communication terminal immediately transmits a frame including the information of a channel allocated to the second wireless communication terminal. In such a case, the first wireless communication terminal should receive the frame indicating whether there is data to be transmitted by the second wireless communication terminal, immediately allocate a channel to the second wireless communication terminal, and perform transmission scheduling. Therefore, in such an embodiment, it may be insufficient for the first wireless communication terminal to perform the efficient channel allocation and adjust the transmission schedule for another second wireless communication terminal. Therefore, there is a need for an embodiment to solve this problem. This will be described with reference to FIG. 38. In addition, as described above, the frame including the information of the channel allocated to the second wireless communication terminal may be referred to as a trigger frame or a poll frame.

Figure 38:
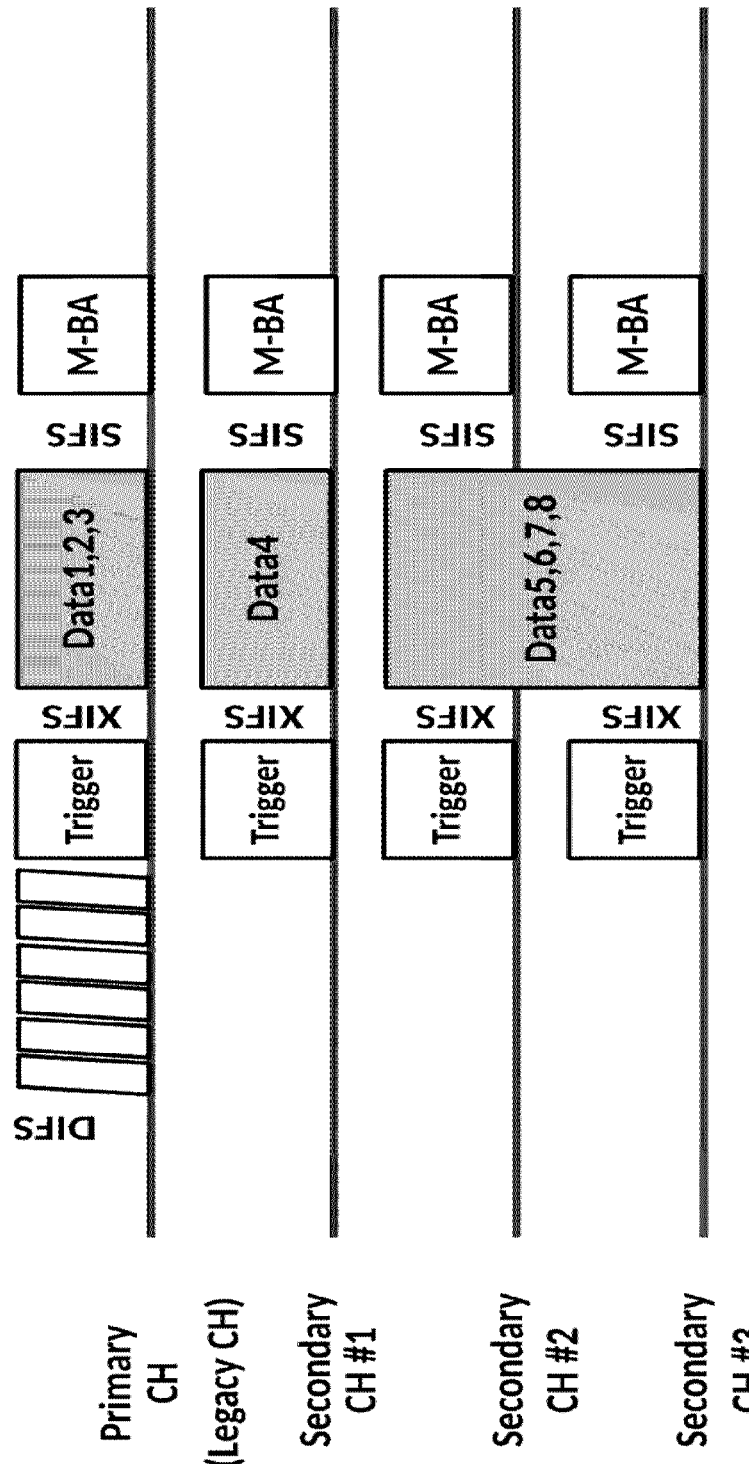
FIG. 38 is a view illustrating that an access point according to another embodiment of the present invention transmits a trigger frame to a plurality of stations.

FIG. 38 is a view illustrating that an access point according to another embodiment of the present invention transmits a trigger frame to a plurality of stations.

When a channel is in an idle state for a predetermined time, the first wireless communication terminal transmits a trigger frame through a contention procedure on the corresponding channel. At this point, the channel may be the primary channel. In another specific embodiment, the channel may be a channel allocated to the second wireless communication terminal for the data transmission of the second wireless communication terminal. Specifically, when the channel is in idle state for a predetermined time, the first wireless communication terminal calculates a random value in the contention window. Thereafter, the first wireless communication terminal waits for the calculated random value. If the channel is in an idle state even after waiting for the calculated random value, the first wireless communication terminal transmits a trigger frame through the corresponding channel. At this time, the trigger frame may indicate that a specific channel is allocated to the second wireless communication terminal, as well as indicate that the second wireless communication terminal randomly accesses a specific range of channels.

The second wireless communication terminal receives the trigger frame.

The second wireless communication terminal obtains information on the channel allocated to the second wireless communication terminal itself based on the trigger frame. At this time, the information on the allocated channel may be the above-described channel vector information. Further, the information on the allocated channel may be information indicating that the channel is able to randomly access a specific range of channels.

The second wireless communication terminal transmits data to the first wireless communication terminal through the channel allocated to the second wireless communication terminal itself. In such a manner, the second wireless communication terminal transmits data immediately without transmitting the ACK frame for the trigger frame. At this time, when the first wireless communication terminal receives data from any one of the plurality of second wireless communication terminals that allocate channels through the trigger frame, it determines that the transmission of the trigger frame is successful. Accordingly, when data is received from any one of the second wireless communication terminals, the first wireless communication terminal does not perform a procedure for a transmission failure such as an increase in the size of the contention window. When the information on the allocated channel indicated by the trigger frame indicates only random access, the first wireless communication terminal determines that the transmission is successful even if the first wireless communication terminal fails to receive data. Therefore, even if the first wireless communication terminal does not receive data, it does not perform a procedure for the transmission failure.

As described above, the second wireless communication terminal may transmit to the first wireless communication terminal a frame indicating whether there is data to be transmitted to the first wireless communication terminal. This will be described in detail with reference to FIGS. 39 to 41.

Figure 39:
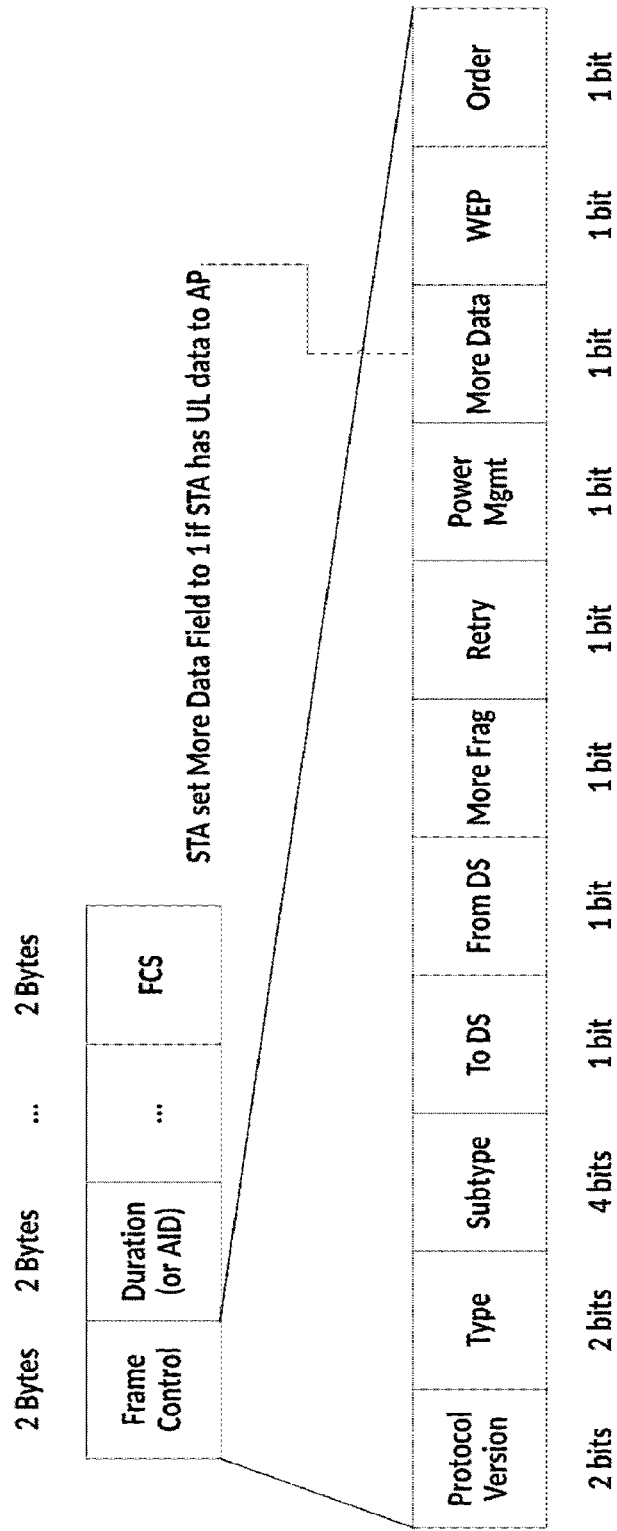
FIG. 39 is a view illustrating a structure of a frame indicating whether there is data to be transmitted to an access point by a station according to another embodiment of the present invention.

FIG. 39 is a view illustrating a structure of a frame indicating that there is data to be transmitted to an access point by a station according to another embodiment of the present invention.

The second wireless communication terminal may indicate whether there is data to be transmitted to the first wireless communication terminal through the specific field value of a frame transmitted to the first wireless communication terminal. Specifically, the second wireless communication terminal may indicate whether there is data to be transmitted to the first wireless communication terminal through the more data field value of a frame transmitted to the first wireless communication terminal. For example, when there is data to be transmitted to the first wireless communication terminal, the second wireless communication terminal may set the value of the more data field of a frame to be transmitted to the first wireless communication terminal to 1. The more data field is a field included in the frame control field of a MAC frame. Specifically, the more data field indicates that there is a bufferable unit (BU) to be transmitted from an access point to a station in a power saving (PS) mode. Therefore, a station receiving a frame in which the more data field is 1 continuously wakes up in the PS mode and waits for the data transmission of an access point. However, if the access point is not in a downlink transmission session for transmitting data to the station, the more data field is not used. Accordingly, as described above, the second wireless communication terminal may use the more data field to notify whether there is data to be transmitted to the first wireless communication terminal.

At this time, the frame transmitted by the second wireless communication terminal may be an uplink data frame transmitted from the second wireless communication terminal to the first wireless communication terminal. Moreover, the frame transmitted by the second wireless communication terminal may be at least one of an ACK frame and a block ACK frame for data transmitted by the first wireless communication terminal.

The first wireless communication terminal receiving such a frame may perform scheduling on the plurality of second wireless terminals and allocate a channel to the plurality of second wireless communication terminals. Specifically, when the value of the field indicating whether there is data to be transmitted to the first wireless communication terminal in the frame received by the first wireless communication terminal indicates that there is data to be transmitted to the first wireless communication terminal, the first wireless communication terminal adds the second wireless communication terminal that transmits the corresponding frame to a scheduling list for channel allocation. Additionally, when the value of the field indicating whether there is data to be transmitted to the first wireless communication terminal in the frame received by the first wireless communication terminal indicates that there is no data to be transmitted to the first wireless communication terminal, the first wireless communication terminal deletes the second wireless communication terminal that transmits the corresponding frame from the scheduling list for channel allocation.

Further, the first wireless communication terminal transmits a trigger frame including information on an allocated channel to the second wireless communication terminal.

If the second wireless communication terminal does not receive a trigger frame for a predetermined time after transmitting the frame indicating that there is data to be transmitted to the first wireless communication terminal, it transmits data through a contention procedure as before. At this time, the second wireless communication terminal may set a field value indicating whether there is data to be transmitted to the first wireless communication terminal in the frame for transmitting the data to "no data to be transmitted". For example, the second wireless communication terminal may set the value of the more data field in the frame for transmitting data to 0. The predetermined time during which the second wireless communication terminal waits may be a timer value according to an access category (AC). The first wireless communication terminal that receives the frame indicating that there is no data to be transmitted does not include the channel allocation information on the first wireless communication terminal that transmits the corresponding frame in the trigger frame.

Figure 40:
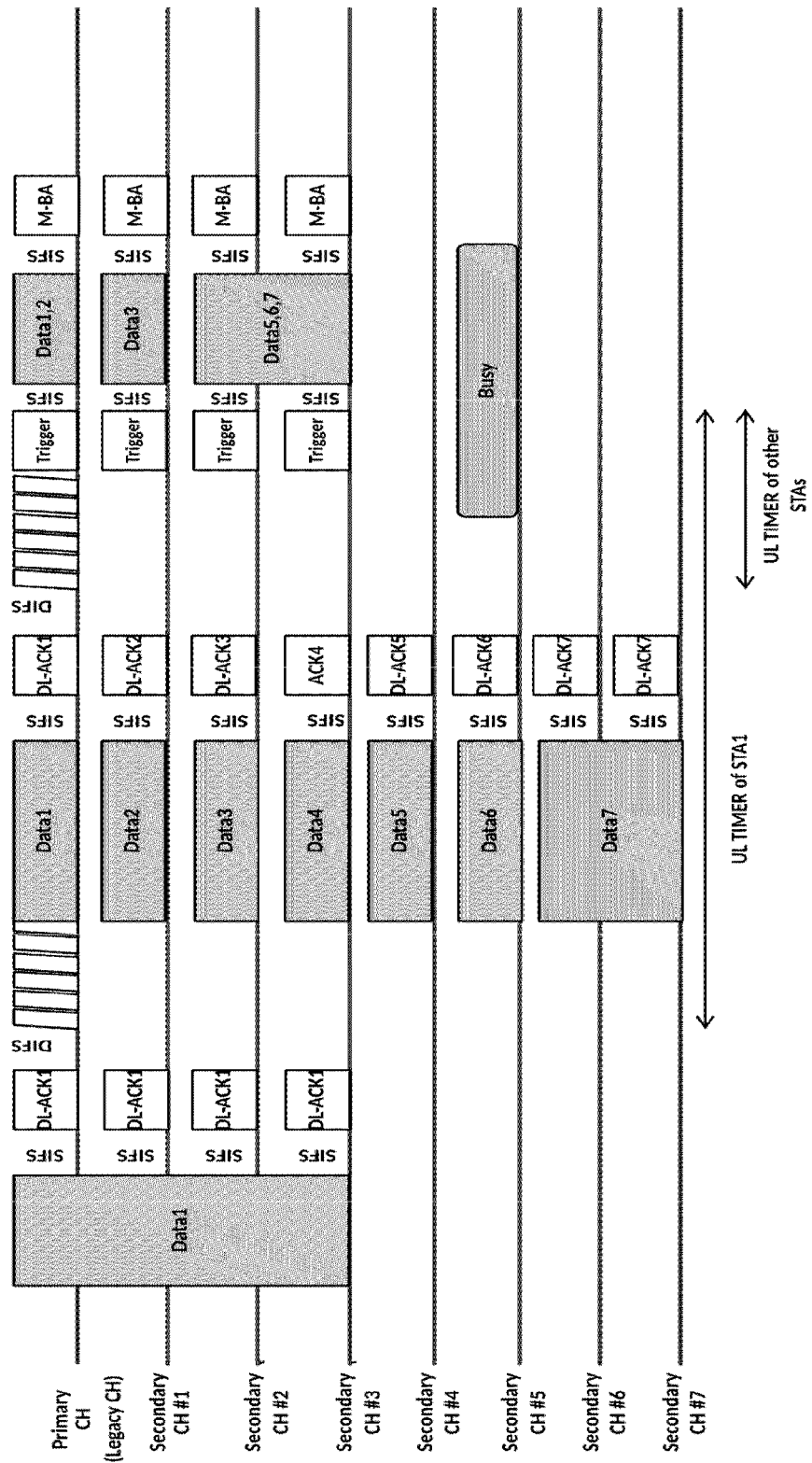
FIG. 40 is a view illustrating that a plurality of stations according to another embodiment of the present invention notifies an access point whether there is data to be transmitted through an ACK frame.

FIG. 40 is a view illustrating that a plurality of stations according to another embodiment of the present invention notifies an access point whether there is data to be transmitted through an ACK frame.

In the embodiment of FIG. 40, the access point transmits data to the first station to the seventh station.

The first station to the seventh station receive the data from the access point.

The first station, the second station, the third station, the fifth station, the sixth station, and the seventh station transmit an ACK frame indicating that there is data to be transmitted to the access point. Specifically, the first station, the second station, the third station, the fifth station, the sixth station, and the seventh station transmit an ACK frame in which a value of the more data field is 1 to the access point. The fourth station transmits an ACK frame indicating that there is no data to transmit to the access point. Specifically, the fourth station transmits an ACK frame in which a value of the more data field is 0 to the access point.

The access point transmits a trigger frame to the first station, the second station, the third station, the fifth station, the sixth station, and the seventh station.

The first station, the second station, the third station, the fifth station, the sixth station, and the seventh station obtain information on the channel allocated to each of first station, the second station, the third station, the fifth station, the sixth station, and the seventh station based on the trigger frame.

The first station, the second station, the third station, the fifth station, the sixth station, and the seventh station transmit data to the access point through the channel allocated to each of the first station, the second station, the third station, the fifth station, the sixth station, and the seventh station.

Figure 41:
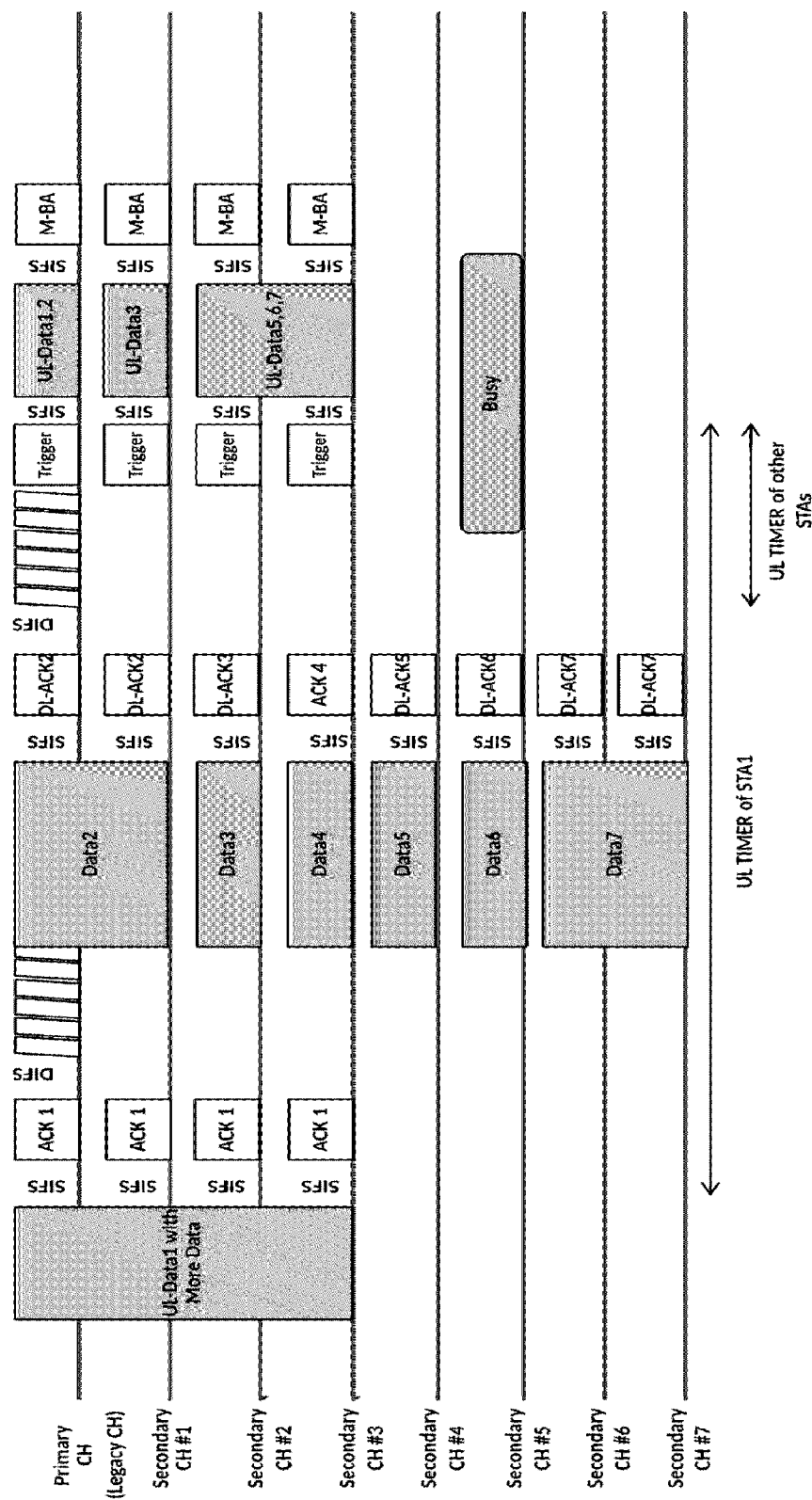
FIG. 41 is a view illustrating that a plurality of stations according to another embodiment of the present invention notifies an access point whether there is data to be transmitted through an uplink transmission data frame.

FIG. 41 is a view illustrating that a plurality of stations according to another embodiment of the present invention notifies an access point whether there is data to be transmitted through an uplink transmission data frame.

The first station to the seventh station transmit data to the access point. At this time, the first station, the second station, the third station, the fifth station, the sixth station, and the seventh station transmit a data frame indicating that there is data to be transmitted to the access point to the access point. Specifically, the first station, the second station, the third station, the fifth station, the sixth station, and the seventh station transmit a data frame in which a value of the more data field is 1.

The access point transmits an ACK frame to the first station to the seventh station.

The other operations of the access point and the plurality of stations are the same as those of the above-described embodiment of FIG. 40.

In such a manner, the second wireless communication terminal may transmit a frame indicating whether there is data to be transmitted to the first wireless communication terminal, which is in the second wireless communication terminal's own buffer status. The first wireless communication terminal may efficiently allocate a channel and a schedule to the plurality of second wireless communication terminals based on the buffer status of the second wireless communication terminal. Through this, the plurality of second wireless communication terminals may efficiently transmit data to the first wireless communication terminals.

Operations of the first wireless communication terminal and the second wireless communication terminal according to the above-described embodiments will be described with reference to FIGS. 42 and 43.

Figure 42:
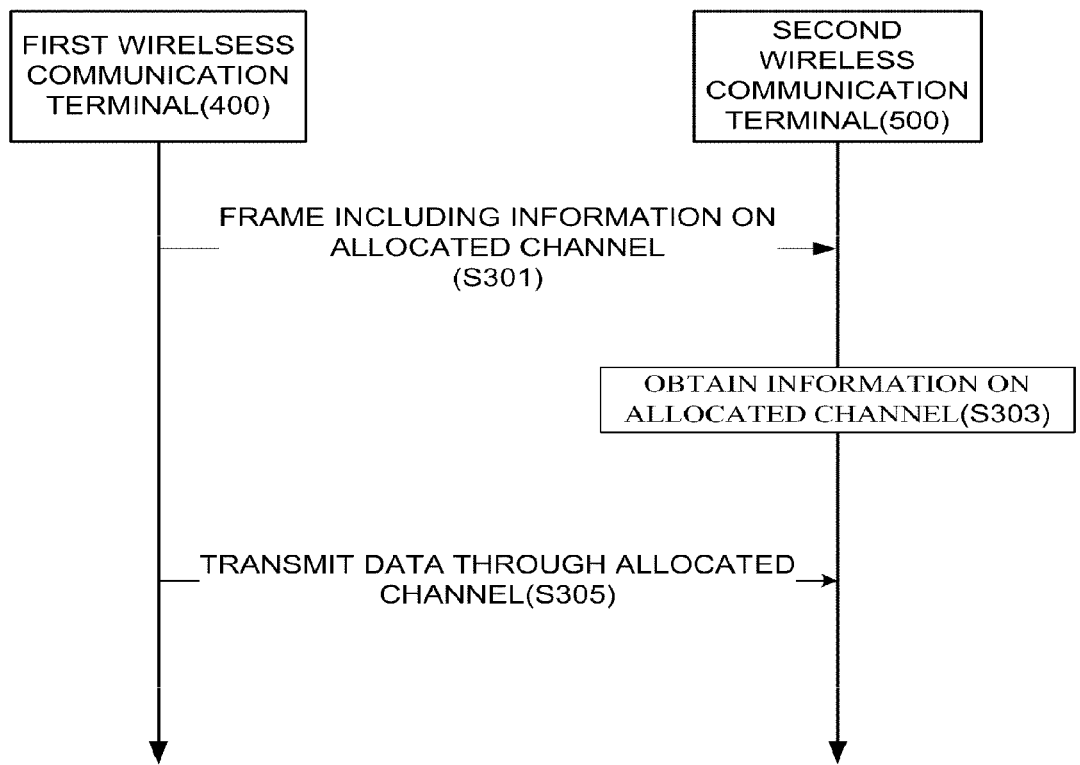
FIG. 42 is a ladder diagram illustrating an operation in which a first wireless communication terminal transmits data to a second wireless communication terminal according to an embodiment of the present invention.

FIG. 42 is a ladder diagram illustrating an operation in which a first wireless communication terminal transmits data to a second wireless communication terminal according to an embodiment of the present invention.

The first wireless communication terminal 400 transmits a trigger frame to the second wireless communication terminal 500 (S301). The trigger frame includes information on a channel allocated to the plurality of second wireless communication terminals 500 in order to communicate with the first wireless communication terminal 400. At this time, the trigger frame may be referred to as a poll frame as described above. In addition, the first wireless communication terminal 400 may transmit a trigger frame to the plurality of second wireless communication terminals 500 through the primary channel. In another specific embodiment, the first wireless communication terminal 400 may transmit a trigger frame to the plurality of second wireless communication terminals 500 through a channel allocated to each of the plurality of second wireless communication terminals 500.

The information of the allocated channel included in the trigger frame may include information on a channel and information on a sub-channel. At this time, the channel information is information on a channel having a bandwidth greater than the minimum unit frequency bandwidth. The sub-channel information, as a sub-band included in a channel, is information on a sub-channel having a bandwidth less than the minimum unit frequency bandwidth. Specifically, the channel information may be an index indicating a channel. In addition, the sub-channel information may be an index representing a sub-channel.

In addition, in a specific embodiment, the first wireless communication terminal 400 may transmit an RTS-to-Self frame, which is an RTS frame having the address of the first wireless communication terminal 400 as the reception address, through a plurality of channels. Through this, the first wireless communication terminal 400 obtains the TXOP of the channel through which the RTS-to-S elf frame is transmitted. In a specific embodiment, the first wireless communication terminal 400 may transmit a trigger frame after transmitting an RTS-to-Self frame. In another specific embodiment, the first wireless communication terminal 400 may transmit an RTS-to-S elf frame after transmitting a trigger frame.

In another specific embodiment, the first wireless communication terminal 400 may transmit an RTS frame including channel information allocated to the second wireless communication terminal 500 instead of a trigger frame.

The second wireless communication terminal 500 may transmit a CTS frame to the first wireless communication terminal 400 in response to the RTS-to-Self frame through the channel allocated to the second wireless communication terminal 500. In a specific embodiment, when the number of wireless communication terminals that connect to the first wireless communication terminal 400 at one time is limited, the plurality of second wireless communication terminals 500 may sequentially transmit the CTS frames. At this time, the plurality of second wireless communication terminals 500 may obtain the transmission order of the CTS frames based on the trigger frame.

The second wireless communication terminal 500 obtains information on the allocated channel based on the frame received from the first wireless communication terminal 400 (S303).

The first wireless communication terminal 400 transmits data to the second wireless communication terminal 500 through the channel allocated to the second wireless communication terminal 500 (S305). At this time, the first wireless communication terminal 400 may synchronize the data airtime with the data airtime of the second wireless communication terminal 500. Specifically, the first wireless communication terminal 400 may synchronize the data airtime with the data airtime of another second wireless communication terminal 500 using at least one of padding and fragmentation. In another specific embodiment, the first wireless communication terminal 400 does not synchronize the data airtime with the data airtime of another second wireless communication terminal 500, but determines the data airtime according to the amount of data to be transmitted to the second wireless communication terminal 500. In a specific embodiment, the first wireless communication terminal 400 may transmit data to the plurality of second wireless communication terminals 500 through plural terminal A-MPDUs.

Figure 43:
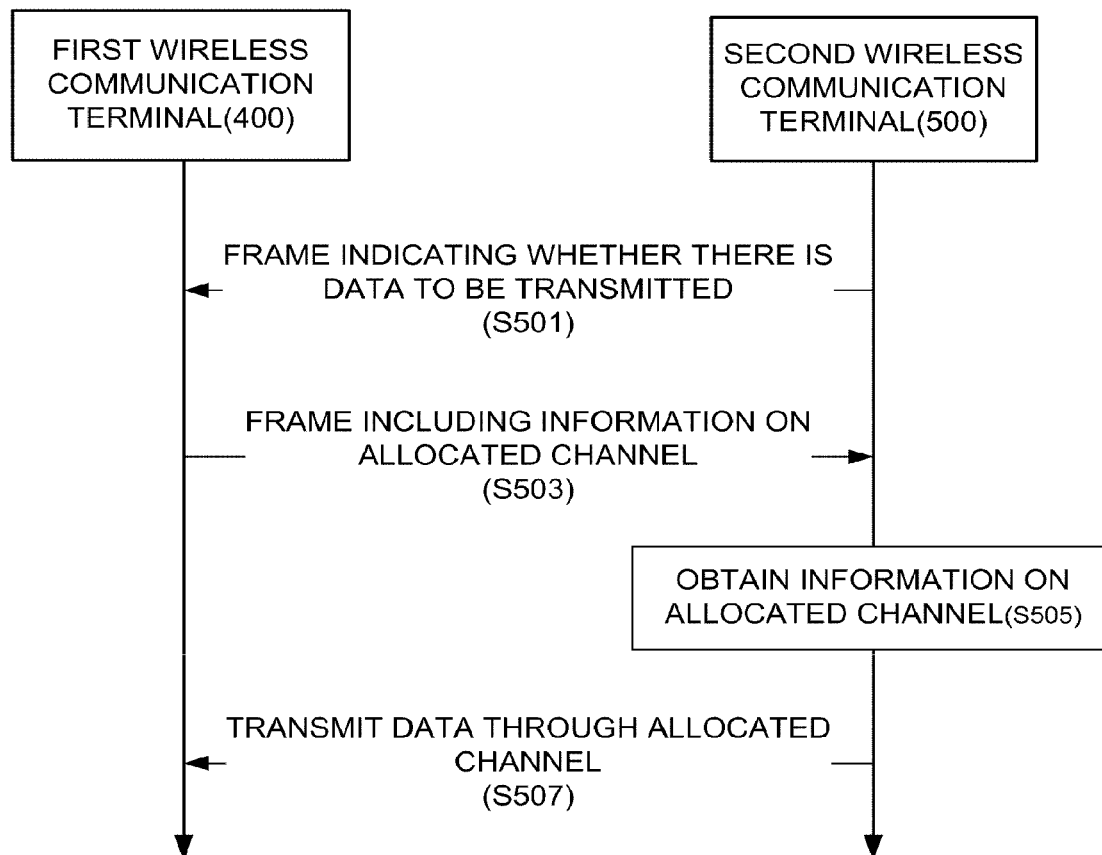
FIG. 43 is a ladder diagram illustrating an operation in which a second wireless communication terminal transmits data to a first wireless communication terminal according to an embodiment of the present invention.

FIG. 43 is a ladder diagram illustrating an operation in which a second wireless communication terminal transmits data to a first wireless communication terminal according to an embodiment of the present invention.

The second wireless communication terminal 500 transmits a frame indicating whether there is data to be transmitted to the first wireless communication terminal 400 to the first wireless communication terminal 400 (S501). At this time, a specific field of the frame indicating whether there is data to be transmitted to the first wireless communication terminal 400 may indicate whether there is data to be transmitted. In a specific embodiment, the more data field of the frame indicating whether there is data to be transmitted to the first wireless communication terminal 400 may indicate whether there is data to be transmitted. For example, when a value of the more data field of the frame indicating whether there is data to be transmitted to the first wireless communication terminal 400 is 1, this may indicate that there is data to be transmitted to the first wireless communication terminal 400. In addition, the frame indicating whether there is data to be transmitted to the first wireless communication terminal 400 may be at least one of an ACK frame, a block ACK frame, and an uplink data frame transmitted from the second wireless communication terminal 500 to the first wireless communication terminal 400.

Furthermore, the frame indicating whether there is data to be transmitted may include at least any one of the size of data to be transmitted to the first wireless communication terminal 400 and information on an available channel detected by the second wireless communication terminal 500.

The first wireless communication terminal 400 transmits a trigger frame to the second wireless communication terminal 500 (S503). The trigger frame includes information on a channel allocated to the plurality of second wireless communication terminals 500 for communication with the first wireless communication terminal 400. At this time, the trigger frame may be the same as one described with reference to FIG. 42. Specifically, the first wireless communication terminal 400 may transmit a trigger frame based on the frame indicating whether there is data to be transmitted from the second wireless communication terminal 500. In a specific embodiment, the first wireless communication terminal 400 may allocate a channel to the second wireless communication terminal 500 based on the frame indicating whether there is data to be transmitted from the second wireless communication terminal 500. In addition, the first wireless communication terminal 400 may perform scheduling based on the frame indicating whether there is data to be transmitted from the second wireless communication terminal 500. The first wireless communication terminal 400 may generate a trigger frame based on such channel allocation and scheduling. In addition, when the channel allocated to the second wireless communication terminal 500 is in an idle state for more than a predetermined time, the first wireless communication terminal 400 may transmit the trigger frame to the second wireless communication terminal 500 through the corresponding channel. At this point, the predetermined time may be an AIFS or a DIFS. In a specific embodiment, the first wireless communication terminal 400 may receive the ACK frame for the trigger frame from the second wireless communication terminal 500 and may transmit the CTS frame to the second wireless communication terminal 500.

The second wireless communication terminal 500 obtains information on the allocated channel based on the frame received from the first wireless communication terminal 400 (S505).

The second wireless communication terminal 500 transmits data to the first wireless communication terminal 400 through the channel allocated to the second wireless communication terminal 500(S507). In a specific embodiment, the second wireless communication terminal 500 may transmit data to the first wireless communication terminal 400 through the channel allocated to the second wireless communication terminal 500 after the first wireless communication terminal 400 transmits the CTS-to-S elf frame.

Although the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from the spirit and scope of the present invention. For example, each component specifically shown in the embodiments may be modified and implemented. It should be interpreted that differences relating to such modifications and application are included in the scope of the present invention defined in the appended claims.

The invention claimed is:

1. A base wireless communication terminal comprising:
a transceiver; and
a processor,
wherein the processor is configured to:
transmit, by using the transceiver, a first non-data frame, wherein the first non-data frame reserves a Transmit Opportunity (TXOP), and allocates a first channel for a second non-data frame which is a response to the first non-data frame to each of a first plurality of wireless communication terminals using a plurality of channel fields of the first non-data frame, wherein each of the plurality of channel fields includes a first subfield for an association identifier (AID) and a second subfield for an index indicating predetermined channel usage pattern for a frequency band range, wherein the first subfield indicates a wireless communication terminal to which a channel indicated by the second subfield is allocated, wherein the AID identifies an association between a wireless communication terminal corresponding to the AID and the base wireless communication terminal, and
receive, by using the transceiver, at least one second non-data frame through the first channel from at least one of the first plurality of wireless communication terminals.

2. The base wireless communication terminal of claim 1, wherein the processor is configured to simultaneously transmit, by using the transceiver, a plurality of data frames to a second plurality of wireless communication terminals and synchronize airtimes of the plurality of data frames.

3. The base wireless communication terminal of claim 2, wherein the processor is configured to pad at least one of the plurality of data frames to synchronize the airtimes of the plurality of data frames.

4. A wireless communication terminal comprising:
a transceiver; and
a processor,
wherein the processor is configured to:
receive, by using the transceiver, a first non-data frame from a base wireless communication terminal, simultaneously with at least one of a first plurality of wireless communication terminals, wherein the first non-data frame reserves a Transmit Opportunity (TXOP), and allocates a channel for a second non-data frame which is a response to the first non-data frame to each of the wireless communication terminal and the first plurality of wireless communication terminals using a plurality of channel fields of the first non-data frame, wherein each of the plurality of channel fields includes a first subfield for an association identifier (AID) and a second subfield for an index indicating predetermined channel usage pattern for a frequency band range, wherein the first subfield indicates a wireless communication terminal to which a channel indicated by the second subfield is allocated, and transmit, by using the transceiver, a second non-data frame through the channel indicated by the second subfield of the channel field to the base wireless communication terminal when the first subfield of the channel field indicates an AID of the wireless communication terminal,
wherein the AID of the wireless communication terminal identifies an association between the wireless communication terminal and the base wireless communication terminal.

5. The wireless communication terminal of claim 4, wherein the processor is configured to receive, by using the transceiver, a first data frame from the base wireless communication terminal, simultaneously with receiving a second data frame by a second wireless communication terminal,
wherein an airtime of the first data frame is synchronized with an airtime of the second data frame.

6. The wireless communication terminal of claim 5, wherein padding is used for the synchronization of the airtime of the first data frame with the airtime of the second data frame.

7. A method of operating a wireless communication terminal, the method comprising:
receiving a first non-data frame from a base wireless communication terminal, wherein the first non-data frame reserves a Transmit Opportunity (TXOP), and allocates a channel for a second non-data frame which is a response to the first non-data frame to the wireless communication terminal and each of a first plurality of wireless communication terminals using a plurality of channel fields of the first non-data frame, wherein each of the plurality of channel fields includes a first subfield for an association identifier (AID) and a second subfield for an index indicating predetermined channel usage pattern for a frequency band range, wherein the first subfield indicates a wireless communication terminal to which a channel indicated by the second subfield is allocated, and
transmitting a second non-data frame through the channel indicated by the second subfield of the channel field to the base wireless communication terminal when the first subfield of the channel field indicates an AID of the wireless communication terminal,
wherein the AID of the wireless communication terminal identifies an association between the wireless communication terminal and the base wireless communication terminal.

8. The method of claim 7, further comprising receiving a first data frame from the base wireless communication terminal, simultaneously with receiving a second data frame by a second wireless communication terminal,
wherein an airtime of the first data frame is synchronized with an airtime of the second data frame.

9. The method of claim 8, wherein padding is used for the synchronization of the airtime of the first data frame with the airtime of the second data frame.

* * * * *